United States Patent
Peter et al.

(10) Patent No.: US 12,071,881 B2
(45) Date of Patent: Aug. 27, 2024

(54) SELECTIVE CATALYTIC REDUCTION CATALYST ON A FILTER

(71) Applicant: BASF Corporation, Florham Park, NJ (US)

(72) Inventors: Matthias Peter, Hannover (DE); Susanne Stiebels, Hannover (DE); Andreas Zeeb, Hannover (DE); Claudia Zabel, Hannover (DE); Maria Heenemann, Hannover (DE)

(73) Assignee: BASF Corporation, Florham Park, NJ (US)

( * ) Notice: Subject to any disclaimer, the term of this patent is extended or adjusted under 35 U.S.C. 154(b) by 420 days.

(21) Appl. No.: 17/594,005

(22) PCT Filed: Apr. 15, 2020

(86) PCT No.: PCT/EP2020/060548
§ 371 (c)(1),
(2) Date: Sep. 30, 2021

(87) PCT Pub. No.: WO2020/212397
PCT Pub. Date: Oct. 22, 2020

(65) Prior Publication Data
US 2022/0154611 A1    May 19, 2022

(30) Foreign Application Priority Data
Apr. 15, 2019 (EP) .................... 19169205

(51) Int. Cl.
| | |
|---|---|
| *B01J 29/72* | (2006.01) |
| *B01J 35/61* | (2024.01) |
| *B01J 35/64* | (2024.01) |
| *B01J 37/02* | (2006.01) |
| *F01N 3/022* | (2006.01) |
| *F01N 3/035* | (2006.01) |
| *F01N 3/20* | (2006.01) |
| *F01N 3/28* | (2006.01) |

(52) U.S. Cl.
CPC ............ *F01N 3/035* (2013.01); *B01J 29/723* (2013.01); *B01J 35/612* (2024.01); *B01J 35/613* (2024.01); *B01J 35/657* (2024.01); *B01J 37/0215* (2013.01); *F01N 3/022* (2013.01); *F01N 3/2066* (2013.01); *F01N 3/2803* (2013.01); *F01N 2250/02* (2013.01); *F01N 2260/14* (2013.01); *F01N 2370/04* (2013.01); *F01N 2510/063* (2013.01); *F01N 2510/068* (2013.01)

(58) Field of Classification Search
CPC ........ F01N 3/035; F01N 3/022; F01N 3/2066; F01N 3/2803; F01N 2250/02; F01N 2260/14; F01N 2370/04; F01N 2510/063; F01N 2510/068; F01N 2330/06; F01N 3/0222; F01N 3/2828; B01J 29/723; B01J 35/612; B01J 35/613; B01J 35/657; B01J 37/0215; B01J 35/651; B01J 35/653; B01J 37/0219; B01J 37/0246; B01J 37/0248; B01J 29/00; B01J 29/763; B01J 29/80; B01D 2255/20738; B01D 2255/20761; B01D 2255/50; B01D 2255/9155; B01D 53/9418; B01D 53/9472; B01D 53/9431; B01D 2255/9022; B01D 2258/01; Y02A 50/20; Y02T 10/12

USPC ........................ 502/184, 185, 325, 344, 345
See application file for complete search history.

(56) References Cited

U.S. PATENT DOCUMENTS

| | | |
|---|---|---|
| 2012/0258032 A1 | 10/2012 | Phillips et al. |
| 2015/0064088 A1 | 3/2015 | Green et al. |
| 2016/0008759 A1 | 1/2016 | Sonntag et al. |
| 2016/0375429 A1* | 12/2016 | Chandler ........... B01D 46/2484 423/213.2 |
| 2019/0060885 A1 | 2/2019 | Welsch et al. |
| 2019/0070596 A1* | 3/2019 | Yang ................. B01D 53/9422 |
| 2019/0105650 A1 | 4/2019 | Welsch et al. |
| 2020/0188895 A1* | 6/2020 | Petrovic ................. B01J 29/061 |
| 2021/0114007 A1* | 4/2021 | Li ........................... B01J 29/084 |
| 2022/0032277 A1* | 2/2022 | Peter ....................... B01J 29/763 |

FOREIGN PATENT DOCUMENTS

EP    2 382 031 B1    5/2017

OTHER PUBLICATIONS

International Search Report dated Jan. 18, 2021, PCT/EP2020/060548.

* cited by examiner

*Primary Examiner* — Frank M Lawrence, Jr.
(74) *Attorney, Agent, or Firm* — DLA Piper LLP (US)

(57) ABSTRACT

The present invention relates to a selective catalytic reduction catalyst comprising a porous wall-flow filter substrate; wherein in the pores of the porous internal walls and on the surface of the porous internal walls, the catalyst comprises a selective catalytic reduction coating comprising a selective catalytic reduction component comprising a zeolitic material comprising one or more of copper and iron. The present invention further relates to a process for preparing a selective catalytic reduction catalyst using particles of a carbon-containing additive and an aqueous mixture comprising said particles of a carbon-containing additive.

8 Claims, 12 Drawing Sheets

SELECTIVE CATALYTIC REDUCTION CATALYST ON A FILTER

This application is a U.S. national stage entry application under 35 U.S.C. § 371 from PCT International Application No. PCT/EP2020/060548, filed on Apr. 15, 2020, which claims priority to E.P. Patent Application No. 19169205.2, filed on Apr. 15, 2019; the contents of each application is incorporated herein by reference in its entirety.

The present invention relates to processes for preparing selective catalytic reduction catalysts, to selective catalytic reduction catalysts and to methods for selectively catalytically reducing nitrogen oxides using said catalysts.

In selective catalytic reduction on filter applications, high washcoat loadings (2 g/in$^3$ and higher) are necessary to maximize low temperature NOx conversion and $NH_3$ storage. It is however known that upon addition of such washcoat loadings into a filter, the pores of the filter walls are increasingly blocked which leads to a large increase in backpressure. In an exhaust gas treatment system, high backpressures are undesired as they reduce the efficiency of an engine. Further, it is believed that the blockage of the pores would also prevent an optimal $NH_3$ storage.

Thus, there was a need to provide improved selective catalytic reduction catalysts on a wall-flow filter substrate for the treatment of exhaust gas stream of a passive ignition engine, said catalysts permitting reduction in backpressure in said filter while exhibiting good catalytic activity.

Therefore, it was an object of the present invention to provide an improved selective catalytic reduction catalyst permitting to reduce back-pressure while exhibiting good catalytic activity as well as an improved process for preparing an improved selective catalytic reduction catalyst.

I. SCR Catalyst and a Process for Preparing a SCR Catalyst (Backpressure/Catalytic Activity)

Surprisingly, it was found that the selective catalytic reduction (SCR) catalyst of the present invention permits to reduce backpressure while exhibiting good catalytic activity and that the process according to the present invention permits to produce a selective catalytic reduction catalyst permitting to reduce backpressure while exhibiting good catalytic activity.

Therefore, the present invention relates to a selective catalytic reduction catalyst comprising a porous wall-flow filter substrate comprising an inlet end, an outlet end, a substrate axial length extending between the inlet end and the outlet end, and a plurality of passages defined by porous internal walls of the porous wall-flow filter substrate, wherein the plurality of passages comprise inlet passages having an open inlet end and a closed outlet end, and outlet passages having a closed inlet end and an open outlet end, wherein the interface between the passages and the porous internal walls is defined by the surface of the porous internal walls;

wherein in the pores of the porous internal walls and on the surface of the porous internal walls, the catalyst comprises a selective catalytic reduction coating comprising a selective catalytic reduction component comprising a zeolitic material comprising one or more of copper and iron; wherein in the pores of the porous internal walls, the selective catalytic reduction catalytic coating is present as in-wall-coating, and on the surface of the porous internal walls, the selective catalytic reduction catalytic coating is present as on-wall-coating;

wherein in addition to said selective catalytic reduction catalytic coating, the catalyst comprises no further coating in the pores of the porous internal walls and no further coating on the surface of the porous internal walls;

wherein the selective catalytic reduction coating is present at a total loading, I(total), which is the sum of the loading of the in-wall coating, I(in-wall coating), and the loading of the on-wall coating, I(on-wall coating), wherein in the catalyst, the loading ratio, defined as the loading of the on-wall coating, I(on-wall coating), relative to the loading of the in-wall coating, I(in-wall coating), said loading ratio being defined as I(on-wall coating):I(in-wall coating), is in the range of from 17:83 to 80:20.

Preferably, said loading ratio, I(on-wall coating):I(in-wall coating), is in the range of from 18:82 to 70:30, more preferably in the range of from 19:81 to 60:40, more preferably in the range of from 20:80 to 60:40, more preferably in the range of from 20:80 to 50:50, more preferably in the range of from 20:80 to 45:55.

It is preferred that the total loading, I(total), of the selective catalytic reduction coating in the catalyst is in the range of from 1.3 to 6 g/in$^3$, more preferably in the range of from 1.5 to 5 g/in$^3$, more preferably in the range of from 1.8 to 4.5 g/in$^3$. It is preferred that the selective catalytic reduction catalyst of the present invention has high loading. In particular, it is more preferred that the total loading, I(total), of the selective catalytic reduction coating in the catalyst is in the range of from 2 to 4 g/in$^3$, more preferably in the range of from 2 to 3 g/in$^3$.

It is preferred that the selective catalytic reduction coating extends over x % of the substrate axial length, x being in the range of from 80 to 100, more preferably in the range of from 85 to 100, more preferably in the range of from 90 to 100, more preferably in the range of from 95 to 100, more preferably in the range of from 98 to 100. It is more preferred that the selective catalytic reduction coating extends from the inlet end toward the outlet end of the substrate. Alternatively, it is more preferred that the selective catalytic reduction coating extends from the outlet end toward the inlet end of the substrate.

As to the selective catalytic reduction on-wall coating, it is preferred that it extends on the surface of the porous internal walls of the inlet passages. It is more preferred that the selective catalytic reduction on-wall coating extends only on the surface of the porous internal walls of the inlet passages. Alternatively, it is preferred that the selective catalytic reduction on-wall coating extends on the surface of the porous internal walls of the outlet passages. It is more preferred that it extends only on the surface of the porous internal walls of the outlet passages. As a further alternative, it is preferred that the selective catalytic reduction on-wall coating extends on the surface of the porous internal walls of the inlet passages and on the surface of the porous internal walls of the outlet passages.

As to the zeolitic material comprised in the selective catalytic reduction component comprised in the selective catalytic reduction coating, it is preferred that said zeolitic material is a 8-membered ring pore zeolitic material, wherein said zeolitic material more preferably has a framework type selected from the group consisting of CHA, AEI, RTH, LEV, DDR, KFI, ERI, AFX, a mixture of two or more thereof and a mixed type of two or more thereof, more preferably selected from the group consisting of CHA, AEI, RTH, AFX, a mixture of two or more thereof and a mixed type of two or more thereof. It is more preferred that said zeolitic material is selected from the group consisting of CHA and AEI, more preferably CHA.

It is preferred that the zeolitic material comprised in the selective catalytic reduction component has a framework structure, wherein from 95 to 100 weight-%, more preferably from 98 to 100 weight-%, more preferably from 99 to 100 weight-%, more preferably from 99.5 to 100 weight-%, of the framework structure of the zeolitic material consist of Si, Al, and O. It is preferred that at most 1 weight-%, more preferably from 0 to 0.5 weight-%, more preferably from 0 to 0.1 weight-%, of the framework structure of the zeolitic material consist of P.

It is preferred that the zeolitic material comprised in the selective catalytic reduction has a molar ratio of Si to Al, calculated as molar $SiO_2:Al_2O_3$, which is in the range of from 2:1 to 50:1, more preferably in the range of from 2:1 to 40:1, more preferably in the range of from 5:1 to 30:1, more preferably in the range of from 10:1 to 30:1, more preferably in the range of from 14:1 to 28:1.

It is preferred that the zeolitic material comprised in the selective catalytic reduction coating, more preferably having a framework type CHA, has a mean crystallite size of at least 0.1 micrometer, more preferably in the range of from 0.1 to 3.0 micrometers, more preferably in the range of from 0.3 to 1.5 micrometer, more preferably in the range of from 0.4 to 1.0 micrometer determined via scanning electron microscopy.

It is preferred that the selective catalytic reduction coating comprises the zeolitic material at a loading in the range of from 0.1 to 3 g/in$^3$, more preferably in the range of from 0.5 to 2.75 g/in$^3$, more preferably in the range of from 1 to 2.5 g/in$^3$, more preferably in the range of from 1.5 to 2.25 g/in$^3$.

It is preferred that the zeolitic material comprised in the selective catalytic reduction component of the selective catalytic reduction coating comprises copper. It is more preferred that the selective catalytic reduction coating comprises copper in an amount, calculated as CuO, being in the range of from 1 to 15 weight-%, more preferably in the range of from 1.25 to 10 weight-%, more preferably in the range of from 1.5 to 7 weight-%, more preferably in the range of from 1.75 to 6 weight-%, more preferably in the range of from 2 to 5 weight-%, more preferably in the range of from 2.5 to 4.5 weight-% based on the weight of the zeolitic material comprised in the selective catalytic reduction coating.

It is more preferred that at most 0.5 weight-%, more preferably from 0 to 0.1 weight-%, more preferably from 0 to 0.01 weight-%, more preferably from 0 to 0.001 weight-%, of the selective catalytic reduction component consist of iron. It is more preferred that more preferred that from 0 to 0.01 weight-%, more preferably from 0 to 0.001 weight-%, more preferably from 0 to 0.0001 weight-%, more preferably from 0 to 0.00001 weight-%, of the selective catalytic reduction coating consist of iron.

It is preferred that the zeolitic material comprised in the selective catalytic reduction component of the selective catalytic reduction coating comprises iron. It is more preferred that the selective catalytic reduction coating comprises iron in an amount, calculated as $Fe_2O_3$, being in the range of from 0.5 to 14 weight-%, more preferably in the range of from 0.75 to 12 weight-%, more preferably in the range of from 1 to 9 weight-%, more preferably in the range of from 1.1 to 5 weight-% based on the weight of the zeolitic material comprised in the selective catalytic reduction coating. It is more preferred that at most 0.5 weight-%, more preferably from 0 to 0.1 weight-%, more preferably from 0 to 0.01 weight-%, more preferably from 0 to 0.001 weight-%, of the selective catalytic reduction component consist of copper. It is more preferred that from 0 to 0.01 weight-%, more preferably from 0 to 0.001 weight-%, more preferably from 0 to 0.0001 weight-%, more preferably from 0 to 0.00001 weight-%, of the selective catalytic reduction coating consist of copper.

It is preferred that from 98 to 100 weight-%, more preferably from 98 to 100 weight-%, more preferably from 99 to 100 weight-%, more preferably from 99.5 to 100 weight-%, of the selective catalytic reduction component consist of the zeolitic material comprising one or more of copper and iron.

Therefore, the present invention preferably relates to a selective catalytic reduction catalyst comprising a porous wall-flow filter substrate comprising an inlet end, an outlet end, a substrate axial length extending between the inlet end and the outlet end, and a plurality of passages defined by porous internal walls of the porous wall-flow filter substrate, wherein the plurality of passages comprise inlet passages having an open inlet end and a closed outlet end, and outlet passages having a closed inlet end and an open outlet end, wherein the interface between the passages and the porous internal walls is defined by the surface of the porous internal walls;

wherein in the pores of the porous internal walls and on the surface of the porous internal walls, the catalyst comprises a selective catalytic reduction coating comprising a selective catalytic reduction component comprising a zeolitic material comprising copper, wherein the zeolitic material is a 8-membered ring pore zeolitic material, wherein said zeolitic material more preferably has a framework type selected from the group consisting of CHA, AEI, RTH, LEV, DDR, KFI, ERI, AFX, a mixture of two or more thereof and a mixed type of two or more thereof, more preferably selected from the group consisting of CHA and AEI, more preferably CHA;

wherein in the pores of the porous internal walls, the selective catalytic reduction catalytic coating is present as in-wall-coating, and on the surface of the porous internal walls, the selective catalytic reduction catalytic coating is present as on-wall-coating;

wherein in addition to said selective catalytic reduction catalytic coating, the catalyst comprises no further coating in the pores of the porous internal walls and no further coating on the surface of the porous internal walls;

wherein the selective catalytic reduction coating is present at a total loading, I(total), which is the sum of the loading of the in-wall coating, I(in-wall coating), and the loading of the on-wall coating, I(on-wall coating), wherein in the catalyst, the loading ratio, defined as the loading of the on-wall coating, I(on-wall coating), relative to the loading of the in-wall coating, I(in-wall coating), said loading ratio being defined as I(on-wall coating):I(in-wall coating), is in the range of from 17:83 to 80:20, more preferably in the range of from 18:82 to 70:30, more preferably in the range of from 19:81 to 60:40, more preferably in the range of from 20:80 to 60:40, more preferably in the range of from 20:80 to 50:50, more preferably in the range of from 20:80 to 45:55.

In the context of the present invention, it is preferred that the selective catalytic reduction coating further comprises a non-zeolitic oxidic material, wherein the non-zeolitic oxidic material of the selective catalytic reduction coating more preferably comprises one or more of alumina, titania, silica, zirconia, ceria, and iron oxide, more preferably one or more of alumina, titania and silica, more preferably one or more of alumina and silica, more preferably alumina and silica. It is more preferred that from 95 to 100 weight-%, more preferably from 98 to 100 weight-%, more preferably from 99 to 100 weight-%, more preferably from 99.5 to 100 weight-% of the non-zeolitic oxidic material of the selective catalytic reduction coating consist of alumina and silica.

As to the non-zeolitic oxidic material comprising silica and alumina, it is preferred that the weight ratio of alumina to silica is in the range of from 10:1 to 30:1, more preferably in the range of from 12:1 to 25:1, more preferably in the range of from 14:1 to 19:1.

It is preferred that the selective catalytic reduction coating comprises a non-zeolitic oxidic material, more preferably the one as defined in the foregoing, at a loading in the range of from 0.05 to 1 $g/in^3$, preferably in the range of from 0.1 to 0.5 $g/in^3$.

As to the selective catalytic reduction coating, it is preferred that it further comprises an oxidic material, wherein the oxidic material more preferably comprises one or more of zirconia, alumina, titania, silica, and a mixed oxide comprising two or more of Zr, Al, Ti, and Si, wherein the oxidic material more preferably comprises one or more of alumina and zirconia, more preferably zirconia.

It is preferred that the selective catalytic reduction coating preferably comprises an oxidic material, more preferably zirconia, at a loading in the range of from 0.01 to 0.4 $g/in^3$, more preferably in the range of from 0.02 to 0.2 $g/in^3$.

Therefore, the present invention preferably relates to a selective catalytic reduction catalyst comprising a porous wall-flow filter substrate comprising an inlet end, an outlet end, a substrate axial length extending between the inlet end and the outlet end, and a plurality of passages defined by porous internal walls of the porous wall-flow filter substrate, wherein the plurality of passages comprise inlet passages having an open inlet end and a closed outlet end, and outlet passages having a closed inlet end and an open outlet end, wherein the interface between the passages and the porous internal walls is defined by the surface of the porous internal walls;

wherein in the pores of the porous internal walls and on the surface of the porous internal walls, the catalyst comprises a selective catalytic reduction coating comprising a selective catalytic reduction component comprising a zeolitic material comprising one or more of copper and iron, preferably copper, wherein the zeolitic material is a 8-membered ring pore zeolitic material, wherein said zeolitic material more preferably has a framework type selected from the group consisting of CHA, AEI, RTH, LEV, DDR, KFI, ERI, AFX, a mixture of two or more thereof and a mixed type of two or more thereof, more preferably selected from the group consisting of CHA and AEI, more preferably CHA; wherein the selective catalytic reduction coating further comprises a non-zeolitic oxidic material, more preferably a non-zeolitic material comprising silica and alumina; wherein the selective catalytic reduction coating more preferably further comprises an oxidic material, more preferably an oxidic material comprising zirconia;

wherein in the pores of the porous internal walls, the selective catalytic reduction catalytic coating is present as in-wall-coating, and on the surface of the porous internal walls, the selective catalytic reduction catalytic coating is present as on-wall-coating;

wherein in addition to said selective catalytic reduction catalytic coating, the catalyst comprises no further coating in the pores of the porous internal walls and no further coating on the surface of the porous internal walls;

wherein the selective catalytic reduction coating is present at a total loading, I(total), which is the sum of the loading of the in-wall coating, I(in-wall coating), and the loading of the on-wall coating, I(on-wall coating), wherein in the catalyst, the loading ratio, defined as the loading of the on-wall coating, I(on-wall coating), relative to the loading of the in-wall coating, I(in-wall coating), said loading ratio being defined as I(on-wall coating):I(in-wall coating), is in the range of from 17:83 to 80:20, more preferably in the range of from 18:82 to 70:30, more preferably in the range of from 19:81 to 60:40, more preferably in the range of from 20:80 to 60:40, more preferably in the range of from 20:80 to 50:50, more preferably in the range of from 20:80 to 45:55

In the context of the present invention, as to the porous wall-flow filter substrate, it is preferred that it comprises, more preferably consists of, a cordierite, a silicon carbide or an aluminum titanate, more preferably a silicon carbide or an aluminum titanate, more preferably a silicon carbide.

As to the porous wall-flow filter substrate, it is preferred that the inlet passages of the porous wall-flow filter substrate have the same dimensions as the outlet passages, or are larger than the dimensions of the outlet passages, when the dimensions of the inlet passages are larger than those of the outlet passages, the porous wall-flow filter substrate has an asymmetry factor in the range of from 1.02 to 2, preferably in the range of from 1.05 to 1.5, more preferably in the range of from 1.1 to 1.4, more preferably in the range of from 1.2 to 1.4.

It is preferred that the porous wall-flow filter substrate contains in the range of from 200 to 600, more preferably in the range of from 250 to 500, more preferably in the range of from 250 to 400, flow passages or cells per square inch. It is more preferred that the porous internal walls have preferably a thickness in the range of from 0.15 to 0.50 mm, more preferably in the range of from 0.20 to 0.45 mm, more preferably in the range of from 0.25 to 0.35 mm. The cells can have cross sections that are rectangular, square, circular, oval, triangular, hexagonal, or are of other polygonal shapes.

With respect to the porosity, it is preferred that the porous internal walls of the porous wall-flow filter substrate comprising the in-wall coating have a relative average porosity in the range of from 10 to 90%, preferably in the range of from 15 to 60%, more preferably in the range of from 20 to 50%, more preferably in the range of from 25 to 45%, more preferably in the range of from 30 to 40%, wherein the relative average porosity is defined as the average porosity of the internal walls comprising the in-wall coating relative to the average porosity of the internal walls not comprising the in-wall coating, wherein the average porosity is determined according to Reference Example 4 herein. It is more preferred that the average porosity of the internal walls not comprising the in-wall coating is in the range of from 30 to 75%, more preferably in the range of from 40 to 73%, more preferably in the range of from 50 to 70%, more preferably in the range of from 55 to 65%, wherein the average porosity is determined according to Reference Example 4 herein. It is more preferred that the porous internal walls of the porous wall-flow filter substrate comprising the in-wall coating have the relative average porosity defined above and that the total loading of the selective catalytic coating, I(total), is in the range of from 1.8 to 4.5 g/in$^3$, more preferably in the range of from 2 to 4 g/in$^3$, more preferably in the range of from 2 to 3 g/in$^3$.

Therefore, the present invention preferably relates to a selective catalytic reduction catalyst comprising
- a porous wall-flow filter substrate comprising an inlet end, an outlet end, a substrate axial length extending between the inlet end and the outlet end, and a plurality of passages defined by porous internal walls of the porous wall-flow filter substrate, wherein the plurality of passages comprise inlet passages having an open inlet end and a closed outlet end, and outlet passages having a closed inlet end and an open outlet end, wherein the interface between the passages and the porous internal walls is defined by the surface of the porous internal walls;
- wherein in the pores of the porous internal walls and on the surface of the porous internal walls, the catalyst comprises a selective catalytic reduction coating comprising a selective catalytic reduction component comprising a zeolitic material comprising one or more of copper and iron;
- wherein in the pores of the porous internal walls, the selective catalytic reduction catalytic coating is present as in-wall-coating, and on the surface of the porous internal walls, the selective catalytic reduction catalytic coating is present as on-wall-coating;
- wherein in addition to said selective catalytic reduction catalytic coating, the catalyst comprises no further coating in the pores of the porous internal walls and no further coating on the surface of the porous internal walls;
- wherein the selective catalytic reduction coating is present at a total loading, I(total), which is the sum of the loading of the in-wall coating, I(in-wall coating), and the loading of the on-wall coating, I(on-wall coating), wherein in the catalyst, the loading ratio, defined as the loading of the on-wall coating, I(on-wall coating), relative to the loading of the in-wall coating, I(in-wall coating), said loading ratio being defined as I(on-wall coating):I(in-wall coating), is in the range of from 17:83 to 80:20;
- wherein the porous internal walls of the porous wall-flow filter substrate comprising the in-wall coating have a relative average porosity in the range of from 10 to 90%, preferably in the range of from 15 to 60%, more preferably in the range of from 20 to 50%, more preferably in the range of from 25 to 45%, more preferably in the range of from 30 to 40%, wherein the relative average porosity is defined as the average porosity of the internal walls comprising the in-wall coating relative to the average porosity of the internal walls not comprising the in-wall coating, wherein the average porosity is determined according to Reference Example 4 herein and wherein the total loading of the selective catalytic coating, I(total), is in the range of from 1.8 to 4.5 g/in$^3$, more preferably in the range of from 2 to 4 g/in$^3$, more preferably in the range of from 2 to 3 g/in$^3$.

In the context of the present invention, it is preferred that the porous internal walls of the porous wall-flow filter substrate comprising the in-wall coating have an average pore size in the range of from 5 to 30 micrometers, more preferably in the range of from 10 to 25 micrometers, more preferably in the range of from 14 to 20 micrometers, wherein the average pore size of the internal walls comprising the in-wall coating is determined according to Reference Example 4 herein.

It is preferred that the in-wall coating comprises pores, wherein at least 15%, preferably from 15 to 50%, more preferably from 20 to 30%, of the pores of the in-wall coating have a mean pore size in the range of from 0.5 to 18 micrometers, more preferably in the range of from 1 to 17 micrometers, more preferably in the range of from 1 to 16 micrometers, the mean pore size being determined according to Reference Example 4 herein.

It is preferred that the in-wall coating comprises pores, wherein from 3 to 12%, preferably from 5 to 11%, of the pores of the in-wall coating have a mean pore size in the range of from 0.005 micrometer to 2 micrometers, more preferably in the range of from 0.01 to 1 micrometer, the mean pore size being determined according to Reference Example 4 herein.

It is preferred that the selective catalytic reduction coating is prepared by using particles of a carbon-containing additive as defined in the following. Thus, it is to be understood that all features in the present invention relative to a carbon-containing additive might be used for the purpose of further defining the selective catalytic reduction catalyst of the present invention.

It is preferred that at most 0.5 weight-%, preferably from 0 to 0.1 weight-%, more preferably from 0 to 0.01 weight-%, more preferably from 0 to 0.001 weight-%, of the selective catalytic reduction coating consist of an oxygen storage material. In the context of the present invention, the oxygen storage material preferably comprises cerium, more preferably comprises one or more of a cerium oxide, a mixture of oxides comprising a cerium oxide, and a mixed oxide comprising cerium, wherein the mixed oxide comprising cerium more preferably additionally comprises one or more of zirconium, yttrium, neodymium, lanthanum, and praseodymium, more preferably additionally comprises one or more of zirconium, yttrium, neodymium, and lanthanum, more preferably additionally comprises zirconium, yttrium, neodymium, and lanthanum.

It is preferred that at most 0.1 weight-%, more preferably from 0 to 0.01 weight-%, more preferably from 0 to 0.001 weight-%, more preferably from 0 to 0.0001 weight-%, more preferably from 0 to 0.00001 weight-%, of the selective catalytic reduction coating consist of platinum, more preferably of platinum, palladium and rhodium, more preferably of platinum, palladium, rhodium and iridium, more preferably of noble metals. In the context of the present invention, it is to be understood that there preferably is no platinum, more preferably no platinum, no palladium and no rhodium, more preferably no platinum, no palladium, no rhodium and no iridium, more preferably no noble metals, in the selective catalytic reduction coating or only very small amounts thereof, such as impurities.

It is preferred that from 98 to 100 weight-%, more preferably from 99 to 100 weight-%, more preferably from 99.5 to 100 weight-%, more preferably from 99.9 to 100 weight-%, of the selective catalytic reduction coating consist of the selective catalytic reduction component, which comprises the zeolitic material and one or more of copper and iron, and preferably of the non-zeolitic oxidic material as defined in the foregoing, and more preferably of the oxidic material as defined in the foregoing.

It is preferred that from 98 to 100 weight-%, preferably from 99 to 100 weight-%, more preferably from 99.5 to 100 weight-%, more preferably from 99.9 to 100 weight-%, of the selective catalytic reduction catalyst consist of the selective catalytic reduction coating and of the porous wall-flow filter substrate.

The present invention further relates to a process for preparing a selective catalytic reduction catalyst, preferably the selective catalytic reduction catalyst according to the present invention, the process comprising (i) providing a porous wall-flow filter substrate comprising an inlet end, an outlet end, a substrate axial length extending between the inlet end and the outlet end, and a plurality of passages defined by porous internal walls of the porous wall-flow filter substrate, wherein the plurality of passages comprise inlet passages having an open inlet end and a closed outlet end, and outlet passages having a closed inlet end and an open outlet end, wherein the interface between the passages and the porous internal walls is defined by the surface of the porous internal walls;

(ii) preparing an aqueous mixture comprising water, particles of a carbon-containing additive, and a source of a selective catalytic reduction component comprising a zeolitic material and a source of one or more of copper and iron, wherein the carbon-containing additive has a removal temperature in the range of from 120 to 900° C.;

(iii) disposing the mixture obtained in (ii) on the surface of the internal walls of the porous substrate provided in (i), and optionally drying the substrate comprising the mixture disposed thereon;

(iv) calcining the substrate obtained in (iii) in a gas atmosphere having a temperature in the range of from 500 to 1000° C., obtaining a porous wall-flow filter substrate comprising a selective catalytic reduction coating;

wherein the particles of the carbon-containing additive contained in the aqueous mixture prepared in (ii) have a Dv50 in the range of from 0.5 to 40 micrometers, the Dv50 being determined according to Reference Example 1 herein.

As to the porous wall-flow filter provided in (i), it is preferred that the porous internal walls of the porous wall-flow filter substrate provided in (i) have an average porosity in the range of from 30 to 75%, more preferably in the range of from 40 to 73%, more preferably in the range of from 50 to 70%, more preferably in the range of from 55 to 65%, wherein the average porosity is determined according to Reference Example 4 herein.

As to the porous wall-flow filter provided in (i), it is preferred that the internal walls of the porous wall-flow filter substrate provided in (i) have a mean pore size in the range of from 8 to 30 micrometers, more preferably in the range of from 12 to 28 micrometers, more preferably in the range of from 15 to 25 micrometers, more preferably in the range of from 17 to 23 micrometers, wherein the mean pore size is determined according to Reference Example 4 herein.

It is preferred that the porous wall-flow filter substrate provided in (i) comprises, more preferably consists of, a cordierite, a silicon carbide or an aluminum titanate, more preferably a silicon carbide or an aluminum titanate, more preferably a silicon carbide.

As to the porous wall-flow filter provided in (i), it is preferred that it is as defined in the foregoing regarding one or more of the features relative to the cells per square inch, the asymmetry or not and the porous internal wall thickness.

Carbon-Containing Additive

It is preferred that the carbon-containing additive contained in the aqueous mixture prepared in (ii) is one or more of graphite, synthetic graphite, carbon black, graphene, diamond, fullerene, carbon nanotubes and amorphous carbon. It is more preferred that the carbon-containing additive is one or more of graphite, synthetic graphite, graphene, fullerene, carbon nanotubes and amorphous carbon, more preferably one or more of graphite, synthetic graphite and graphene, more preferably one or more of graphite and synthetic graphite, more preferably synthetic graphite. Alternatively, it is more preferred that the carbon-containing additive is carbon black; wherein carbon black preferably has a BET specific surface area in the range of from 5 to 30 $m^2/g$, more preferably in the range of from 6 to 20 $m^2/g$, more preferably in the range of from 7 to 12 $m^2/g$, the BET specific surface area being determined as defined in Reference Example 2 herein.

It is preferred that the carbon-containing additive has a removal temperature in the range of from 400 to 850° C., more preferably in the range of from 500 to 800° C.

Alternatively, it is preferred that the carbon-containing additive is one or more of polyacrylate, microcrystalline cellulose, corn starch, styrene, poly(methyl methacrylate-co-ethylene glycol), polymethylurea, and polymethyl methacrylate, more preferably one or more of polymethylurea and polymethyl methacrylate, more preferably polymethylurea, or more preferably polymethyl methacrylate. It is more preferred that the carbon-containing additive has a removal temperature in the range of from 150 to 550° C., more preferably in the range of from 180 to 500° C.

It is preferred that the particles of the carbon-containing additive comprised in the aqueous mixture prepared in (ii) have a Dv50 in the range of from 0.5 to 30 micrometers, preferably in the range of from 0.75 to 26 micrometers, more preferably in the range of from 1 to 18 micrometers. It is more preferred that the particles of the carbon-containing additive comprised in the aqueous mixture prepared in (ii) have a Dv50 in the range of from 1 to 2.5 micrometers, the Dv50 being determined according to Reference Example 1 herein. Alternatively, it is more preferred that the particles of the carbon-containing additive comprised in the aqueous mixture prepared in (ii) have a Dv50 in the range of from 6 to 13 micrometers, the Dv50 being determined according to Reference Example 1 herein. As a further alternative, it is preferred that the particles of the carbon-containing additive comprised in the aqueous mixture prepared in (ii) have a Dv50 in the range of from 15 to 18 micrometers, the Dv50 being determined according to Reference Example 1 herein.

It is more preferred that when the carbon-containing additive is carbon black, the particles of the carbon-containing additive comprised in the aqueous mixture prepared in (ii) have a Dv50 in the range of from 1 to 2.5 micrometers, the Dv50 being determined according to Reference Example 1 herein.

It is more preferred that when the carbon-containing additive is one or more of graphite and synthetic graphite, more preferably synthetic graphite, the particles of the carbon-containing additive comprised in the aqueous mixture prepared in (ii) have a Dv50 in the range of from 6 to 13 micrometers or in the range of from 15 to 18 micrometers, the Dv50 being determined according to Reference Example 1 herein.

It is more preferred that when the carbon-containing additive is one or more of polymethylurea and polymethyl methacrylate, more preferably polymethylurea, or more preferably polymethyl methacrylate, the particles of the carbon-containing additive comprised in the aqueous mixture prepared in (ii) have a Dv50 in the range of from 6 to 13 micrometers, more preferably in the range of from 8 to 12 micrometers, the Dv50 being determined according to Reference Example 1 herein.

In the context of the present invention, it is preferred that the particles of the carbon-containing additive comprised in the aqueous mixture prepared in (ii) have a Dv10 in the range of from 0.1 to 15 micrometers, more preferably in the range of from 0.2 to 10 micrometers, more preferably in the range of from 0.3 to 6.0 micrometers, the Dv10 being determined according to Reference Example 1 herein.

It is more preferred that when the carbon-containing additive is carbon black, the particles of the carbon-containing additive comprised in the aqueous mixture prepared in (ii) have a Dv10 in the range of from 0.3 to 1 micrometer, the Dv10 being determined according to Reference Example 1 herein. It is more preferred that when the carbon-containing additive is one or more of graphite and synthetic graphite, more preferably synthetic graphite, the particles of the carbon-containing additive comprised in the aqueous mixture prepared in (ii) have a Dv10 in the range of from 2 to 6 micrometers, the Dv10 being determined according to Reference Example 1 herein. It is more preferred that when the carbon-containing additive is one or more of polymethylurea and polymethyl methacrylate, more preferably polymethylurea and polymethyl methacrylate, or more preferably polymethyl methacrylate, the particles of the carbon-containing additive comprised in the aqueous mixture prepared in (ii) have a Dv10 in the range of from 6 to 13 micrometers, more preferably in the range of from 8 to 12 micrometers, the Dv10 being determined according to Reference Example 1 herein.

In the context of the present invention, it is preferred that the particles of the carbon-containing additive comprised in the aqueous mixture prepared in (ii) have a Dv90 in the range of from 4 to 80 micrometers, more preferably in the range of from 4.5 to 60 micrometers, more preferably in the range of from 5 to 45 micrometers, the Dv90 being determined according to Reference Example 1 herein.

It is preferred that when the carbon-containing additive is carbon black, the particles of the carbon-containing additive comprised in the aqueous mixture prepared in (ii) have a Dv90 in the range of from 4.5 to 7 micrometers, more preferably 5 to 6.5 micrometers, the Dv90 being determined according to Reference Example 1 herein.

It is more preferred that when the carbon-containing additive is one or more of graphite and synthetic graphite, more preferably synthetic graphite, the particles of the carbon-containing additive comprised in the aqueous mixture prepared in (ii) have a Dv90 in the range of from 12 to 30 micrometers or in the range of from 35 to 45 micrometers, the Dv90 being determined according to Reference Example 1 herein.

It is more preferred that when the carbon-containing additive is one or more of polymethylurea and polymethyl methacrylate, more preferably polymethylurea, or more preferably polymethyl methacrylate, the particles of the carbon-containing additive comprised in the aqueous mixture prepared in (ii) have a Dv90 in the range of from 9 to 21 micrometers, the Dv90 being determined according to Reference Example 1 herein.

In the context of the present invention, it is preferred that the particles of the carbon-containing additive comprised in the aqueous mixture prepared in (ii) are not dissolved in water, more preferably at a temperature in the range of from 10 to 40° C., more preferably in the range of from 15 to 35° C., more preferably in the range of from 17 to 25° C.

As to the aqueous mixture prepared in (ii), it is preferred that it has a temperature in the range of from 10 to 40° C., more preferably in the range of from 15 to 35° C., more preferably in the range of from 17 to 25° C.

It is preferred that the aqueous mixture prepared in (ii) is an aqueous suspension.

In the context of the present invention and without being bound by any specific theory, one objective of the use of the carbon-containing material is that upon calcination it would leave a void in the catalytic coating that improves backpressure response (reducing backpressure) of the coated wall-flow filter substrate.

As to (ii), it is preferred that it further comprises (ii.1) preparing a first mixture comprising water and a zeolitic material comprising one or more of copper and iron, more preferably copper, wherein the zeolitic material more preferably is a 8-membered ring pore zeolitic material, wherein the zeolitic material more preferably has a framework type selected from the group consisting of CHA, AEI, RTH, AFX, a mixture of two or more thereof and a mixed type of two or more thereof, more preferably selected from the group consisting of CHA and AEI, more preferably CHA;

(ii.2) more preferably milling the first mixture, more preferably until the particles of the first mixture have a Dv50 in the range of from 1 to 15 micrometers, more preferably in the range of from 2 to 10 micrometers, more preferably in the range of from 3 to 8 micrometers, the Dv50 being determined according to Reference Example 1 herein;

(ii.3) preparing a second mixture comprising water, a non-zeolitic oxidic material, more preferably as defined in the foregoing, and more preferably comprising an acid, more preferably an organic acid, more preferably tartaric acid;

(ii.4) admixing the first mixture obtained in (ii.1), more preferably in (ii.2), with the second mixture obtained in (ii.3);

(ii.5) preparing a suspension comprising water and the particles of the carbon-containing additive;

(ii.6) admixing the mixture obtained in (ii.4) and the suspension obtained in (ii.5), and more preferably adding an acid, more preferably an organic acid, more preferably acetic acid.

It is more preferred that (ii) consists of (ii.1), (ii.2), (ii.3), (ii.4), (ii.5) and (ii.6).

As to (ii), it is alternatively preferred that it further comprises (ii.1') preparing a first mixture comprising water, a source of one or more of copper and iron, more preferably a source of copper, and a zeolitic material, wherein the zeolitic material more preferably is a 8-membered ring pore zeolitic material, wherein the zeolitic material more preferably has a framework type selected from the group consisting of CHA, AEI, RTH, AFX, a mixture of two or more thereof and a mixed type of two or more thereof, more preferably selected from the group consisting of CHA and AEI, more preferably CHA;

(ii.2') more preferably milling the first mixture, more preferably until the particles of the first mixture have a Dv90 in the range of from 1 to 15 micrometers, more preferably in the range of from 2 to 10 micrometers, more preferably in the range of from 2.5 to 8 micrometers, the Dv90 being determined according to Reference Example 1 herein;

(ii.3') preparing a second mixture comprising water, a non-zeolitic oxidic material as defined in the foregoing, and more preferably comprising an acid, more preferably an organic acid, more preferably tartaric acid;

(ii.4') admixing the first mixture obtained in (ii.1'), more preferably in (ii.2'), with the second mixture obtained in (ii.3');

(ii.5') preparing a suspension comprising water and the particles of the carbon-containing additive;

(ii.6') admixing the mixture obtained in (ii.4') and the suspension obtained in (ii.5'), and more preferably adding an acid, more preferably an organic acid, more preferably acetic acid wherein (ii) more preferably consists of (ii.1'), (ii.2'), (ii.3'), (ii.4'), (ii.5') and (ii.6'). As to (ii.1'), it is preferred that it comprises (ii.1'.1) preparing a mixture comprising water and a source of one or more of copper and iron, more preferably a source of copper, wherein the source of copper more preferably is selected from the group consisting of copper acetate, copper nitrate, copper sulfate, copper formate, copper oxide, and a mixture of two or more thereof, more preferably selected from the group consisting of copper acetate, copper oxide, and a mixture of thereof, more preferably copper oxide, more preferably CuO;

(ii.1'.2) more preferably milling the mixture, more preferably until the particles of the mixture have a Dv90 in the range of from 0.5 to 20 micrometers, more preferably in the range of from 4 to 15 micrometers, more preferably in the range of from 6 to 12 micrometers the Dv90 being determined according to Reference Example 1 herein;

(ii.1'.3) optionally adding a precursor of an oxidic material, the oxidic material being as defined in the foregoing, in the mixture obtained in (ii.1'.1), more preferably in (ii.1'.2);

(ii.1'.4) preparing a mixture comprising water and the zeolitic material comprising one or more of copper and iron, more preferably copper;

(ii.1'.5) admixing the mixture obtained in (ii.1'.4) with the mixture obtained in (ii.1'.1), more preferably in (ii.1'.2), or in (ii.1'.3);

wherein (ii.1') optionally consists of (ii.1'.1), (ii.1'.2), (ii.1'.3), (ii.1'.4), and (ii.1'.5).

It is preferred that the first mixture obtained in (ii.1), or (ii.1'), more preferably (ii.2), or (ii.2'), has a solid content in the range of from 15 to 55 weight-%, more preferably in the range of from 20 to 50 weight-%, more preferably in the range of from 30 to 45 weight-%, based on the weight of the first mixture.

It is preferred that the second mixture obtained in (ii.3), or (ii.3'), has a solid content in the range of from 10 to 50 weight-%, more preferably in the range of from 15 to 45 weight-%, more preferably in the range of from 25 to 35 weight-%, based on the weight of the second mixture.

It is more preferred that the additive suspension obtained in (ii.5), or (ii.5'), has a solid content in the range of from 15 to 50 weight-%, more preferably in the range of from 20 to 45 weight-%, more preferably in the range of from 30 to 40 weight-%, based on the weight of the additive suspension.

It is more preferred that (ii.6) or (ii.6') further comprises milling the mixture, more preferably until the particles of the mixture have a Dv90 in the range of from 1 to 18 micrometers, more preferably in the range of from 4 to 15 micrometers, more preferably in the range of from 6 to 12 micrometers, the Dv90 being determined according to Reference Example 1 herein.

It is more preferred that the aqueous mixture prepared in (ii) comprising the particles of the carbon-containing additive in an amount in the range of from 2 to 40 weight-%, more preferably in the range of from 4 to 30 weight-%, more preferably in the range of from 5 to 25 weight-%, more preferably in the range of from 5.5 to 21 weight-%, based on the weight of the zeolitic material and of the non-zeolitic oxidic material in the aqueous mixture prepared in (ii).

It is preferred that from 98 to 100 weight-%, preferably from 99 to 100 weight-%, more preferably from 99.5 to 100 weight-%, of the particles of the carbon-containing additive consist of carbon atoms, or consist of carbon atoms and one or more of nitrogen atoms, hydrogen atoms and oxygen atoms.

As to disposing the mixture obtained in (ii) according to (iii), it is preferred that it is performed by spraying the mixture onto the substrate or by immersing the substrate into the mixture, more preferably by immersing the substrate into the mixture.

It is preferred that according to a first aspect of (iii), the mixture obtained in (ii) is disposed over x % of the substrate axial length from the inlet end toward the outlet end of the substrate, or from the outlet end toward the inlet end of the substrate, wherein x is in the range of from 80 to 100, more preferably in the range of from 85 to 100, more preferably in the range of from 90 to 100, more preferably in the range of from 95 to 100, more preferably in the range of from 98 to 100. It is more preferred that the mixture obtained in (ii) is disposed over the substrate axial length only from the inlet end toward the outlet end of the substrate, or only from the outlet end toward the inlet end of the substrate.

It is preferred that drying the substrate, comprising the mixture disposed thereon, according to (iii) is performed in a gas atmosphere having a temperature in the range of from 60 to 300° C., more preferably in the range of from 90 to 150° C., the gas atmosphere more preferably comprising oxygen.

It is preferred that drying the substrate comprising the mixture disposed thereon according to (iii) is performed in a gas atmosphere for a duration in the range of from 10 minutes to 4 hours, more preferably in the range of from 20 minutes to 3 hours, more preferably from 50 minutes to 2.5 hours, the gas atmosphere more preferably comprising oxygen.

It is preferred that (iii) further comprises after disposing the mixture obtained in (ii), calcining the substrate comprising the mixture disposed thereon or calcining the dried substrate comprising the mixture disposed thereon. It is more preferred that calcining according to (iii) is performed in a gas atmosphere having a temperature in the range of from 300 to 900° C., more preferably in the range of from 400 to 650° C., more preferably in the range of from 400 to 500° C., the gas atmosphere more preferably comprising oxygen.

It is more preferred that calcining according to (iii) is performed in a gas atmosphere for a duration in the range of from 0.1 to 4 hours, more preferably in the range of from 0.5 to 2.5 hours, the gas atmosphere more preferably comprising oxygen.

It is preferred that (iii) is performed in twice according to the first aspect.

It is preferred that according to a second aspect of (iii), the mixture obtained in (ii) is disposed over x1% of the substrate axial length from the inlet end toward the outlet end of the substrate, wherein x1 is in the range of from 80 to 100, more preferably in the range of from 85 to 100, more preferably in the range of from 90 to 100, more preferably in the range of from 95 to 100, more preferably in the range of from 98 to 100, and that the mixture obtained in (ii) is further disposed over x2% of the substrate axial length from the outlet end toward the inlet end of the substrate, wherein x2 is in the range of from 80 to 100, more preferably in the range of from 85 to 100, more preferably in the range of from 90 to 100, more preferably in the range of from 95 to 100, more preferably in the range of from 98 to 100. In the context of the present invention, disposing over x1% of the substrate axial length can be performed alternatively from the outlet end toward the inlet end of the substrate and disposing over x2% of the substrate axial length can be performed from the inlet end toward the outlet end. It is more preferred that drying and calcining defined for the first aspect of (iii) apply to the second aspect of (iii).

In the context of the present invention, it is preferred that calcining according to (iv) is performed in a gas atmosphere having a temperature in the range of from 520 to 950° C.

It is more preferred that when the carbon-containing additive is one or more of graphite and synthetic graphite, calcining according to (iv) is performed in a gas atmosphere having a temperature in the range of from 650° C. to 800° C.

It is more preferred that when the carbon-containing additive is one or more of carbon black, polymethylurea and polymethyl methacrylate, calcining according to (iv) is performed in a gas atmosphere having a temperature in the range of from 550 to 620° C.

It is preferred that the gas atmosphere in (iv) comprises oxygen.

It is preferred that the process of the present invention consists of (i), (ii), (iii) and (iv).

The present invention further relates to an aqueous mixture, preferably the aqueous mixture prepared in (ii) in the process of the present invention, comprising water, particles of a carbon-containing additive, and a source of a selective catalytic reduction component comprising a zeolitic material, and a source of one or more of copper and iron, wherein the particles of the carbon-containing additive contained in the aqueous mixture have a Dv50 in the range of from 0.5 to 40 micrometers, the Dv50 being determined according to Reference Example 1 herein and wherein the carbon-containing additive has a removal temperature in the range of from 120 to 900° C.

It is preferred that the particles of the carbon-containing additive are as defined in the foregoing, where the process of the present invention is described in details.

It is preferred that the source of a selective catalytic reduction component comprising a zeolitic material and the source of one or more of copper and iron are as defined in the foregoing, where the process of the present invention is described in details.

It is preferred that the aqueous mixture further comprises components as those disclosed in the foregoing where the process of the present invention is described in details.

The present invention further relates to a selective catalytic reduction catalyst, preferably the selective catalytic reduction catalyst according to the present invention, obtainable or obtained by a process according to the present invention.

The present invention further relates to a use of a selective catalytic reduction catalyst according to the present invention for the selective catalytic reduction of nitrogen oxides.

The present invention further relates to a method for selectively catalytically reducing nitrogen oxides, wherein the nitrogen oxides are comprised in an exhaust gas stream, said method comprising (1) providing the exhaust gas stream, preferably from a diesel engine or a gasoline engine, more preferably from a diesel engine;
(2) passing the exhaust gas stream provided in (1) through the catalyst according to the present invention.

The present invention further relates to an exhaust gas treatment system for treating an exhaust gas stream exiting a diesel engine or a gasoline engine, preferably a diesel engine, said system comprising a selective catalytic reduction catalyst according to the present invention, wherein the system further comprises one or more of a diesel oxidation catalyst, an ammonia oxidation catalyst, a NOx trap, one or more flow-though SCR catalysts and a particulate filter, wherein the diesel oxidation catalyst optionally contains a NOx storage functionality.

In the context of the present invention, there was also a need to provide improved selective catalytic reduction catalysts on wall-flow filter substrates for the treatment of the exhaust gas stream of a passive ignition engine exhibiting improved NOx conversion and $NH_3$ storage.

Therefore, it was a further object of the present invention to provide a selective catalytic reduction catalyst on a filter exhibiting improved NOx conversion and $NH_3$ storage.

Therefore, it was an object of the present invention to provide an improved selective catalytic reduction catalyst exhibiting improved catalytic activity as well as an improved process for preparing a selective catalytic reduction catalyst exhibiting improved catalytic activity.

II. SCR Catalyst and a Process for Preparing a SCR Catalyst (Catalytic Activity)

Surprisingly, it was found that the selective catalytic reduction (SCR) catalyst of the present invention exhibits improved catalytic activity and that the process according to the present invention permits to produce a selective catalytic reduction catalyst exhibiting improved catalytic activity.

Therefore, the present invention relates to a selective catalytic reduction catalyst comprising a porous wall-flow filter substrate comprising an inlet end, an outlet end, a substrate axial length extending between the inlet end and the outlet end, and a plurality of passages defined by porous internal walls of the porous wall-flow filter substrate, wherein the plurality of passages comprise inlet passages having an open inlet end and a closed outlet end, and outlet passages having a closed inlet end and an open outlet end, wherein the interface between the passages and the porous internal walls is defined by the surface of the porous internal walls; the catalyst further comprising (i) a first coating, comprised in the pores of the porous internal walls, said first coating comprising a first selective catalytic reduction component comprising a first zeolitic material comprising one or more of copper and iron;
(ii) a second coating, comprised in the pores of the porous internal walls and coated onto the first coating, said second coating comprising a second selective catalytic reduction component comprising a second zeolitic material comprising one or more of copper and iron;
wherein the pores of the porous internal walls comprise the first coating at a loading I(1) and the second coating at a loading I(2), wherein the loading ratio I(1):I(2) is in the range of from 3:1 to 25:1.

It is preferred that the loading ratio I(1):I(2) is in the range of from 4:1 to 23:1, more preferably in the range of from 5:1 to 21:1, more preferably in the range of from 5.5:1 to 20.5:1.

It is preferred that the first zeolitic material comprised in the first selective catalytic reduction component comprised in the first coating is a 8-membered ring pore zeolitic material. It is more preferred that said first zeolitic material preferably has a framework type selected from the group consisting of CHA, AEI, RTH, LEV, DDR, KFI, ERI, AFX, a mixture of two or more thereof and a mixed type of two or more thereof, more preferably selected from the group consisting of CHA, AEI, RTH, AFX, a mixture of two or more thereof and a mixed type of two or more thereof, more preferably selected from the group consisting of CHA and AEI, more preferably CHA.

It is preferred that said first zeolitic material has a framework structure, wherein from 95 to 100 weight-%, more preferably from 98 to 100 weight-%, more preferably from 99 to 100 weight-%, more preferably from 99.5 to 100 weight-%, of the framework structure of the first zeolitic material consist of Si, Al, and O. It is more preferred that at most 1 weight-%, preferably from 0 to 0.5 weight-%, more preferably from 0 to 0.1 weight-%, of the framework structure of the first zeolitic material consist of P It is preferred that said first zeolitic material has a molar ratio of Si to Al, calculated as molar $SiO_2:Al_2O_3$, in the range of from 2:1 to 50:1, more preferably in the range of from 2:1 to 40:1, more preferably in the range of from 5:1 to 30:1, more preferably in the range of from 10:1 to 30:1, more preferably in the range of from 14:1 to 28:1.

It is preferred that the first zeolitic material comprised in the first coating, more preferably having a framework type CHA, has a mean crystallite size of at least 0.1 micrometer, more preferably in the range of from 0.1 to 3.0 micrometers, more preferably in the range of from 0.3 to 1.5 micrometer, more preferably in the range of from 0.4 to 1.0 micrometer determined via scanning electron microscopy.

It is preferred that the first coating comprises the first zeolitic material at a loading in the range of from 0.1 to 3 $g/in^3$, more preferably in the range of from 0.5 to 2.5 $g/in^3$, more preferably in the range of from 0.75 to 2.25 $g/in^3$, more preferably in the range of from 1 to 2 $g/in^3$.

It is preferred that the first zeolitic material comprised in the first selective catalytic reduction component of the first coating comprises copper. It is more preferred that the first coating comprises copper in an amount, calculated as CuO, being in the range of from 1 to 15 weight-%, more preferably in the range of from 1.25 to 10 weight-%, more preferably in the range of from 1.5 to 7 weight-%, more preferably in the range of from 1.75 to 6 weight-%, more preferably in the range of from 2 to 5 weight-%, more preferably in the range of from 3 to 5 weight-% based on the weight of the first zeolitic material comprised in the first coating. It is more preferred that at most 0.5 weight-%, more preferably from 0 to 0.1 weight-%, more preferably from 0 to 0.01 weight-%, more preferably from 0 to 0.001 weight-%, of the first selective catalytic reduction component consist of iron. It is more preferred that from 0 to 0.01 weight-%, more preferably from 0 to 0.001 weight-%, more preferably from 0 to 0.0001 weight-%, more preferably from 0 to 0.0001 weight-%, of the first coating consist of iron.

It is more preferred that the first zeolitic material comprised in the first selective catalytic reduction component of the first coating comprises iron. It is more preferred that the first coating comprises iron in an amount, calculated as $Fe_2O_3$, being preferably in the range of from 0.5 to 14 weight-%, more preferably in the range of from 0.75 to 12 weight-%, more preferably in the range of from 1 to 9 weight-%, more preferably in the range of from 1.1 to 5 weight-% based on the weight of the first zeolitic material comprised in the first coating. It is more preferred that at most 0.5 weight-%, more preferably from 0 to 0.1 weight-%, more preferably from 0 to 0.01 weight-%, more preferably from 0 to 0.01 weight-%, of the first selective catalytic reduction component consist of copper. It is more preferred that 0 to 0.01 weight-%, more preferably from 0 to 0.001 weight-%, more preferably from 0 to 0.0001 weight-%, more preferably from 0 to 0.0001 weight-%, of the first coating consist of copper.

It is preferred that from 98 to 100 weight-%, more preferably from 98 to 100 weight-%, more preferably from 99 to 100 weight-%, more preferably from 99.5 to 100 weight-%, of the first selective catalytic reduction component consist of the first zeolitic material comprising one or more of copper and iron.

Therefore, the present invention preferably relates to a selective catalytic reduction catalyst comprising
a porous wall-flow filter substrate comprising an inlet end, an outlet end, a substrate axial length extending between the inlet end and the outlet end, and a plurality of passages defined by porous internal walls of the porous wall-flow filter substrate, wherein the plurality of passages comprise inlet passages having an open inlet end and a closed outlet end, and outlet passages having a closed inlet end and an open outlet end, wherein the interface between the passages and the porous internal walls is defined by the surface of the porous internal walls; the catalyst further comprising
(i) a first coating, comprised in the pores of the porous internal walls, said first coating comprising a first selective catalytic reduction component comprising a first zeolitic material comprising copper, wherein the first zeolitic material is a 8-membered ring pore zeolitic material, wherein the first zeolitic material more preferably has a framework type selected from the group consisting of AEI and CHA;
(ii) a second coating, comprised in the pores of the porous internal walls and coated onto the first coating, said second coating comprising a second selective catalytic reduction component comprising a second zeolitic material comprising one or more of copper and iron;
wherein the pores of the porous internal walls comprise the first coating at a loading I(1) and the second coating at a loading I(2), wherein the loading ratio I(1):I(2) is in the range of from 3:1 to 25:1, more preferably in the range of from 4:1 to 23:1, more preferably in the range of from 5:1 to 21:1, more preferably in the range of from 5.5:1 to 20.5:1.

In the context of the present invention, it is preferred that the first coating further comprises a first non-zeolitic oxidic material, wherein the first non-zeolitic oxidic material more preferably comprises one or more of alumina, titania, silica, zirconia, ceria, and iron oxide, more preferably one or more of alumina, titania and silica, more preferably one or more of alumina and silica, more preferably alumina and silica.

It is more preferred that from 95 to 100 weight-%, more preferably from 98 to 100 weight-%, more preferably from 99 to 100 weight-%, more preferably from 99.5 to 100 weight-% of the first non-zeolitic oxidic material of the first coating consist of alumina and silica. It is more preferred that the weight ratio of alumina to silica is in the range of from 10:1 to 30:1, more preferably in the range of from 12:1 to 25:1, more preferably in the range of from 14:1 to 19:1.

It is more preferred that the first coating comprises the first non-zeolitic oxidic material at a loading in the range of from 0.05 to 1 $g/in^3$, more preferably in the range of from 0.1 to 0.5 $g/in^3$.

Therefore, the present invention preferably relates to a selective catalytic reduction catalyst comprising a porous wall-flow filter substrate comprising an inlet end, an outlet end, a substrate axial length extending between the inlet end and the outlet end, and a plurality of passages defined by porous internal walls of the porous wall-flow filter substrate, wherein the plurality of passages comprise inlet passages having an open inlet end and a closed outlet end, and outlet passages having a closed inlet end and an open outlet end, wherein the interface between the passages and the porous internal walls is defined by the surface of the porous internal walls; the catalyst further comprising (i) a first coating, comprised in the pores of the porous internal walls, said first coating comprising a first selective catalytic reduction component comprising a first zeolitic material comprising copper, wherein the first zeolitic material is a 8-membered ring pore zeolitic material, wherein the first zeolitic material more preferably has a framework type selected from the group consisting of AEI and CHA, wherein the first coating further comprises a first non-zeolitic oxidic material, wherein the first non-zeolitic oxidic material more preferably comprises alumina and silica;

(ii) a second coating, comprised in the pores of the porous internal walls and coated onto the first coating, said second coating comprising a second selective catalytic reduction component comprising a second zeolitic material comprising one or more of copper and iron;

wherein the pores of the porous internal walls comprise the first coating at a loading I(1) and the second coating at a loading I(2), wherein the loading ratio I(1):I(2) is in the range of from 3:1 to 25:1, more preferably in the range of from 4:1 to 23:1, more preferably in the range of from 5:1 to 21:1, more preferably in the range of from 5.5:1 to 20.5:1.

In the context of the present invention, it is preferred that the first coating extends over x % of the substrate axial length, x being in the range of from 80 to 100, more preferably in the range of from 85 to 100, more preferably in the range of from 90 to 100, more preferably in the range of from 95 to 100, more preferably in the range of from 98 to 100. It is more preferred that the first coating extends from the inlet end toward the outlet end of the substrate or from the outlet end toward the inlet end of the substrate.

It is preferred that the first coating comprises a first coat and a second coat, wherein the first coat extends over x1% of the substrate axial length from the inlet end to the outlet end of the substrate, x1 being in the range of from 80 to 100, more preferably in the range of from 85 to 100, more preferably in the range of from 90 to 100, more preferably in the range of from 95 to 100, and wherein the second coat extends over x2% of the substrate axial length from the outlet end to the inlet end of the substrate, x2 being in the range of from 80 to 100, more preferably in the range of from 85 to 100, more preferably in the range of from 90 to 100, more preferably in the range of from 95 to 100. It is more preferred that the first coat and the second coat have preferably the same chemical composition.

It is preferred that from 0 to 0.01 weight-%, more preferably from 0 to 0.001 weight-%, more preferably from 0 to 0.0001 weight-%, more preferably from 0 to 0.00001 weight-%, of the first coating consist of platinum, more preferably of platinum, palladium and rhodium, more preferably of platinum, palladium, rhodium and iridium, more preferably of noble metals. In the context of the present invention, it is to be understood that there preferably is no platinum, more preferably no platinum, no palladium and no rhodium, more preferably no platinum, no palladium, no rhodium and no iridium, more preferably no noble metals, in the first coating or only very small amounts thereof, such as impurities.

It is preferred that from 98 to 100 weight-%, preferably from 99 to 100 weight-%, more preferably from 99.5 to 100 weight-%, more preferably from 99.9 to 100 weight-%, of the first coating consist of the first selective catalytic reduction component comprising the first zeolitic material comprising one or more of copper and iron, and preferably of the first non-zeolitic oxidic material as defined in the foregoing.

It is conceivable, or preferred, that the first coating is prepared by using particles of a carbon-containing additive as defined in the foregoing under item I or as defined in the following under this item II.

As to the second coating, it is preferred that the second zeolitic material comprised in the second selective catalytic reduction component comprised in the second coating is a 8-membered ring pore zeolitic material. It is more preferred that said second zeolitic material preferably has a framework type selected from the group consisting of CHA, AEI, RTH, LEV, DDR, KFI, ERI, AFX, a mixture of two or more thereof and a mixed type of two or more thereof, more preferably selected from the group consisting of CHA, AEI, RTH, AFX, a mixture of two or more thereof and a mixed type of two or more thereof. It is more preferred that the second zeolitic material comprised in the second selective catalytic reduction component has a framework type selected from the group consisting of CHA and AEI, more preferably CHA.

It is preferred that from 95 to 100 weight-%, more preferably from 98 to 100 weight-%, more preferably from 99 to 100 weight-%, more preferably from 99.5 to 100 weight-%, of the framework structure of the second zeolitic material consist of Si, Al, and O. It is more preferred that at most 1 weight-%, more preferably from 0 to 0.5 weight-%, more preferably from 0 to 0.1 weight-%, of the framework structure of the second zeolitic material consist of P.

It is preferred that in the framework structure of the second zeolitic material, the molar ratio of Si to Al, calculated as molar $SiO_2:Al_2O_3$, is in the range of from 2:1 to 50:1, more preferably in the range of from 2:1 to 40:1, more preferably in the range of from 5:1 to 30:1, more preferably in the range of from 10:1 to 30:1, more preferably in the range of from 14:1 to 28:1.

It is preferred that the second zeolitic material comprised in the second coating, more preferably having a framework type CHA, has a mean crystallite size of at least 0.1 micrometer, more preferably in the range of from 0.1 to 3.0 micrometers, more preferably in the range of from 0.3 to 1.5 micrometer, more preferably in the range of from 0.4 to 1.0 micrometer determined via scanning electron microscopy.

It is preferred that the second coating comprises the second zeolitic material at a loading in the range of from 0.03 to 1 $g/in^3$, more preferably in the range of from 0.04 to 0.75 $g/in^3$, more preferably in the range of from 0.05 to 0.5 $g/in^3$, more preferably in the range of from 0.06 to 0.3 $g/in^3$.

It is preferred that the second zeolitic material comprised in the second selective catalytic reduction component of the second coating comprises copper. It is more preferred that the second coating comprises copper in an amount, calculated as CuO, being in the range of from 1 to 15 weight-%, more preferably in the range of from 1.25 to 10 weight-%, more preferably in the range of from 1.5 to 7 weight-%, more preferably in the range of from 1.75 to 6 weight-%, more preferably in the range of from 2 to 5 weight-%, more preferably in the range of from 3 to 5 weight-% based on the weight of the second zeolitic material comprised in the second coating.

It is more preferred that at most 0.5 weight-%, more preferably from 0 to 0.1 weight-%, more preferably from 0 to 0.01 weight-%, more preferably from 0 to 0.001 weight-%, of the second selective catalytic reduction component consist of iron. It is more preferred that from 0 to 0.01 weight-%, more preferably from 0 to 0.001 weight-%, more preferably from 0 to 0.0001 weight-%, more preferably from 0 to 0.00001 weight-%, of the second coating consist of iron.

It is preferred that the second zeolitic material comprised in the second selective catalytic reduction component of the second coating comprises iron. It is more preferred that the second coating comprises iron in an amount, calculated as $Fe_2O_3$, being preferably in the range of from 0.5 to 14 weight-%, more preferably in the range of from 0.75 to 12 weight-%, more preferably in the range of from 1 to 9 weight-%, more preferably in the range of from 1.1 to 5 weight-% based on the weight of the second zeolitic material comprised in the second coating. It is more preferred that at most 0.5 weight-%, more preferably from 0 to 0.1 weight-%, more preferably from 0 to 0.01 weight-%, more preferably from 0 to 0.001 weight-%, of the second selective catalytic reduction component consist of copper. It is more preferred that from 0 to 0.01 weight-%, more preferably from 0 to 0.001 weight-%, more preferably from 0 to 0.0001 weight-%, more preferably from 0 to 0.00001 weight-%, of the second coating consist of copper.

It is preferred that from 98 to 100 weight-%, more preferably from 98 to 100 weight-%, more preferably from 99 to 100 weight-%, more preferably from 99.5 to 100 weight-%, of the second selective catalytic reduction component consist of the second zeolitic material comprising one or more of copper and iron.

It is preferred that the second coating further comprises a second non-zeolitic oxidic material, wherein the second non-zeolitic oxidic material comprises one or more of alumina, titania, silica, zirconia, ceria, and iron oxide, more preferably one or more of alumina, titania and silica, more preferably one or more of alumina and silica, more preferably alumina and silica.

It is more preferred that from 95 to 100 weight-%, preferably from 98 to 100 weight-%, more preferably from 99 to 100 weight-%, more preferably from 99.5 to 100 weight-% of the second non-zeolitic oxidic material of the second coating consist of alumina and silica. It is more preferred that the weight ratio of alumina to silica is preferably in the range of from 10:1 to 30:1, more preferably in the range of from 12:1 to 25:1, more preferably in the range of from 14:1 to 19:1.

It is preferred that the second coating comprises the second non-zeolitic oxidic material at a loading in the range of from 0.001 to 0.1 $g/in^3$, more preferably in the range of from 0.006 to 0.02 $g/in^3$.

It is more preferred that the second coating further comprises an oxidic material, wherein the oxidic material preferably comprises one or more of zirconia, alumina, titania, silica, and a mixed oxide comprising two or more of Zr, Al, Ti, and Si, wherein the oxidic material more preferably comprises one or more of alumina and zirconia, more preferably zirconia.

It is preferred that the second coating preferably comprises an oxidic material, more preferably an oxidic material comprising zirconia, at a loading in the range of from 0.001 to 0.05 $g/in^3$, more preferably in the range of from 0.002 to 0.015 $g/in^3$.

It is preferred that the catalyst comprises the second coating at a loading in the range of from 0.06 to 1.5 $g/in^3$, more preferably in the range of from 0.08 to 1 $g/in^3$, more preferably in the range of from 0.09 to 0.6 $g/in^3$.

It is preferred that the second coating extends over y % of the substrate axial length, y being in the range of from 80 to 100, preferably in the range of from 85 to 100, more preferably in the range of from 90 to 100, more preferably in the range of from 95 to 100, more preferably in the range of from 98 to 100; wherein the second coating extends more preferably from the outlet end toward the inlet end of the substrate or from the inlet end to the outlet end of the substrate, more preferably from the outlet end toward the inlet end of the substrate.

It is preferred that from 0 to 0.01 weight-%, more preferably from 0 to 0.001 weight-%, more preferably from 0 to 0.0001 weight-%, more preferably from 0 to 0.0001 weight-%, of the second coating consist of platinum, preferably of platinum, palladium and rhodium, more preferably of platinum, palladium, rhodium and iridium, more preferably of noble metals. In the context of the present invention, it is to be understood that there preferably is no platinum, more preferably no platinum, no palladium and no rhodium, more preferably no platinum, no palladium, no rhodium and no iridium, more preferably no noble metals, in the second coating or only very small amounts thereof, such as impurities.

It is preferred that from 98 to 100 weight-%, more preferably from 99 to 100 weight-%, more preferably from 99.5 to 100 weight-%, of the second coating consist of the second selective catalytic reduction component comprising the second zeolitic material comprising one or more of copper and iron, and preferably of the second non-zeolitic oxidic material as defined in the foregoing, and optionally of the oxidic material as defined in the foregoing.

It is preferred that the second coating is prepared by using particles of a carbon-containing additive as defined in the foregoing under item I, wherein the second coating is more preferably prepared as the selective catalytic reduction coating of the selective catalytic reduction catalyst according to the present invention and as defined under item I. It is more preferred that the particles of a carbon-containing additive are as defined in the following.

It is preferred that the first coating and the second coating are different in term of physical properties.

It is preferred that the first coating and the second coating are different in term of chemical composition. It is more preferred that the first coating and the second coating are different in term of physical properties and chemical composition.

It is preferred that the porous wall-flow filter substrate comprises, more preferably consists of, a cordierite, a silicon carbide or an aluminum titanate, more preferably a silicon carbide or an aluminum titanate, more preferably a silicon carbide.

It is preferred that the inlet passages of the porous wall-flow filter substrate have the same dimensions as the outlet passages, or are larger than the dimensions of the outlet passages, when the dimensions of the inlet passages are larger than those of the outlet passages, the porous wall-flow filter substrate has an asymmetry factor being in the range of from 1.02 to 2, more preferably in the range of from 1.05 to 1.5, more preferably in the range of from 1.1 to 1.4, more preferably in the range of from 1.2 to 1.4. It is more preferred that the inlet passages of the porous wall-flow filter substrate have dimensions larger than the dimensions of the outlet passages, and the porous wall-flow filter substrate has an asymmetry factor more preferably being in the range of from 1.02 to 2, more preferably in the range of from 1.05 to 1.5, more preferably in the range of from 1.1 to 1.4, more preferably in the range of from 1.2 to 1.4.

It is preferred that the porous wall-flow filter substrate contains in the range of from 200 to 600, preferably in the range of from 250 to 500, more preferably in the range of from 250 to 400, flow passages or cells per square inch. It is more preferred that the porous internal walls more preferably have a thickness in the range of from 0.15 to 0.50 mm, more preferably in the range of from 0.20 to 0.45 mm, more preferably in the range of from 0.25 to 0.35 mm. The cells can have cross sections that are rectangular, square, circular, oval, triangular, hexagonal, or are of other polygonal shapes.

It is preferred that the average porosity of the internal walls not comprising the first coating and the second coating is in the range of from 30 to 75%, more preferably in the range of from 40 to 73%, more preferably in the range of from 50 to 70%, more preferably in the range of from 55 to 65%, wherein the average porosity is determined according to Reference Example 4 herein.

It is preferred that from 98 to 100 weight-%, more preferably from 99 to 100 weight-%, more preferably from 99.5 to 100 weight-%, more preferably from 99.9 to 100 weight-%, of the selective catalytic reduction catalyst consist of the first coating, the second coating and the porous wall-flow filter substrate.

The present invention further relates to a process for preparing a selective catalytic reduction catalyst, preferably the selective catalytic reduction catalyst according to the present invention, the process comprising
(i) providing a porous wall-flow filter substrate comprising an inlet end, an outlet end, a substrate axial length extending between the inlet end and the outlet end, and a plurality of passages defined by porous internal walls of the porous wall-flow filter substrate, wherein the plurality of passages comprise inlet passages having an open inlet end and a closed outlet end, and outlet passages having a closed inlet end and an open outlet end, wherein the interface between the passages and the porous internal walls is defined by the surface of the porous internal walls;
(ii) preparing an aqueous mixture comprising water and a source of a first selective catalytic reduction component comprising a first zeolitic material and a source of one or more of copper and iron; disposing the obtained mixture on the surface of the internal walls of the porous substrate provided in (i), optionally drying the substrate comprising the mixture disposed thereon; and calcining the substrate comprising the mixture disposed thereon;
(iii) preparing an aqueous mixture comprising water, particles of a carbon-containing additive, and a source of a second selective catalytic reduction component comprising a second zeolitic material and a source of one or more of copper and iron, wherein the carbon-containing additive has a removal temperature in the range of from 120 to 900° C.;
(iv) disposing the mixture obtained in (iii) on the porous substrate obtained in (ii), and optionally drying the substrate comprising the mixture disposed thereon;
(v) calcining the substrate obtained in (iv) in a gas atmosphere having a temperature in the range of from 500 to 1000° C., obtaining a porous wall-flow filter substrate comprising a first coating and a second coating;

wherein the particles of the carbon-containing additive contained in the aqueous mixture prepared in (iii) have a Dv50 in the range of from 0.5 to 40 micrometers, the Dv50 being determined according to Reference Example 1 herein.

As to the porous wall-flow filter substrate provided in (i), it is preferred that its porous internal walls have an average porosity in the range of from 30 to 75%, more preferably in the range of from 40 to 73%, more preferably in the range of from 50 to 70%, more preferably in the range of from 55 to 65%, wherein the average porosity is determined according to Reference Example 4 herein.

It is preferred that the internal walls of the porous wall-flow filter substrate provided in (i) have a mean pore size in the range of from 8 to 30 micrometers, more preferably in the range of from 12 to 28 micrometers, more preferably in the range of from 15 to 25 micrometers, more preferably in the range of from 17 to 23 micrometers, wherein the mean pore size is determined according to Reference Example 4 herein.

It is more preferred that the porous wall-flow filter substrate provided in (i) comprises, preferably consists of, a cordierite, a silicon carbide or an aluminum titanate, more preferably a silicon carbide or an aluminum titanate, more preferably a silicon carbide.

As to the porous wall-flow filter provided in (i), it is preferred that it is as defined in the foregoing regarding one or more of the features relative to the cells per square inch, the asymmetry or not and the porous internal wall thickness.

As to (ii), it is preferred that it further comprises
(ii.1) preparing a first mixture comprising water and a first zeolitic material comprising one or more of copper and iron, more preferably copper;
(ii.2) more preferably milling the first mixture, more preferably until the particles of the first mixture have a Dv50 in the range of from 1 to 15 micrometers, more preferably in the range of from 2 to 10 micrometers, more preferably in the range of from 3 to 8 micrometers, the Dv50 being determined according to Reference Example 1 herein;
(ii.3) preparing a second mixture comprising water, a first non-zeolitic oxidic material as defined in the foregoing, and more preferably comprising an acid, more preferably an organic acid, more preferably tartaric acid;
(ii.4) admixing the first mixture obtained in (ii.1), more preferably in (ii.2), with the second mixture obtained in (ii.3), and more preferably adding an acid, more preferably an organic acid, more preferably acetic acid;
(ii.5) disposing the mixture obtained in (ii.4) on the surface of the internal walls of the porous substrate provided in (i), optionally drying the substrate comprising the mixture disposed thereon; and
(ii.6) calcining the substrate comprising the mixture obtained in (ii.5), more preferably in a gas atmosphere having a temperature in the range of from 300 to 500° C., more preferably in the range of from 400 to 480° C., the gas atmosphere comprising oxygen;

wherein (ii) more preferably consists of (ii.1), (ii.2), (ii.3), (ii.4), (ii.5) and (ii.6).

As to (ii.4), it is preferred that it further comprises milling the mixture, more preferably until the particles of the mixture have a Dv90 in the range of from 1 to 15 micrometers, more preferably in the range of from 2 to 10 micrometers, more preferably in the range of from 3 to 8 micrometers, the Dv90 being determined according to Reference Example 1 herein.

It is preferred that the first mixture obtained in (ii.1), more preferably (ii.2), has a solid content in the range of from 15 to 55 weight-%, more preferably in the range of from 20 to 50 weight-%, more preferably in the range of from 30 to 45 weight-%, based on the weight of the first mixture.

It is preferred that the second mixture obtained in (ii.3) has a solid content in the range of from 10 to 50 weight-%, more preferably in the range of from 15 to 45 weight-%, more preferably in the range of from 25 to 40 weight-%, based on the weight of the second mixture.

It is preferred that disposing according to (ii.5) is performed by spraying the mixture onto the substrate or by immersing the substrate into the mixture, more preferably by immersing the substrate into the mixture.

It is preferred that the mixture obtained in (ii.4) is disposed over x % of the substrate axial length in (ii.5), wherein x is in the range of from 80 to 100, more preferably in the range of from 85 to 100, more preferably in the range of from 90 to 100, more preferably in the range of from 95 to 100, more preferably in the range of from 98 to 100.

It is preferred that drying the substrate according to (ii.5) is performed in a gas atmosphere having a temperature in the range of from 60 to 300° C., more preferably in the range of from 90 to 150° C., the gas atmosphere more preferably comprising oxygen.

It is preferred that drying the substrate according to (ii.5) is performed in a gas atmosphere for a duration in the range of from 10 minutes to 4 hours, more preferably in the range of from 15 minutes to 2 hours, more preferably from 20 minutes to 1.5 hours, the gas atmosphere more preferably comprising oxygen.

Carbon-Containing Additive

It is preferred that the carbon-containing additive contained in the aqueous mixture prepared in (iii) is one or more of graphite, synthetic graphite, carbon black, graphene, diamond, fullerene, carbon nanotubes and amorphous carbon.

It is more preferred that the carbon-containing additive is one or more of carbon black, graphite and synthetic graphite, more preferably one or more of graphite and synthetic graphite, more preferably synthetic graphite.

It is preferred that the particles of the carbon-containing additive comprised in the aqueous mixture prepared in (iii) have a Dv50 in the range of from 0.5 to 30 micrometers, more preferably in the range of from 0.75 to 26 micrometers, more preferably in the range of from 1 to 18 micrometers, more preferably in the range of from 6 to 18 micrometers, the Dv50 being determined according to Reference Example 1 herein. It is more preferred that the particles of the carbon-containing additive comprised in the aqueous mixture prepared in (iii) have a Dv50 in the range of from 6 to 13 micrometers, the Dv50 being determined according to Reference Example 1 herein. Alternatively, it is more preferred that the particles of the carbon-containing additive comprised in the aqueous mixture prepared in (iii) have a Dv50 in the range of from 15 to 18 micrometers, the Dv50 being determined according to Reference Example 1 herein.

It is preferred that the particles of the carbon-containing additive comprised in the aqueous mixture prepared in (iii) have a Dv10 in the range of from 0.1 to 15 micrometers, more preferably in the range of from 1 to 10 micrometers, more preferably in the range of from 2.75 to 6.0 micrometers, the Dv10 being determined according to Reference Example 1 herein.

It is preferred that the particles of the carbon-containing additive comprised in the aqueous mixture prepared in (iii) have a Dv90 in the range of from 4 to 80 micrometers, more preferably in the range of from 8 to 60 micrometers, the Dv90 being determined according to Reference Example 1 herein. It is more preferred that the particles of the carbon-containing additive comprised in the aqueous mixture prepared in (iii) have a Dv90 in the range of from 12 to 45 micrometers, the Dv90 being determined according to Reference Example 1 herein. It is more preferred that the particles of the carbon-containing additive comprised in the aqueous mixture prepared in (iii) have a Dv90 in the range of from 12 to 30 micrometers or in the range of from 35 to 45 micrometers, the Dv90 being determined according to Reference Example 1 herein.

It is preferred that the particles of the carbon-containing additive comprised in the aqueous mixture prepared in (iii) are not dissolved in water, more preferably at a temperature in the range of from 10 to 40° C., more preferably in the range of from 15 to 35° C. It is more preferred that the particles of the carbon-containing additive comprised in the aqueous mixture prepared in (iii) are not dissolved in water at a temperature in the range of from 17 to 25° C.

It is preferred that the aqueous mixture prepared in (iii) has a temperature in the range of from 10 to 40° C., more preferably in the range of from 15 to 35° C., more preferably in the range of from 17 to 25° C.

It is preferred that the aqueous mixture prepared in (iii) is an aqueous suspension.

As to (iii), it is preferred that it further comprises
(iii.1) preparing a first mixture comprising water and a second zeolitic material comprising one or more of copper and iron, more preferably copper;
(iii.2) more preferably milling the first mixture, more preferably until the particles of the first mixture have a Dv50 in the range of from 1 to 15 micrometers, more preferably in the range of from 2 to 10 micrometers, more preferably in the range of from 3 to 8 micrometers, the Dv50 being determined according to Reference Example 1 herein;
(iii.3) preparing a second mixture comprising water, a second non-zeolitic oxidic material as defined in in the foregoing, and more preferably comprising an acid, more preferably an organic acid, more preferably tartaric acid;
(iii.4) admixing the first mixture obtained in (iii.1), more preferably in (iii.2), with the second mixture obtained in (iii.3);
(iii.5) preparing a suspension comprising water and the particles of the carbon-containing additive;
(iii.6) admixing the mixture obtained in (ii.4) and the suspension obtained in (iii.5), and more preferably adding an acid, more preferably an organic acid, more preferably acetic acid;
wherein (ii) more preferably consists of (iii.1), (iii.2), (iii.3), (iii.4), (iii.5) and (iii.6).

It is preferred that the first mixture obtained in (iii.1), more preferably (iii.2), has a solid content in the range of from 15 to 55 weight-%, more preferably in the range of from 20 to 50 weight-%, more preferably in the range of from 30 to 45 weight-%, based on the weight of the first mixture.

It is preferred that the second mixture obtained in (iii.3) has a solid content in the range of from 10 to 50 weight-%, more preferably in the range of from 15 to 45 weight-%, more preferably in the range of from 25 to 40 weight-%, based on the weight of the second mixture.

It is preferred that the suspension obtained in (iii.5) has a solid content in the range of from 15 to 50 weight-%, more preferably in the range of from 20 to 45 weight-%, more preferably in the range of from 30 to 40 weight-%, based on the weight of the suspension.

As to (iii.6), it is preferred that it further comprises milling the mixture, more preferably until the particles of the mixture have a Dv90 in the range of from 1 to 18 micrometers, more preferably in the range of from 4 to 15 micrometers, more preferably in the range of from 6 to 12 micrometers, the Dv90 being determined according to Reference Example 1 herein.

It is preferred that the aqueous mixture prepared in (iii) comprising the particles of the carbon-containing additive in an amount in the range of from 2 to 60 weight-%, more preferably in the range of from 5 to 55 weight-%, more preferably in the range of from 7 to 54 weight-%, more preferably in the range of from 9 to 51 weight-%, based on the weight of the second zeolitic material and the second non-zeolitic oxidic material in the aqueous mixture prepared in (iii).

It is preferred that the carbon-containing additive has a removal temperature in the range of from 400 to 850° C., more preferably in the range of from 500 to 800° C.

It is preferred that from 98 to 100 weight-%, more preferably from 99 to 100 weight-%, more preferably from 99.5 to 100 weight-%, of the particles of the carbon-containing additive consist of carbon atoms, or consist of carbon atoms and one or more of nitrogen atoms, hydrogen atoms and oxygen atoms. It is more preferred that from 98 to 100 weight-%, more preferably from 99 to 100 weight-%, more preferably from 99.5 to 100 weight-%, of the particles of the carbon-containing additive consist of carbon atoms.

It is preferred that disposing the mixture obtained in (iii) according to (iv) is performed by spraying the mixture onto the substrate or by immersing the substrate into the mixture, more preferably by immersing the substrate into the mixture.

It is preferred that the mixture obtained in (iii) is disposed over y % of the substrate axial length, wherein y is in the range of from 80 to 100, more preferably in the range of from 85 to 100, more preferably in the range of from 90 to 100, more preferably in the range of from 95 to 100, more preferably in the range of from 98 to 100. It is more preferred that the mixture obtained in (iii) more preferably is disposed over the substrate axial length from the outlet end toward the inlet end of the substrate.

It is preferred that drying the substrate, comprising the mixture disposed thereon, according to (iv) is performed in a gas atmosphere having a temperature in the range of from 60 to 300° C., more preferably in the range of from 90 to 150° C., the gas atmosphere more preferably comprising oxygen.

It is preferred that drying the substrate comprising the mixture disposed thereon according to (iv) is performed in a gas atmosphere for a duration in the range of from 10 minutes to 4 hours, more preferably in the range of from 20 minutes to 1.5 hours, the gas atmosphere more preferably comprising oxygen.

It is preferred that (iv), after drying, further comprises calcining the dried substrate, comprising the mixture disposed thereon, in a gas atmosphere having a temperature in the range of from 300 to 900° C., more preferably in the range of from 400 to 650° C., more preferably in the range of from 400 to 500° C., the gas atmosphere more preferably comprising oxygen.

It is preferred that calcining is performed in gas atmosphere for a duration in the range of from 0.1 to 4 hours, more preferably in the range of from 0.5 to 2.5 hours, the gas atmosphere more preferably comprising oxygen.

It is preferred that calcining according to (v) is performed in a gas atmosphere having a temperature in the range of from 520 to 950° C., more preferably in the range of from 650 to 800° C.

It is preferred that the process consists of (i), (ii), (iii), (iv) and (v).

The present invention further relates to a selective catalytic reduction catalyst, preferably the selective catalytic reduction catalyst according to the selective catalytic reduction catalyst of the present invention under II, obtainable or obtained by a process according the present invention under II.

The present invention further relates to a use of a selective catalytic reduction catalyst according to the present invention for the selective catalytic reduction of nitrogen oxides.

The present invention further relates to a method for selectively catalytically reducing nitrogen oxides, wherein the nitrogen oxides are comprised in an exhaust gas stream, said method comprising
(1) providing the exhaust gas stream, preferably from a diesel engine or a gasoline engine, more preferably a diesel engine;
(2) passing the exhaust gas stream provided in (1) through the catalyst according to the present invention.

The present invention further relates to an exhaust gas treatment system for treating an exhaust gas stream exiting a diesel engine or a gasoline engine, preferably a diesel engine, said system comprising a selective catalytic reduction catalyst according to the present invention under item II, wherein the system further comprises one or more of a diesel oxidation catalyst, an ammonia oxidation catalyst, a NOx trap, one or more flow-though SCR catalysts and a particulate filter, wherein the diesel oxidation catalyst optionally contains a NOx storage functionality.

Furthermore, in the context of the present invention, there was a further focus on the use of particles of a carbon-containing additive for preparing a catalyst. Thus, it was another object of the present invention to provide an improved process for preparing a further catalyst which permits to reduce back-pressure while exhibiting good catalytic activity.

III. Process for Preparing a Four-Way Conversion (FWC) with Poreformers (Backpressure/Catalytic Activity)

Surprisingly, it was found that the process of the present invention permits to obtain a catalyst with reduced back-pressure while exhibiting good catalytic activity. For example, as illustrated in the following, the particles of a carbon-containing additive may be used for preparing a four-way conversion catalyst.

Therefore, the present invention relates to a process for preparing a four-way conversion catalyst, the process comprising
(i) providing a porous wall-flow filter substrate comprising an inlet end, an outlet end, a substrate axial length extending between the inlet end and the outlet end, and a plurality of passages defined by porous internal walls of the porous wall-flow filter substrate, wherein the plurality of passages comprise inlet passages having an open inlet end and a closed outlet end, and outlet passages having a closed inlet end and an open outlet end, wherein the interface between the passages and the porous internal walls is defined by the surface of the porous internal walls;
(ii) preparing an aqueous mixture comprising water, particles of a carbon-containing additive, and a source of a three-way conversion coating comprising an oxygen storage component and a platinum group metal supported on a refractory metal oxide, wherein the carbon-containing additive has a removal temperature in the range of from 120 to 900° C.;

(iii) disposing the mixture obtained in (ii) on the surface of the internal walls of the porous substrate provided in (i), and optionally drying the substrate comprising the mixture disposed thereon;

(iv) calcining the substrate obtained in (iii) in a gas atmosphere having a temperature in the range of from 500 to 1000° C., obtaining a porous wall-flow filter substrate comprising a three-way conversion coating;

wherein the particles of the carbon-containing additive contained in the aqueous mixture prepared in (ii) have a Dv50 in the range of from 0.5 to 40 micrometers, the Dv50 being determined according to Reference Example 1 herein.

It is preferred that the porous internal walls of the porous wall-flow filter substrate provided in (i) have an average porosity in the range of from 30 to 75%, more preferably in the range of from 40 to 73%, more preferably in the range of from 50 to 70%, more preferably in the range of from 55 to 65%, wherein the average porosity is determined according to Reference Example 4 herein.

It is preferred that the internal walls of the porous wall-flow filter substrate provided in (i) have a mean pore size in the range of from 8 to 30 micrometers, more preferably in the range of from 12 to 28 micrometers, more preferably in the range of from 15 to 25 micrometers, more preferably in the range of from 17 to 23 micrometers, wherein the mean pore size is determined according to Reference Example 4 herein.

It is preferred that the porous wall-flow filter substrate provided in (i) comprises, more preferably consists of, a cordierite, a silicon carbide or an aluminum titanate.

Carbon-Containing Additive

It is preferred that the carbon-containing additive contained in the aqueous mixture prepared in (ii) is one or more of graphite, synthetic graphite, carbon black, graphene, diamond, fullerene, carbon nanotubes and amorphous carbon.

It is more preferred according to a first aspect that the carbon-containing additive is one or more of graphite, synthetic graphite, graphene, fullerene, carbon nanotubes and amorphous carbon, more preferably one or more of graphite, synthetic graphite and graphene, more preferably one or more of graphite and synthetic graphite.

It is more preferred according to a second aspect that the carbon-containing additive is carbon black; wherein carbon black more preferably has a BET specific surface area in the range of from 5 to 30 $m^2/g$, more preferably in the range of from 6 to 20 $m^2/g$, more preferably in the range of from 7 to 12 $m^2/g$, the BET specific surface area being determined as defined in Reference Example 2 herein.

It is preferred according to the first and second aspects that the carbon-containing additive has a removal temperature in the range of from 400 to 850° C., more preferably in the range of from 500 to 800° C.

It is preferred according a third aspect that the carbon-containing additive is one or more of polyacrylate, microcrystalline cellulose, corn starch, styrene, poly(methyl methacrylate-co-ethylene glycol), polymethylurea, and polymethyl methacrylate, more preferably one or more of polymethylurea and polymethyl methacrylate, more preferably polymethylurea, or more preferably polymethyl methacrylate. It is more preferred that the carbon-containing additive has a removal temperature in the range of from 150 to 550° C., more preferably in the range of from 180 to 500° C.

In the context of the present invention, it is preferred that the particles of the carbon-containing additive comprised in the aqueous mixture prepared in (ii) have a Dv50 in the range of from 0.5 to 30 micrometers, more preferably in the range of from 0.75 to 26 micrometers, more preferably in the range of from 1 to 18 micrometers, the Dv50 being determined according to Reference Example 1 herein. It is more preferred that the particles of the carbon-containing additive comprised in the aqueous mixture prepared in (ii) have a Dv50 in the range of from 1 to 2.5 micrometers, the Dv50 being determined according to Reference Example 1 herein. Alternatively, it is more preferred that the particles of the carbon-containing additive comprised in the aqueous mixture prepared in (ii) have a Dv50 in the range of from 6 to 13 micrometers, the Dv50 being determined according to Reference Example 1 herein. As a further alternative, it is more preferred that the particles of the carbon-containing additive comprised in the aqueous mixture prepared in (ii) have a Dv50 in the range of from 15 to 18 micrometers, the Dv50 being determined according to Reference Example 1 herein.

It is preferred that the particles of the carbon-containing additive comprised in the aqueous mixture prepared in (ii) have a Dv10 in the range of from 0.1 to 15 micrometers, more preferably in the range of from 0.2 to 10 micrometers, more preferably in the range of from 0.3 to 6.0 micrometers, the Dv10 being determined according to Reference Example 1 herein.

It is more preferred that the particles of the carbon-containing additive comprised in the aqueous mixture prepared in (ii) have a Dv90 in the range of from 4 to 80 micrometers, more preferably in the range of from 4.5 to 60 micrometers, more preferably in the range of from 5 to 45 micrometers, the Dv90 being determined according to Reference Example 1 herein.

It is preferred that the particles of the carbon-containing additive comprised in the aqueous mixture prepared in (ii) are not dissolved in water, more preferably at a temperature in the range of from 10 to 40° C., more preferably in the range of from 15 to 35° C., more preferably in the range of from 17 to 25° C.

It is preferred that the aqueous mixture prepared in (ii) has a temperature in the range of from 10 to 40° C., more preferably in the range of from 15 to 35° C., more preferably in the range of from 17 to 25° C.

It is preferred that the aqueous mixture prepared in (ii) is an aqueous suspension.

It is preferred that (ii) further comprises (ii.1) impregnating a source of the platinum group metal onto the refractory metal oxide with water, obtaining a mixture, and optionally milling the obtained mixture;

(ii.2) impregnating a source of a platinum group metal onto the oxygen storage compound, admixing the platinum group metal onto the oxygen storage component with water, obtaining a mixture, and optionally milling the obtained mixture;

(ii.3) admixing the mixture obtained in (ii.1) with the mixture obtained in (ii.2);

(ii.4) preparing a suspension comprising water and the particles of the carbon-containing additive;

(ii.5) admixing the mixture obtained in (ii.4) with the mixture obtained in (ii.3), and more preferably adding an acid, more preferably an organic acid, more preferably acetic acid;

wherein (ii) preferably consists of (ii.1), (ii.2), (ii.3), (ii.4) and (ii.5).

It is preferred that the platinum group metal supported on the oxygen storage support is one or more of platinum, palladium and rhodium.

It is preferred that the platinum group metal supported on the refractory metal oxide is one or more of platinum, palladium and rhodium.

It is preferred that the refractory metal oxide preferably comprises aluminum, more preferably comprises one or more of an aluminum oxide, a mixture of oxides comprising an aluminum oxide, and a mixed oxide comprising aluminum, wherein the mixed oxide comprising aluminum more preferably additionally comprises one or more of zirconium, cerium, lanthanum, barium, and neodymium.

It is preferred that the oxygen storage component comprises cerium, more preferably comprises one or more of a cerium oxide, a mixture of oxides comprising a cerium oxide, and a mixed oxide comprising cerium, wherein the mixed oxide comprising cerium more preferably additionally comprises one or more of zirconium, yttrium, neodymium, lanthanum, and praseodymium.

It is preferred that the mixture prepared in (ii) further comprises a source of a promotor, wherein the source of a promotor more preferably is a source of one or more of a promotor comprising zirconium, a promotor comprising barium, a promotor comprising strontium, a promotor comprising lanthanum, a promotor comprising neodymium, a promotor comprising yttrium, and a promotor comprising praseodymium.

It is preferred that the aqueous mixture prepared in (ii) comprising the particles of the carbon-containing additive in an amount in the range of from 1 to 40 weight-%, preferably in the range of from 2 to 25 weight-%, based on the weight of the refractory metal oxide and of the oxygen storage support in the aqueous mixture prepared in (ii).

It is preferred that from 98 to 100 weight-%, more preferably from 99 to 100 weight-%, more preferably from 99.5 to 100 weight-%, of the particles of the carbon-containing additive consist of carbon atoms, or consist of carbon atoms and one or more of nitrogen atoms, hydrogen atoms and oxygen atoms.

It is preferred that disposing the mixture obtained in (ii) according to (iii) is performed by spraying the mixture onto the substrate or by immersing the substrate into the mixture, more preferably by immersing the substrate into the mixture.

It is preferred that the mixture obtained in (ii) is disposed over x % of the substrate axial length, wherein x is in the range of from 80 to 100, more preferably in the range of from 85 to 100, more preferably in the range of from 90 to 100, more preferably in the range of from 95 to 100, more preferably in the range of from 98 to 100.

It is preferred that drying the substrate, comprising the mixture disposed thereon, according to (iii) is performed in a gas atmosphere having a temperature in the range of from 60 to 300° C., more preferably in the range of from 90 to 150° C., the gas atmosphere more preferably comprising oxygen.

It is preferred that (iii) further comprises after disposing the mixture obtained in (ii), calcining the substrate comprising the mixture disposed thereon or calcining the dried substrate comprising the mixture disposed thereon. It is more preferred that calcining according to (iii) is performed in a gas atmosphere having a temperature in the range of from 300 to 900° C., more preferably in the range of from 400 to 650° C., more preferably in the range of from 400 to 500° C., the gas atmosphere more preferably comprising oxygen.

It is preferred that calcining according to (iv) is performed in a gas atmosphere having a temperature in the range of from 520 to 950° C. It is more preferred that, when the carbon-containing additive is according to the first aspect, calcining according to (iv) is performed in a gas atmosphere having a temperature in the range of from 650° C. to 800° C. It is more preferred that, when the carbon-containing additive is according to the second and third aspects, calcining according to (iv) preferably is performed in a gas atmosphere having a temperature in the range of from 550 to 620° C.

It is preferred that the gas atmosphere in (iv) comprises oxygen.

In the context of the present invention, it is preferred that the process consists of (i), (ii), (iii) and (iv).

The present invention further relates to an aqueous mixture, preferably the aqueous mixture prepared in (ii), comprising particles of a carbon-containing additive, and a source of a three way conversion coating comprising an oxygen storage component and a platinum group metal supported on a refractory metal oxide, wherein the particles of the carbon-containing additive contained in the aqueous mixture have a Dv50 in the range of from 0.5 to 40 micrometers, the Dv50 being determined according to Reference Example 1 herein and wherein the carbon-containing additive has a removal temperature in the range of from 120 to 900° C., wherein preferably the particles of the carbon-containing additive are as defined in the foregoing.

The present invention further relates to a four-way conversion catalyst, obtained or obtainable by a process according to the present invention, for the treatment of an exhaust gas stream exiting from an internal combustion engine, preferably from a gasoline engine.

The present invention further relates to the use of a four-way conversion catalyst according to the present invention for the treatment of an exhaust gas stream exiting from an internal combustion engine, preferably from a gasoline engine.

The present invention further relates to a method for the treatment of an exhaust gas stream exiting from an internal combustion engine, preferably from a gasoline engine, said method comprising
(1) providing the exhaust gas stream, preferably from a gasoline engine;
(2) passing the exhaust gas stream provided in (1) through the catalyst according to the present invention.

The present invention is further illustrated by the following first set of embodiments and combinations of embodiments resulting from the dependencies and back-references as indicated. It is noted that embodiments of the first set of embodiments and the second set of embodiments may be combined. In particular, it is noted that in each instance where a range of embodiments is mentioned, for example in the context of a term such as "The selective catalytic reduction catalyst of any one of embodiments 1 to 3", every embodiment in this range is meant to be explicitly disclosed for the skilled person, i.e. the wording of this term is to be understood by the skilled person as being synonymous to "The selective catalytic reduction catalyst of any one of embodiments 1, 2 and 3". Further, it is explicitly noted that the following set of embodiments is not the set of claims determining the extent of protection, but represents a suitably structured part of the description directed to general and preferred aspects of the present invention.

1. A selective catalytic reduction catalyst comprising
   a porous wall-flow filter substrate comprising an inlet end, an outlet end, a substrate axial length extending between the inlet end and the outlet end, and a plurality of passages defined by porous internal walls of the porous wall-flow filter substrate, wherein the plurality of passages comprise inlet passages having an open inlet end and a closed outlet end, and outlet passages having a closed inlet end and an open outlet end, wherein the interface between the passages and the porous internal walls is defined by the surface of the porous internal walls;
   wherein in the pores of the porous internal walls and on the surface of the porous internal walls, the catalyst comprises a selective catalytic reduction coating comprising a selective catalytic reduction component comprising a zeolitic material comprising one or more of copper and iron;
   wherein in the pores of the porous internal walls, the selective catalytic reduction catalytic coating is present as in-wall-coating, and on the surface of the porous internal walls, the selective catalytic reduction catalytic coating is present as on-wall-coating;
   wherein in addition to said selective catalytic reduction catalytic coating, the catalyst comprises no further coating in the pores of the porous internal walls and no further coating on the surface of the porous internal walls;
   wherein the selective catalytic reduction coating is present at a total loading, I(total), which is the sum of the loading of the in-wall coating, I(in-wall coating), and the loading of the on-wall coating, I(on-wall coating), wherein in the catalyst, the loading ratio, defined as the loading of the on-wall coating, I(on-wall coating), relative to the loading of the in-wall coating, I(in-wall coating), said loading ratio being defined as I(on-wall coating):I(in-wall coating), is in the range of from 17:83 to 80:20.

2. The catalyst of embodiment 1, wherein said loading ratio, I(on-wall coating):I(in-wall coating), is in the range of from 18:82 to 70:30, preferably in the range of from 19:81 to 60:40, more preferably in the range of from 20:80 to 60:40, more preferably in the range of from 20:80 to 50:50, more preferably in the range of from 20:80 to 45:55.

3. The catalyst of embodiment 1 or 2, wherein the total loading, I(total), of the selective catalytic reduction coating in the catalyst is in the range of from 1.3 to 6 g/in$^3$, preferably in the range of from 1.5 to 5 g/in$^3$, more preferably in the range of from 1.8 to 4.5 g/in$^3$, more preferably in the range of from 2 to 4 g/in$^3$, more preferably in the range of from 2 to 3 g/in$^3$.

4. The catalyst of any one of embodiments 1 to 3, wherein the selective catalytic reduction coating extends over x % of the substrate axial length, x being in the range of from 80 to 100, preferably in the range of from 85 to 100, more preferably in the range of from 90 to 100, more preferably in the range of from 95 to 100, more preferably in the range of from 98 to 100, more preferably from the inlet end toward the outlet end of the substrate or more preferably from the outlet end toward the inlet end of the substrate.

5. The catalyst of any one of embodiments 1 to 4, wherein the selective catalytic reduction on-wall coating extends on the surface of the porous internal walls of the inlet passages, preferably wherein the selective catalytic reduction on-wall coating extends only on the surface of the porous internal walls of the inlet passages; or
   wherein the selective catalytic reduction on-wall coating extends on the surface of the porous internal walls of the outlet passages, preferably wherein the selective catalytic reduction on-wall coating extends only on the surface of the porous internal walls of the outlet passages.

6. The catalyst of any one of embodiments 1 to 4, wherein the selective catalytic reduction on-wall coating extends on the surface of the porous internal walls of the inlet passages and on the surface of the porous internal walls of the outlet passages.

7. The catalyst of any one of embodiments 1 to 6, wherein the zeolitic material comprised in the selective catalytic reduction component comprised in the selective catalytic reduction coating is a 8-membered ring pore zeolitic material, wherein said zeolitic material preferably has a framework type selected from the group consisting of CHA, AEI, RTH, LEV, DDR, KFI, ERI, AFX, a mixture of two or more thereof and a mixed type of two or more thereof, more preferably selected from the group consisting of CHA, AEI, RTH, AFX, a mixture of two or more thereof and a mixed type of two or more thereof, more preferably selected from the group consisting of CHA and AEI, more preferably CHA.

8. The catalyst of any one of embodiments 1 to 7, wherein from 95 to 100 weight-%, preferably from 98 to 100 weight-%, more preferably from 99 to 100 weight-%, more preferably from 99.5 to 100 weight-%, of the framework structure of the zeolitic material consist of Si, Al, and O, wherein in the framework structure, the molar ratio of Si to Al, calculated as molar $SiO_2:Al_2O_3$, is more preferably in the range of from 2:1 to 50:1, more preferably in the range of from 2:1 to 40:1, more preferably in the range of from 5:1 to 30:1, more preferably in the range of from 10:1 to 30:1, more preferably in the range of from 14:1 to 28:1;
   wherein more preferably at most 1 weight-%, more preferably from 0 to 0.5 weight-%, more preferably from 0 to 0.1 weight-%, of the framework structure of the zeolitic material consist of P.

9. The catalyst of any one of embodiments 1 to 8, wherein the zeolitic material comprised in the selective catalytic reduction coating, preferably having a framework type CHA, has a mean crystallite size of at least 0.1 micrometer, preferably in the range of from 0.1 to 3.0 micrometers, more preferably in the range of from 0.3 to 1.5 micrometer, more preferably in the range of from 0.4 to 1.0 micrometer determined via scanning electron microscopy.

10. The catalyst of any one of embodiments 1 to 9, wherein the selective catalytic reduction coating comprises the zeolitic material at a loading in the range of from 0.1 to 3 g/in$^3$, preferably in the range of from 0.5 to 2.75 g/in$^3$, more preferably in the range of from 1 to 2.5 g/in$^3$, more preferably in the range of from 1.5 to 2.25 g/in$^3$.

11. The catalyst of any one of embodiments 1 to 10, wherein the zeolitic material comprised in the selective catalytic reduction component of the selective catalytic reduction coating comprises copper, wherein the selective catalytic reduction coating comprises copper in an amount, calculated as CuO, being preferably in the range of from 1 to 15 weight-%, more preferably in the range of from 1.25 to 10 weight-%, more preferably in the range of from 1.5 to 7 weight-%, more preferably in the range of from 1.75 to 6 weight-%, more preferably in the range of from 2 to 5 weight-%, more preferably in the range of from 2.5 to 4.5 weight-% based on the weight of the zeolitic material comprised in the selective catalytic reduction coating; wherein preferably at most 0.5 weight-%, more preferably from 0 to 0.1 weight-%, more preferably from 0 to 0.01 weight-%, more preferably from 0 to 0.001 weight-%, of the selective catalytic reduction component consist of iron; wherein more preferably from 0 to 0.01 weight-%, more preferably from 0 to 0.001 weight-%, more preferably from 0 to 0.0001 weight-%, more preferably from 0 to 0.00001 weight-%, of the selective catalytic reduction coating consist of iron.

12. The catalyst of any one of embodiments 1 to 10, wherein the zeolitic material comprised in the selective catalytic reduction component of the selective catalytic reduction coating comprises iron, wherein the selective catalytic reduction coating comprises iron in an amount, calculated as $Fe_2O_3$, being preferably in the range of from 0.5 to 14 weight-%, more preferably in the range of from 0.75 to 12 weight-%, more preferably in the range of from 1 to 9 weight-%, more preferably in the range of from 1.1 to 5 weight-% based on the weight of the zeolitic material comprised in the selective catalytic reduction coating;
wherein more preferably at most 0.5 weight-%, more preferably from 0 to 0.1 weight-%, more preferably from 0 to 0.01 weight-%, more preferably from 0 to 0.001 weight-%, of the selective catalytic reduction component consist of copper; wherein more preferably from 0 to 0.01 weight-%, more preferably from 0 to 0.001 weight-%, more preferably from 0 to 0.0001 weight-%, more preferably from 0 to 0.00001 weight-%, of the selective catalytic reduction coating consist of copper.

13. The catalyst of any one of embodiments 1 to 12, wherein from 98 to 100 weight-%, preferably from 98 to 100 weight-%, more preferably from 99 to 100 weight-%, more preferably from 99.5 to 100 weight-%, of the selective catalytic reduction component consist of the zeolitic material comprising one or more of copper and iron.

14. The catalyst of any one of embodiments 1 to 13, wherein the selective catalytic reduction coating further comprises a non-zeolitic oxidic material, wherein the non-zeolitic oxidic material of the selective catalytic reduction coating preferably comprises one or more of alumina, titania, silica, zirconia, ceria, and iron oxide, more preferably one or more of alumina, titania and silica, more preferably one or more of alumina and silica, more preferably alumina and silica;
wherein preferably from 95 to 100 weight-%, more preferably from 98 to 100 weight-%, more preferably from 99 to 100 weight-%, more preferably from 99.5 to 100 weight-% of the non-zeolitic oxidic material of the selective catalytic reduction coating consist of alumina and silica;
wherein the weight ratio of alumina to silica more preferably is in the range of from 10:1 to 30:1, more preferably in the range of from 12:1 to 25:1, more preferably in the range of from 14:1 to 19:1;
wherein the selective catalytic reduction coating more preferably comprises the non-zeolitic oxidic material at a loading in the range of from 0.05 to 1 g/in³, preferably in the range of from 0.1 to 0.5 g/in³.

15. The catalyst of any one of embodiments 1 to 14, wherein the selective catalytic reduction coating further comprises an oxidic material, wherein the oxidic material preferably comprises one or more of zirconia, alumina, titania, silica, and a mixed oxide comprising two or more of Zr, Al, Ti, and Si, wherein the oxidic material more preferably comprises one or more of alumina and zirconia, more preferably zirconia;
wherein the selective catalytic reduction coating preferably comprises the oxidic material at a loading in the range of from 0.01 to 0.4 g/in³, more preferably in the range of from 0.02 to 0.2 g/in³.

16. The catalyst of any one of embodiments 1 to 15, wherein the porous wall-flow filter substrate comprises, preferably consists of, a cordierite, a silicon carbide or an aluminum titanate, more preferably a silicon carbide or an aluminum titanate, more preferably a silicon carbide.

17. The catalyst of any one of embodiments 1 to 16, wherein the inlet passages of the porous wall-flow filter substrate have the same dimensions as the outlet passages, or are larger than the dimensions of the outlet passages, when the dimensions of the inlet passages are larger than those of the outlet passages, the porous wall-flow filter substrate has an asymmetry factor being in the range of from 1.02 to 2, preferably in the range of from 1.05 to 1.5, more preferably in the range of from 1.1 to 1.4, more preferably in the range of from 1.2 to 1.4.

18. The catalyst of any one of embodiments 1 to 17, wherein the porous wall-flow filter substrate contains in the range of from 200 to 600, preferably in the range of from 250 to 500, more preferably in the range of from 250 to 400, cells per square inch;
wherein the porous internal walls have preferably a thickness in the range of from 0.15 to 0.50 mm, more preferably in the range of from 0.20 to 0.45 mm, more preferably in the range of from 0.25 to 0.35 mm.

19. The catalyst of any one of embodiments 1 to 18, wherein the porous internal walls of the porous wall-flow filter substrate comprising the in-wall coating have a relative average porosity in the range of from 10 to 90%, preferably in the range of from 15 to 60%, more preferably in the range of from 20 to 50%, more preferably in the range of from 25 to 45%, more preferably in the range of from 30 to 40%, wherein the relative average porosity is defined as the average porosity of the internal walls comprising the in-wall coating relative to the average porosity of the internal walls not comprising the in-wall coating, wherein the average porosity is determined according to Reference Example 4 herein;
wherein the average porosity of the internal walls not comprising the in-wall coating is preferably in the range of from 30 to 75%, more preferably in the range of from 40 to 73%, more preferably in the range of from 50 to 70%, more preferably in the range of from 55 to 65%, wherein the average porosity is determined according to Reference Example 4 herein;
wherein the total loading of the selective catalytic coating, l(total), preferably is in the range of from 1.8 to 4.5 g/in³, more preferably in the range of from 2 to 4 g/in³, more preferably in the range of from 2 to 3 g/in³.

20. The catalyst of any one of embodiments 1 to 19, wherein the porous internal walls of the porous wall-flow filter substrate comprising the in-wall coating have an average pore size in the range of from 5 to 30 micrometers, preferably in the range of from 10 to 25 micrometers, more preferably in the range of from 14 to 20 micrometers, wherein the average pore size of the internal walls comprising the in-wall coating is determined according to Reference Example 4 herein.

21. The catalyst of any one of embodiments 1 to 20, wherein the in-wall coating comprises pores, wherein at least 15%, preferably from 15 to 50%, more preferably from 20 to 30%, of the pores of the in-wall coating have a mean pore size in the range of from 0.5 to 18 micrometers, preferably in the range of from 1 to 17 micrometers, more preferably in the range of from 1 to 16 micrometers, the mean pore size being determined according to Reference Example 4 herein.
22. The catalyst of any one of embodiments 1 to 21, wherein the in-wall coating comprises pores, wherein from 3 to 12%, preferably from 5 to 11%, of the pores of the in-wall coating have a mean pore size in the range of from 0.005 micrometer to 2 micrometers, preferably in the range of from 0.01 to 1 micrometer, the mean pore size being determined according to Reference Example 4 herein.
23. The catalyst of any one of embodiments 1 to 22, wherein the selective catalytic reduction coating is prepared by using particles of a carbon-containing additive as defined in any one of embodiments 27 and 31 to 39.
24. The catalyst of any one of embodiments 1 to 23, wherein at most 0.5 weight-%, preferably from 0 to 0.1 weight-%, more preferably from 0 to 0.01 weight-%, more preferably from 0 to 0.001 weight-%, of the selective catalytic reduction coating consist of an oxygen storage material; wherein the oxygen storage material preferably comprises cerium, more preferably comprises one or more of a cerium oxide, a mixture of oxides comprising a cerium oxide, and a mixed oxide comprising cerium, wherein the mixed oxide comprising cerium more preferably additionally comprises one or more of zirconium, yttrium, neodymium, lanthanum, and praseodymium, more preferably additionally comprises one or more of zirconium, yttrium, neodymium, and lanthanum, more preferably additionally comprises zirconium, yttrium, neodymium, and lanthanum;
wherein preferably at most 0.5 weight-%, more preferably from 0 to 0.1 weight-%, more preferably from 0 to 0.01 weight-%, more preferably from 0 to 0.001 weight-%, of the selective catalytic reduction coating consist of platinum, more preferably of platinum, palladium and rhodium, more preferably of platinum, palladium, rhodium and iridium, more preferably of noble metals.
25. The catalyst of any one of embodiments 1 to 24, wherein from 98 to 100 weight-%, preferably from 99 to 100 weight-%, more preferably from 99.5 to 100 weight-%, more preferably from 99.9 to 100 weight-%, of the selective catalytic reduction coating consist of the selective catalytic reduction component, which comprises the zeolitic material and one or more of copper and iron, and preferably of the non-zeolitic oxidic material as defined in embodiment 14, and more preferably of the oxidic material as defined in embodiment 15.
26. The catalyst of any one of embodiments 1 to 25, wherein from 98 to 100 weight-%, preferably from 99 to 100 weight-%, more preferably from 99.5 to 100 weight-%, more preferably from 99.9 to 100 weight-%, of the selective catalytic reduction catalyst consist of the selective catalytic reduction coating and the porous wall-flow filter substrate.
27. A process for preparing a selective catalytic reduction catalyst, preferably the selective catalytic reduction catalyst of any one of embodiments 1 to 26, the process comprising
(i) providing a porous wall-flow filter substrate comprising an inlet end, an outlet end, a substrate axial length extending between the inlet end and the outlet end, and a plurality of passages defined by porous internal walls of the porous wall-flow filter substrate, wherein the plurality of passages comprise inlet passages having an open inlet end and a closed outlet end, and outlet passages having a closed inlet end and an open outlet end, wherein the interface between the passages and the porous internal walls is defined by the surface of the porous internal walls;
(ii) preparing an aqueous mixture comprising water, particles of a carbon-containing additive, and a source of a selective catalytic reduction component comprising a zeolitic material and a source of one or more of copper and iron, wherein the carbon-containing additive has a removal temperature in the range of from 120 to 900° C.;
(iii) disposing the mixture obtained in (ii) on the surface of the internal walls of the porous substrate provided in (i), and optionally drying the substrate comprising the mixture disposed thereon;
(iv) calcining the substrate obtained in (iii) in a gas atmosphere having a temperature in the range of from 500 to 1000° C., obtaining a porous wall-flow filter substrate comprising a selective catalytic reduction coating;
wherein the particles of the carbon-containing additive contained in the aqueous mixture prepared in (ii) have a Dv50 in the range of from 0.5 to 40 micrometers, the Dv50 being determined according to Reference Example 1 herein.
28. The process of embodiment 27, wherein the porous internal walls of the porous wall-flow filter substrate provided in (i) have an average porosity in the range of from 30 to 75%, preferably in the range of from 40 to 73%, more preferably in the range of from 50 to 70%, more preferably in the range of from 55 to 65%, wherein the average porosity is determined according to Reference Example 4 herein.
29. The process of embodiment 27 or 28, wherein the internal walls of the porous wall-flow filter substrate provided in (i) have a mean pore size in the range of from 8 to 30 micrometers, preferably in the range of from 12 to 28 micrometers, more preferably in the range of from 15 to 25 micrometers, more preferably in the range of from 17 to 23 micrometers, wherein the mean pore size is determined according to Reference Example 4 herein.
30. The process of any one of embodiments 27 to 29, wherein the porous wall-flow filter substrate provided in (i) comprises, preferably consists of, a cordierite, a silicon carbide or an aluminum titanate, more preferably a silicon carbide or an aluminum titanate, more preferably a silicon carbide.
31. The process of any one of embodiments 27 to 30, wherein the carbon-containing additive contained in the aqueous mixture prepared in (ii) is one or more of graphite, synthetic graphite, carbon black, graphene, diamond, fullerene, carbon nanotubes and amorphous carbon.
32. The process of embodiment 31, wherein the carbon-containing additive is one or more of graphite, synthetic graphite, graphene, fullerene, carbon nanotubes and amorphous carbon, more preferably one or more of graphite, synthetic graphite and graphene, more preferably one or more of graphite and synthetic graphite.
33. The process of embodiment 31, wherein the carbon-containing additive is carbon black; wherein carbon black preferably has a BET specific surface area in the range of from 5 to 30 $m^2/g$, more preferably in the range of from 6 to 20 $m^2/g$, more preferably in the range of from 7 to 12 m²/g, the BET specific surface area being determined as defined in Reference Example 2 herein.

34. The process of any one of embodiments 31 to 33, wherein the carbon-containing additive has a removal temperature in the range of from 400 to 850° C., preferably in the range of from 500 to 800° C.

35. The process of any one of embodiments 27 to 30, wherein the carbon-containing additive is one or more of polyacrylate, microcrystalline cellulose, corn starch, styrene, poly(methyl methacrylate-co-ethylene glycol), polymethylurea, and polymethyl methacrylate, more preferably one or more of polymethylurea and polymethyl methacrylate, more preferably polymethylurea, or more preferably polymethyl methacrylate.

36. The process of embodiment 35, wherein the carbon-containing additive has a removal temperature in the range of from 150 to 550° C., preferably in the range of from 180 to 500° C.

37. The process of any one of embodiments 27 to 36, wherein the particles of the carbon-containing additive comprised in the aqueous mixture prepared in (ii) have a Dv50 in the range of from 0.5 to 30 micrometers, preferably in the range of from 0.75 to 26 micrometers, more preferably in the range of from 1 to 18 micrometers, more preferably in the range of from 1 to 2.5 micrometers, or more preferably in the range of from 6 to 13 micrometers, or more preferably in the range of from 15 to 18 micrometers, the Dv50 being determined according to Reference Example 1 herein.

38. The process of any one of embodiments 27 to 37, wherein the particles of the carbon-containing additive comprised in the aqueous mixture prepared in (ii) have a Dv10 in the range of from 0.1 to 15 micrometers, preferably in the range of from 0.2 to 10 micrometers, more preferably in the range of from 0.3 to 6.0 micrometers, the Dv10 being determined according to Reference Example 1 herein.

39. The process of any one of embodiments 27 to 38, wherein the particles of the carbon-containing additive comprised in the aqueous mixture prepared in (ii) have a Dv90 in the range of from 4 to 80 micrometers, preferably in the range of from 4.5 to 60 micrometers, more preferably in the range of from 5 to 45 micrometers, the Dv90 being determined according to Reference Example 1 herein.

40. The process of any one of embodiments 27 to 39, wherein the particles of the carbon-containing additive comprised in the aqueous mixture prepared in (ii) are not dissolved in water, preferably at a temperature in the range of from 10 to 40° C., more preferably in the range of from 15 to 35° C., more preferably in the range of from 17 to 25° C.

41. The process of any one of embodiments 27 to 40, wherein the aqueous mixture prepared in (ii) has a temperature in the range of from 10 to 40° C., preferably in the range of from 15 to 35° C., more preferably in the range of from 17 to 25° C.

42. The process of any one of embodiments 27 to 41, wherein the aqueous mixture prepared in (ii) is an aqueous suspension.

43. The process of any one of embodiments 27 to 42, wherein (ii) further comprises
(ii.1) preparing a first mixture comprising water and a zeolitic material comprising one or more of copper and iron, preferably copper, wherein the zeolitic material preferably is a 8-membered ring pore zeolitic material, wherein the zeolitic material more preferably has a framework type selected from the group consisting of CHA, AEI, RTH, AFX, a mixture of two or more thereof and a mixed type of two or more thereof, more preferably selected from the group consisting of CHA and AEI, more preferably CHA;
(ii.2) preferably milling the first mixture, more preferably until the particles of the first mixture have a Dv50 in the range of from 1 to 15 micrometers, more preferably in the range of from 2 to 10 micrometers, more preferably in the range of from 3 to 8 micrometers, the Dv50 being determined according to Reference Example 1 herein;
(ii.3) preparing a second mixture comprising water, a non-zeolitic oxidic material, preferably as defined in embodiment 15 or 16, and preferably comprising an acid, more preferably an organic acid, more preferably tartaric acid;
(ii.4) admixing the first mixture obtained in (ii.1), preferably in (ii.2), with the second mixture obtained in (ii.3);
(ii.5) preparing a suspension comprising water and the particles of the carbon-containing additive;
(ii.6) admixing the mixture obtained in (ii.4) and the suspension obtained in (ii.5), and preferably adding an acid, more preferably an organic acid, more preferably acetic acid;
wherein (ii) preferably consists of (ii.1), (ii.2), (ii.3), (ii.4), (ii.5) and (ii.6).

44. The process of any one of embodiments 27 to 42, wherein (ii) further comprises
(ii.1') preparing a first mixture comprising water, a source of one or more of copper and iron, preferably a source of copper, and a zeolitic material, wherein the zeolitic material preferably is a 8-membered ring pore zeolitic material, wherein the zeolitic material more preferably has a framework type selected from the group consisting of CHA, AEI, RTH, AFX, a mixture of two or more thereof and a mixed type of two or more thereof, more preferably selected from the group consisting of CHA and AEI, more preferably CHA;
(ii.2') preferably milling the first mixture, more preferably until the particles of the first mixture have a Dv90 in the range of from 1 to 15 micrometers, more preferably in the range of from 2 to 10 micrometers, more preferably in the range of from 2.5 to 8 micrometers, the Dv90 being determined according to Reference Example 1 herein;
(ii.3') preparing a second mixture comprising water, a non-zeolitic oxidic material as defined in any one of embodiments 15 to 17, and preferably comprising an acid, more preferably an organic acid, more preferably tartaric acid;
(ii.4') admixing the first mixture obtained in (ii.1'), preferably in (ii.2'), with the second mixture obtained in (ii.3');
(ii.5') preparing a suspension comprising water and the particles of the carbon-containing additive;
(ii.6') admixing the mixture obtained in (ii.4') and the suspension obtained in (ii.5'), and preferably adding an acid, more preferably an organic acid, more preferably acetic acid wherein (ii) preferably consists of (ii.1'), (ii.2'), (ii.3'), (ii.4'), (ii.5') and (ii.6').

45. The process of embodiment 44, wherein (ii.1') comprises
(ii.1'.1) preparing a mixture comprising water and a source of one or more of copper and iron, preferably a source of copper, wherein the source of copper more preferably is selected from the group consisting of copper acetate, copper nitrate, copper sulfate, copper formate, copper oxide, and a mixture of two or more thereof, more preferably selected from the group consisting of copper acetate, copper oxide, and a mixture of thereof, more preferably copper oxide, more preferably CuO;
- (ii.1'. 2) preferably milling the mixture, more preferably until the particles of the mixture have a Dv90 in the range of from 0.5 to 20 micrometers, more preferably in the range of from 4 to 15 micrometers, more preferably in the range of from 6 to 12 micrometers the Dv90 being determined according to Reference Example 1 herein;
- (ii.1'. 3) optionally adding a precursor of an oxidic material, the oxidic material being as defined in embodiment 17, in the mixture obtained in (ii.1'. 1), preferably in (ii.1'. 2);
- (ii.1'. 4) preparing a mixture comprising water and a zeolitic material comprising one or more of copper and iron, preferably copper;
- (ii.1'. 5) admixing the mixture obtained in (ii.1'. 4) with the mixture obtained in (ii.1'. 1), preferably in (ii.1'. 2), or in (ii.1'. 3);

wherein (ii.1') optionally consists of (ii.1'. 1), (ii.1'. 2), (ii.1'. 3), (ii.1'. 4), and (ii.1'. 5).

46. The process of any one of embodiments 43 to 45, wherein the first mixture obtained in (ii.1), or (ii.1'), preferably (ii.2), or (ii.2'), has a solid content in the range of from 15 to 55 weight-%, preferably in the range of from 20 to 50 weight-%, more preferably in the range of from 30 to 45 weight-%, based on the weight of the first mixture.

47. The process of any one of embodiments 43 to 46, wherein the second mixture obtained in (ii.3), or (ii.3'), has a solid content in the range of from 10 to 50 weight-%, preferably in the range of from 15 to 45 weight-%, more preferably in the range of from 25 to 35 weight-%, based on the weight of the second mixture.

48. The process of any one of embodiments 43 to 47, wherein the additive suspension obtained in (ii.5), or (ii.5'), has a solid content in the range of from 15 to 50 weight-%, preferably in the range of from 20 to 45 weight-%, more preferably in the range of from 30 to 40 weight-%, based on the weight of the additive suspension.

49. The process of any one of embodiments 43 to 48, wherein (ii.6) or (ii.6') further comprises milling the mixture, preferably until the particles of the mixture have a Dv90 in the range of from 1 to 18 micrometers, more preferably in the range of from 4 to 15 micrometers, more preferably in the range of from 6 to 12 micrometers, the Dv90 being determined according to Reference Example 1 herein.

50. The process of any one of embodiments 43 to 49, wherein the aqueous mixture prepared in (ii) comprises the particles of the carbon-containing additive in an amount in the range of from 2 to 40 weight-%, preferably in the range of from 4 to 30 weight-%, more preferably in the range of from 5 to 25 weight-%, more preferably in the range of from 5.5 to 21 weight-%, based on the weight of the zeolitic material and of the non-zeolitic oxidic material in the aqueous mixture prepared in (ii).

51. The process of any one of embodiments 27 to 50, wherein from 98 to 100 weight-%, preferably from 99 to 100 weight-%, more preferably from 99.5 to 100 weight-%, of the particles of the carbon-containing additive consist of carbon atoms, or consist of carbon atoms and one or more of nitrogen atoms, hydrogen atoms and oxygen atoms.

52. The process of any one of embodiments 27 to 51, wherein disposing the mixture obtained in (ii) according to (iii) is performed by spraying the mixture onto the substrate or by immersing the substrate into the mixture, preferably by immersing the substrate into the mixture.

53. The process of any one of embodiments 27 to 52, wherein the mixture obtained in (ii) is disposed over x % of the substrate axial length from the inlet end toward the outlet end of the substrate, or from the outlet end toward the inlet end of the substrate, wherein x is in the range of from 80 to 100, preferably in the range of from 85 to 100, more preferably in the range of from 90 to 100, more preferably in the range of from 95 to 100, more preferably in the range of from 98 to 100;

wherein the mixture obtained in (ii) preferably is disposed over the substrate axial length only from the inlet end toward the outlet end of the substrate, or only from the outlet end toward the inlet end of the substrate.

54. The process of any one of embodiments 27 to 53, wherein drying the substrate, comprising the mixture disposed thereon, according to (iii) is performed in a gas atmosphere having a temperature in the range of from 60 to 300° C., preferably in the range of from 90 to 150° C., the gas atmosphere preferably comprising oxygen;

wherein drying the substrate comprising the mixture disposed thereon according to (iii) is preferably performed in a gas atmosphere for a duration in the range of from 10 minutes to 4 hours, more preferably in the range of from 20 minutes to 3 hours, more preferably from 50 minutes to 2.5 hours, the gas atmosphere preferably comprising oxygen.

55. The process of any one of embodiments 27 to 54, wherein (iii) further comprises after disposing the mixture obtained in (ii), calcining the substrate comprising the mixture disposed thereon or calcining the dried substrate comprising the mixture disposed thereon.

56. The process of embodiment 55, wherein calcining according to (iii) is performed in a gas atmosphere having a temperature in the range of from 300 to 900° C., preferably in the range of from 400 to 650° C., more preferably in the range of from 400 to 500° C., the gas atmosphere preferably comprising oxygen.

57. The process of embodiment 55 or 56, wherein calcining according to (iii) is performed in a gas atmosphere for a duration in the range of from 0.1 to 4 hours, preferably in the range of from 0.5 to 2.5 hours, the gas atmosphere preferably comprising oxygen.

58. The process of any one of embodiments 27 to 57, wherein (iii) is performed in twice.

59. The process of any one of embodiments 27 to 58, wherein calcining according to (iv) is performed in a gas atmosphere having a temperature in the range of from 520 to 950° C.;

wherein, when the carbon-containing additive is as defined in embodiment 32, calcining according to (iv) preferably is performed in a gas atmosphere having a temperature in the range of from 650° C. to 800° C.;

wherein, when the carbon-containing additive is as defined in embodiment 33 or 35, calcining according to (iv) preferably is performed in a gas atmosphere having a temperature in the range of from 550 to 620° C.

60. The process of any one of embodiments 27 to 59, wherein the gas atmosphere in (iv) comprises oxygen.

61. The process of any one of embodiments 27 to 60 consisting of (i), (ii), (iii) and (iv).

62. An aqueous mixture, preferably the aqueous mixture prepared in (ii), comprising water, particles of a carbon-containing additive, and a source of a selective catalytic reduction component comprising a zeolitic material, and a source of one or more of copper and iron, wherein the particles of the carbon-containing additive contained in the aqueous mixture have a Dv50 in the range of from 0.5 to 40 micrometers, the Dv50 being determined according to Reference Example 1 herein and wherein the carbon-containing additive has a removal temperature in the range of from 120 to 900° C., wherein preferably the particles of the carbon-containing additive are as defined in any one of embodiments 31 to 40.
63. A selective catalytic reduction catalyst, preferably the selective catalytic reduction catalyst according to any one of embodiments 1 to 26, obtainable or obtained by a process according to any one of embodiments 27 to 61.
64. Use of a selective catalytic reduction catalyst according to any one of embodiments 1 to 26 and 63 for the selective catalytic reduction of nitrogen oxides.
65. A method for selectively catalytically reducing nitrogen oxides, wherein the nitrogen oxides are comprised in an exhaust gas stream, said method comprising
    (1) providing the exhaust gas stream, preferably from a diesel engine or a gasoline engine, more preferably from a diesel engine;
    (2) passing the exhaust gas stream provided in (1) through the catalyst according to any one of embodiments 1 to 26 and 63.
66. An exhaust gas treatment system for treating an exhaust gas stream exiting a diesel engine or a gasoline engine, said system comprising a selective catalytic reduction catalyst according to any one of embodiments 1 to 26 and 63, wherein the system further comprises one or more of a diesel oxidation catalyst, an ammonia oxidation catalyst, a NOx trap, one or more flow-though SCR catalysts and a particulate filter, wherein the diesel oxidation catalyst optionally contains a NOx storage functionality.

The present invention is further illustrated by the following second set of embodiments and combinations of embodiments resulting from the dependencies and back-references as indicated. Embodiments of the first set of embodiments and of the second set of embodiments may be combined. In particular, it is noted that in each instance where a range of embodiments is mentioned, for example in the context of a term such as "The selective catalytic reduction catalyst of any one of embodiments 1' to 3'", every embodiment in this range is meant to be explicitly disclosed for the skilled person, i.e. the wording of this term is to be understood by the skilled person as being synonymous to "The selective catalytic reduction catalyst of any one of embodiments 1', 2' and 3'". Further, it is explicitly noted that the following set of embodiments is not the set of claims determining the extent of protection, but represents a suitably structured part of the description directed to general and preferred aspects of the present invention.

1'. A selective catalytic reduction catalyst comprising
    a porous wall-flow filter substrate comprising an inlet end, an outlet end, a substrate axial length extending between the inlet end and the outlet end, and a plurality of passages defined by porous internal walls of the porous wall-flow filter substrate, wherein the plurality of passages comprise inlet passages having an open inlet end and a closed outlet end, and outlet passages having a closed inlet end and an open outlet end, wherein the interface between the passages and the porous internal walls is defined by the surface of the porous internal walls;
    the catalyst further comprising
    (i) a first coating, comprised in the pores of the porous internal walls, said first coating comprising a first selective catalytic reduction component comprising a first zeolitic material comprising one or more of copper and iron;
    (ii) a second coating, comprised in the pores of the porous internal walls and coated onto the first coating, said second coating comprising a second selective catalytic reduction component comprising a second zeolitic material comprising one or more of copper and iron;
    wherein the pores of the porous internal walls comprise the first coating at a loading I(1) and the second coating at a loading I(2), wherein the loading ratio I(1):I(2) is in the range of from 3:1 to 25:1.
2'. The catalyst of embodiment 1', wherein the loading ratio I(1):I(2) is in the range of from 4:1 to 23:1, preferably in the range of from 5:1 to 21:1, more preferably in the range of from 5.5:1 to 20.5:1.
3'. The catalyst of embodiment 1' or 2', wherein the first zeolitic material comprised in the first selective catalytic reduction component comprised in the first coating is a 8-membered ring pore zeolitic material, wherein said first zeolitic material preferably has a framework type selected from the group consisting of CHA, AEI, RTH, LEV, DDR, KFI, ERI, AFX, a mixture of two or more thereof and a mixed type of two or more thereof, more preferably selected from the group consisting of CHA, AEI, RTH, AFX, a mixture of two or more thereof and a mixed type of two or more thereof, more preferably selected from the group consisting of CHA and AEI, more preferably CHA; wherein preferably from 95 to 100 weight-%, more preferably from 98 to 100 weight-%, more preferably from 99 to 100 weight-%, more preferably from 99.5 to 100 weight-%, of the framework structure of the first zeolitic material consist of Si, Al, and O, wherein in the framework structure, the molar ratio of Si to Al, calculated as molar $SiO_2:Al_2O_3$, is more preferably in the range of from 2:1 to 50:1, more preferably in the range of from 2:1 to 40:1, more preferably in the range of from 5:1 to 30:1, more preferably in the range of from 10:1 to 30:1, more preferably in the range of from 14:1 to 28:1.
4'. The catalyst of embodiment 3', wherein at most 1 weight-%, preferably from 0 to 0.5 weight-%, more preferably from 0 to 0.1 weight-%, of the framework structure of the first zeolitic material consist of P.
5'. The catalyst of any one of embodiments 1' to 4', wherein the first zeolitic material comprised in the first coating, preferably having a framework type CHA, has a mean crystallite size of at least 0.1 micrometer, preferably in the range of from 0.1 to 3.0 micrometers, more preferably in the range of from 0.3 to 1.5 micrometer, more preferably in the range of from 0.4 to 1.0 micrometer determined via scanning electron microscopy.
6'. The catalyst of any one of embodiments 1' to 5', wherein the first coating comprises the first zeolitic material at a loading in the range of from 0.1 to 3 $g/in^3$, preferably in the range of from 0.5 to 2.5 $g/in^3$, more preferably in the range of from 0.75 to 2.25 $g/in^3$, more preferably in the range of from 1 to 2 $g/in^3$.
7'. The catalyst of any one of embodiments 1' to 6', wherein the first zeolitic material comprised in the first selective catalytic reduction component of the first coating comprises copper, wherein the first coating comprises copper in an amount, calculated as CuO, being preferably in the range of from 1 to 15 weight-%, more preferably in the range of from 1.25 to 10 weight-%, more preferably in the range of from 1.5 to 7 weight-%, more preferably in the range of from 1.75 to 6 weight-%, more preferably in the range of from 2 to 5 weight-%, more preferably in the range of from 3 to 5 weight-% based on the weight of the first zeolitic material comprised in the first coating.
8'. The catalyst of embodiment 7', wherein at most 0.5 weight-%, preferably from 0 to 0.1 weight-%, more preferably from 0 to 0.01 weight-%, more preferably from 0 to 0.001 weight-%, of the first selective catalytic reduction component consist of iron; wherein more preferably at most 0.5 weight-%, more preferably from 0 to 0.1 weight-%, more preferably from 0 to 0.01 weight-%, more preferably from 0 to 0.001 weight-%, of the first coating consist of iron.
9'. The catalyst of any one of embodiments 1' to 6', wherein the first zeolitic material comprised in the first selective catalytic reduction component of the first coating comprises iron, wherein the first coating comprises iron in an amount, calculated as $Fe_2O_3$, being preferably in the range of from 0.5 to 14 weight-%, more preferably in the range of from 0.75 to 12 weight-%, more preferably in the range of from 1 to 9 weight-%, more preferably in the range of from 1.1 to 5 weight-% based on the weight of the first zeolitic material comprised in the first coating; wherein more preferably at most 0.5 weight-%, more preferably from 0 to 0.1 weight-%, more preferably from 0 to 0.01 weight-%, more preferably from 0 to 0.01 weight-%, of the first selective catalytic reduction component consist of copper; wherein more preferably at most 0.5 weight-%, more preferably from 0 to 0.1 weight-%, more preferably from 0 to 0.01 weight-%, more preferably from 0 to 0.001 weight-%, of the first coating consist of copper.
10'. The catalyst of any one of embodiments 1' to 9', wherein from 98 to 100 weight-%, preferably from 98 to 100 weight-%, more preferably from 99 to 100 weight-%, more preferably from 99.5 to 100 weight-%, of the first selective catalytic reduction component consist of the first zeolitic material comprising one or more of copper and iron.
11'. The catalyst of any one of embodiments 1' to 10', wherein the first coating further comprises a first non-zeolitic oxidic material, wherein the first non-zeolitic oxidic material preferably comprises one or more of alumina, titania, silica, zirconia, ceria, and iron oxide, more preferably one or more of alumina, titania and silica, more preferably one or more of alumina and silica, more preferably alumina and silica.
12'. The catalyst of embodiment 11', wherein from 95 to 100 weight-%, preferably from 98 to 100 weight-%, more preferably from 99 to 100 weight-%, more preferably from 99.5 to 100 weight-% of the first non-zeolitic oxidic material of the first coating consist of alumina and silica; wherein the weight ratio of alumina to silica is preferably in the range of from 10:1 to 30:1, more preferably in the range of from 12:1 to 25:1, more preferably in the range of from 14:1 to 19:1.
13'. The catalyst of embodiment 11' or 12', wherein the first coating comprises the first non-zeolitic oxidic material at a loading in the range of from 0.05 to 1 g/in$^3$, preferably in the range of from 0.1 to 0.5 g/in$^3$.
14'. The catalyst of any one of embodiments 1' to 13', wherein the first coating extends over x % of the substrate axial length, x being in the range of from 80 to 100, preferably in the range of from 85 to 100, more preferably in the range of from 90 to 100, more preferably in the range of from 95 to 100, more preferably in the range of from 98 to 100; wherein the first coating extends from the inlet end toward the outlet end of the substrate or from the outlet end toward the inlet end of the substrate.
15'. The catalyst of any one of embodiments 1' to 14', wherein the first coating comprises a first coat and a second coat, wherein the first coat extends over x1% of the substrate axial length from the inlet end to the outlet end of the substrate, x1 being in the range of from 80 to 100, preferably in the range of from 85 to 100, more preferably in the range of from 90 to 100, more preferably in the range of from 95 to 100, and wherein the second coat extends over x2% of the substrate axial length from the outlet end to the inlet end of the substrate, x2 being in the range of from 80 to 100, preferably in the range of from 85 to 100, more preferably in the range of from 90 to 100, more preferably in the range of from 95 to 100, wherein the first coat and the second coat have preferably the same chemical composition.
16'. The catalyst of any one of embodiments 1' to 15', wherein at most 0.5 weight-%, preferably from 0 to 0.1 weight-%, more preferably from 0 to 0.01 weight-%, more preferably from 0 to 0.001 weight-%, of the first coating consist of platinum, preferably of platinum, palladium and rhodium, more preferably of platinum, palladium, rhodium and iridium, more preferably of noble metals.
17'. The catalyst of any one of embodiments 1' to 16', wherein from 98 to 100 weight-%, preferably from 99 to 100 weight-%, more preferably from 99.5 to 100 weight-%, more preferably from 99.9 to 100 weight-%, of the first coating consist of the first selective catalytic reduction component comprising the first zeolitic material and one or more of copper and iron, and preferably of the first non-zeolitic oxidic material as defined in any one of embodiments 11' to 13'.
18'. The catalyst of any one of embodiments 1' to 17', wherein the first coating is prepared by using particles of a carbon-containing additive as defined in any one of embodiments 27 and 31 to 39 of the first set of embodiments.
19'. The catalyst of any one of embodiments 1' to 18', wherein the second zeolitic material comprised in the second selective catalytic reduction component comprised in the second coating is a 8-membered ring pore zeolitic material, wherein said second zeolitic material preferably has a framework type selected from the group consisting of CHA, AEI, RTH, LEV, DDR, KFI, ERI, AFX, a mixture of two or more thereof and a mixed type of two or more thereof, more preferably selected from the group consisting of CHA, AEI, RTH, AFX, a mixture of two or more thereof and a mixed type of two or more thereof.
20'. The catalyst of embodiment 19', wherein the second zeolitic material comprised in the second selective catalytic reduction component has a framework type selected from the group consisting of CHA and AEI, preferably CHA.
21'. The catalyst of any one of embodiments 1' to 20', wherein from 95 to 100 weight-%, preferably from 98 to 100 weight-%, more preferably from 99 to 100 weight-%, more preferably from 99.5 to 100 weight-%, of the framework structure of the second zeolitic material consist of Si, Al, and O, wherein in the framework structure, the molar ratio of Si to Al, calculated as molar $SiO_2$:$Al_2O_3$, is more preferably in the range of from 2:1 to 50:1, more preferably in the range of from 2:1 to 40:1, more preferably in the range of from 5:1 to 30:1, more preferably in the range of from 10:1 to 30:1, more preferably in the range of from 14:1 to 28:1.

22'. The catalyst of embodiment 21', wherein at most 1 weight-%, preferably from 0 to 0.5 weight-%, more preferably from 0 to 0.1 weight-%, of the framework structure of the second zeolitic material consist of P.

23'. The catalyst of any one of embodiments 1' to 22', wherein the second zeolitic material comprised in the second coating, preferably having a framework type CHA, has a mean crystallite size of at least 0.1 micrometer, preferably in the range of from 0.1 to 3.0 micrometers, more preferably in the range of from 0.3 to 1.5 micrometer, more preferably in the range of from 0.4 to 1.0 micrometer determined via scanning electron microscopy.

24'. The catalyst of any one of embodiments 1' to 23', wherein the second coating comprises the second zeolitic material at a loading in the range of from 0.03 to 1 g/in$^3$, preferably in the range of from 0.04 to 0.75 g/in$^3$, more preferably in the range of from 0.05 to 0.5 g/in$^3$, more preferably in the range of from 0.06 to 0.3 g/in$^3$.

25'. The catalyst of any one of embodiments 1' to 24', wherein the second zeolitic material comprised in the second selective catalytic reduction component of the second coating comprises copper, wherein the second coating comprises copper in an amount, calculated as CuO, being preferably in the range of from 1 to 15 weight-%, more preferably in the range of from 1.25 to 10 weight-%, more preferably in the range of from 1.5 to 7 weight-%, more preferably in the range of from 1.75 to 6 weight-%, more preferably in the range of from 2 to 5 weight-%, more preferably in the range of from 3 to 5 weight-% based on the weight of the second zeolitic material comprised in the second coating.

26'. The catalyst of embodiment 25', wherein at most 0.5 weight-%, preferably from 0 to 0.1 weight-%, more preferably from 0 to 0.01 weight-%, more preferably from 0 to 0.001 weight-%, of the second selective catalytic reduction component consist of iron; wherein more preferably more preferably from 0 to 0.01 weight-%, more preferably from 0 to 0.001 weight-%, more preferably from 0 to 0.0001 weight-%, more preferably from 0 to 0.00001 weight-%, of the second coating consist of iron.

27'. The catalyst of any one of embodiments 1' to 26', wherein the second zeolitic material comprised in the second selective catalytic reduction component of the second coating comprises iron, wherein the second coating comprises iron in an amount, calculated as Fe$_2$O$_3$, being preferably in the range of from 0.5 to 14 weight-%, more preferably in the range of from 0.75 to 12 weight-%, more preferably in the range of from 1 to 9 weight-%, more preferably in the range of from 1.1 to 5 weight-% based on the weight of the second zeolitic material comprised in the second coating;
wherein more preferably at most 0.5 weight-%, more preferably from 0 to 0.1 weight-%, more preferably from 0 to 0.01 weight-%, more preferably from 0 to 0.001 weight-%, of the second selective catalytic reduction component consist of copper; wherein more preferably from 0 to 0.01 weight-%, more preferably from 0 to 0.001 weight-%, more preferably from 0 to 0.0001 weight-%, more preferably from 0 to 0.00001 weight-%, of the second coating consist of copper.

28'. The catalyst of any one of embodiments 1' to 27', wherein from 98 to 100 weight-%, preferably from 98 to 100 weight-%, more preferably from 99 to 100 weight-%, more preferably from 99.5 to 100 weight-%, of the second selective catalytic reduction component consist of the second zeolitic material comprising one or more of copper and iron.

29'. The catalyst of any one of embodiments 1' to 28', wherein the second coating further comprises a second non-zeolitic oxidic material, wherein the second non-zeolitic oxidic material comprises one or more of alumina, titania, silica, zirconia, ceria, and iron oxide, more preferably one or more of alumina, titania and silica, more preferably one or more of alumina and silica, more preferably alumina and silica.

30'. The catalyst of embodiment 29', wherein from 95 to 100 weight-%, preferably from 98 to 100 weight-%, more preferably from 99 to 100 weight-%, more preferably from 99.5 to 100 weight-% of the second non-zeolitic oxidic material of the second coating consist of alumina and silica;
wherein the weight ratio of alumina to silica is preferably in the range of from 10:1 to 30:1, more preferably in the range of from 12:1 to 25:1, more preferably in the range of from 14:1 to 19:1.

31'. The catalyst of embodiment 29' or 30', wherein the second coating comprises the second non-zeolitic oxidic material at a loading in the range of from 0.001 to 0.1 g/in$^3$, preferably in the range of from 0.006 to 0.02 g/in$^3$.

32'. The catalyst of any one of embodiments 1' to 31', wherein the second coating further comprises an oxidic material, wherein the oxidic material preferably comprises one or more of zirconia, alumina, titania, silica, and a mixed oxide comprising two or more of Zr, Al, Ti, and Si, wherein the oxidic material more preferably comprises one or more of alumina and zirconia, more preferably zirconia;
wherein the second coating preferably comprises the oxidic material at a loading in the range of from 0.001 to 0.05 g/in$^3$, more preferably in the range of from 0.002 to 0.015 g/in$^3$.

33'. The catalyst of any one of embodiments 1' to 32', comprising the second coating at a loading in the range of from 0.06 to 1.5 g/in$^3$, preferably in the range of from 0.08 to 1 g/in$^3$, more preferably in the range of from 0.09 to 0.6 g/in$^3$. 34'. The catalyst of any one of embodiments 1' to 33', wherein the second coating extends over y % of the substrate axial length, y being in the range of from 80 to 100, preferably in the range of from 85 to 100, more preferably in the range of from 90 to 100, more preferably in the range of from 95 to 100, more preferably in the range of from 98 to 100; wherein the second coating extends more preferably from the outlet end toward the inlet end of the substrate or from the inlet end to the outlet end of the substrate, more preferably from the outlet end toward the inlet end of the substrate.

35'. The catalyst of any one of embodiments 1' to 34', wherein at most 0.5 weight-%, preferably from 0 to 0.1 weight-%, more preferably from 0 to 0.01 weight-%, more preferably from 0 to 0.001 weight-%, of the second coating consist of platinum, preferably of platinum, palladium and rhodium, more preferably of platinum, palladium, rhodium and iridium, more preferably of noble metals.

36'. The catalyst of any one of embodiments 1' to 35', wherein from 98 to 100 weight-%, preferably from 99 to 100 weight-%, more preferably from 99.5 to 100 weight-%, of the second coating consist of the second selective catalytic reduction component comprising the second zeolitic material and one or more of copper and iron, and preferably of the second non-zeolitic oxidic material as defined in any one of embodiments 29 to 31, and optionally of the oxidic material as defined in embodiment 32'.

37'. The catalyst of any one of embodiments 1' to 36', wherein the second coating is prepared by using particles of a carbon-containing additive as defined in any one of embodiments 27 and 31 to 40 of the first set of embodiments, wherein the second coating is preferably prepared as the selective catalytic reduction coating of the selective catalytic reduction catalyst according to embodiment 63.

38'. The catalyst of any one of embodiments 1' to 37', wherein the first coating and the second coating are different in term of physical properties and/or in term of chemical composition.

39'. The catalyst of any one of embodiments 1' to 38', wherein the porous wall-flow filter substrate comprises, preferably consists of, a cordierite, a silicon carbide or an aluminum titanate, more preferably a silicon carbide or an aluminum titanate, more preferably a silicon carbide.

40'. The catalyst of any one of embodiments 1' to 39', wherein the inlet passages of the porous wall-flow filter substrate have the same dimensions as the outlet passages, or are larger than the dimensions of the outlet passages, when the dimensions of the inlet passages are larger than those of the outlet passages, the porous wall-flow filter substrate has an asymmetry factor being in the range of from 1.02 to 2, preferably in the range of from 1.05 to 1.5, more preferably in the range of from 1.1 to 1.4, more preferably in the range of from 1.2 to 1.4.

41'. The catalyst of any one of embodiments 1' to 40', wherein the porous wall-flow filter substrate contains in the range of from 200 to 600, preferably in the range of from 250 to 500, more preferably in the range of from 250 to 400, cells per square inch;
wherein the porous internal walls have preferably a thickness in the range of from 0.15 to 0.50 mm, more preferably in the range of from 0.20 to 0.45 mm, more preferably in the range of from 0.25 to 0.35 mm.

42'. The catalyst of any one of embodiments 1 to 41', wherein the average porosity of the internal walls not comprising the first coating and the second coating is in the range of from 30 to 75%, preferably in the range of from 40 to 73%, more preferably in the range of from 50 to 70%, more preferably in the range of from 55 to 65%, wherein the average porosity is determined according to Reference Example 4 herein.

43'. The catalyst of any one of embodiments 1' to 42', wherein from 98 to 100 weight-%, preferably from 99 to 100 weight-%, more preferably from 99.5 to 100 weight-%, more preferably from 99.9 to 100 weight-%, of the selective catalytic reduction catalyst consist of the first coating, the second coating and the porous wall-flow filter substrate.

44'. A process for preparing a selective catalytic reduction catalyst, preferably the selective catalytic reduction catalyst according to any one of embodiments 1' to 43', the process comprising
(i) providing a porous wall-flow filter substrate comprising an inlet end, an outlet end, a substrate axial length extending between the inlet end and the outlet end, and a plurality of passages defined by porous internal walls of the porous wall-flow filter substrate, wherein the plurality of passages comprise inlet passages having an open inlet end and a closed outlet end, and outlet passages having a closed inlet end and an open outlet end, wherein the interface between the passages and the porous internal walls is defined by the surface of the porous internal walls;

(ii) preparing an aqueous mixture comprising water and a source of a first selective catalytic reduction component comprising a first zeolitic material and a source of one or more of copper and iron; disposing the obtained mixture on the surface of the internal walls of the porous substrate provided in (i), optionally drying the substrate comprising the mixture disposed thereon; and calcining the substrate comprising the mixture disposed thereon;

(iii) preparing an aqueous mixture comprising water, particles of a carbon-containing additive, and a source of a second selective catalytic reduction component comprising a second zeolitic material and a source of one or more of copper and iron, wherein the carbon-containing additive has a removal temperature in the range of from 120 to 900° C.;

(iv) disposing the mixture obtained in (iii) on the porous substrate obtained in (ii), and optionally drying the substrate comprising the mixture disposed thereon;

(v) calcining the substrate obtained in (iv) in a gas atmosphere having a temperature in the range of from 500 to 1000° C., obtaining a porous wall-flow filter substrate comprising a first coating and a second coating;
wherein the particles of the carbon-containing additive contained in the aqueous mixture prepared in (iii) have a Dv50 in the range of from 0.5 to 40 micrometers, the Dv50 being determined according to Reference Example 1 herein.

45'. The process of embodiment 44', wherein the porous internal walls of the porous wall-flow filter substrate provided in (i) have an average porosity in the range of from 30 to 75%, preferably in the range of from 40 to 73%, more preferably in the range of from 50 to 70%, more preferably in the range of from 55 to 65%, wherein the average porosity is determined according to Reference Example 4 herein.

46'. The process of embodiment 44' or 45', wherein the internal walls of the porous wall-flow filter substrate provided in (i) have a mean pore size in the range of from 8 to 30 micrometers, preferably in the range of from 12 to 28 micrometers, more preferably in the range of from 15 to 25 micrometers, more preferably in the range of from 17 to 23 micrometers, wherein the mean pore size is determined according to Reference Example 4 herein.

47'. The process of any one of embodiments 44' to 46', wherein the porous wall-flow filter substrate provided in (i) comprises, preferably consists of, a cordierite, a silicon carbide or an aluminum titanate, more preferably a silicon carbide or an aluminum titanate, more preferably a silicon carbide.

48'. The process of any one of embodiments 44' to 47', wherein (ii) further comprises
(ii.1) preparing a first mixture comprising water and a first zeolitic material comprising one or more of copper and iron, preferably copper;
(ii.2) preferably milling the first mixture, more preferably until the particles of the first mixture have a Dv50 in the range of from 1 to 15 micrometers, more preferably in the range of from 2 to 10 micrometers, more preferably in the range of from 3 to 8 micrometers, the Dv50 being determined according to Reference Example 1 herein;
(ii.3) preparing a second mixture comprising water, a first non-zeolitic oxidic material as defined in any one of embodiments 11' to 13', and preferably comprising an acid, more preferably an organic acid, more preferably tartaric acid;

(ii.4) admixing the first mixture obtained in (ii.1), preferably in (ii.2), with the second mixture obtained in (ii.3), and preferably adding an acid, more preferably an organic acid, more preferably acetic acid;

(ii.5) disposing the mixture obtained in (ii.4) on the surface of the internal walls of the porous substrate provided in (i), optionally drying the substrate comprising the mixture disposed thereon; and (ii.6) calcining the substrate comprising the mixture obtained in (ii.5), preferably in a gas atmosphere having a temperature in the range of from 300 to 500° C., more preferably in the range of from 400 to 480° C., the gas atmosphere comprising oxygen;

wherein (ii) preferably consists of (ii.1), (ii.2), (ii.3), (ii.4), (ii.5) and (ii.6).

49'. The process of embodiment 48', wherein (ii.4) further comprises milling the mixture, preferably until the particles of the mixture have a Dv90 in the range of from 1 to 15 micrometers, more preferably in the range of from 2 to 10 micrometers, more preferably in the range of from 3 to 8 micrometers, the Dv90 being determined according to Reference Example 1 herein.

50'. The process of embodiment 48' or 49', wherein the first mixture obtained in (ii.1), preferably (ii.2), has a solid content in the range of from 15 to 55 weight-%, preferably in the range of from 20 to 50 weight-%, more preferably in the range of from 30 to 45 weight-%, based on the weight of the first mixture.

51'. The process of any one of embodiments 48' to 50', wherein the second mixture obtained in (ii.3) has a solid content in the range of from 10 to 50 weight-%, preferably in the range of from 15 to 45 weight-%, more preferably in the range of from 25 to 40 weight-%, based on the weight of the second mixture.

52'. The process of any one of embodiments 48' to 51', wherein disposing according to (ii.5) is performed by spraying the mixture onto the substrate or by immersing the substrate into the mixture, preferably by immersing the substrate into the mixture.

53'. The process of any one of embodiments 48' to 52, wherein the mixture obtained in (ii.4) is disposed over x % of the substrate axial length in (ii.5), wherein x is in the range of from 80 to 100, preferably in the range of from 85 to 100, more preferably in the range of from 90 to 100, more preferably in the range of from 95 to 100, more preferably in the range of from 98 to 100.

54'. The process of any one of embodiments 48' to 53', wherein drying the substrate according to (ii.5) is performed in a gas atmosphere having a temperature in the range of from 60 to 300° C., preferably in the range of from 90 to 150° C., the gas atmosphere preferably comprising oxygen;

wherein drying the substrate according to (ii.5) is preferably performed in a gas atmosphere for a duration in the range of from 10 minutes to 4 hours, more preferably in the range of from 15 minutes to 2 hours, more preferably from 20 minutes to 1.5 hours, the gas atmosphere preferably comprising oxygen.

55'. The process of any one of embodiments 44' to 54', wherein the carbon-containing additive contained in the aqueous mixture prepared in (iii) is one or more of graphite, synthetic graphite, carbon black, graphene, diamond, fullerene, carbon nanotubes and amorphous carbon.

56'. The process of embodiment 55', wherein the carbon-containing additive is one or more of carbon black, graphite and synthetic graphite, preferably one or more of graphite and synthetic graphite, more preferably synthetic graphite.

57'. The process of any one of embodiments 44' to 56', wherein the particles of the carbon-containing additive comprised in the aqueous mixture prepared in (iii) have a Dv50 in the range of from 0.5 to 30 micrometers, preferably in the range of from 0.75 to 26 micrometers, more preferably in the range of from 1 to 18 micrometers, more preferably in the range of from 6 to 13 micrometers, or more preferably in the range of from 15 to 18 micrometers, the Dv50 being determined according to Reference Example 1 herein.

58'. The process of any one of embodiments 44' to 57', wherein the particles of the carbon-containing additive comprised in the aqueous mixture prepared in (iii) have a Dv10 in the range of from 0.1 to 15 micrometers, preferably in the range of from 1 to 10 micrometers, more preferably in the range of from 2.75 to 6.0 micrometers, the Dv10 being determined according to Reference Example 1 herein.

59'. The process of any one of embodiments 44' to 58', wherein the particles of the carbon-containing additive comprised in the aqueous mixture prepared in (iii) have a Dv90 in the range of from 4 to 80 micrometers, preferably in the range of from 8 to 60 micrometers, the Dv90 being determined according to Reference Example 1 herein.

60'. The process of embodiments 59', wherein the particles of the carbon-containing additive comprised in the aqueous mixture prepared in (iii) have a Dv90 in the range of from 12 to 45 micrometers, the Dv90 being determined according to Reference Example 1 herein.

61'. The process of any one of embodiments 44' to 60', wherein the particles of the carbon-containing additive comprised in the aqueous mixture prepared in (iii) are not dissolved in water, preferably at a temperature in the range of from 10 to 40° C., more preferably in the range of from 15 to 35° C.

62'. The process of embodiment 61', wherein the particles of the carbon-containing additive comprised in the aqueous mixture prepared in (iii) are not dissolved in water at a temperature in the range of from 17 to 25° C.

63'. The process of any one of embodiments 44' to 62', wherein the aqueous mixture prepared in (iii) has a temperature in the range of from 10 to 40° C., preferably in the range of from 15 to 35° C., more preferably in the range of from 17 to 25° C.

64'. The process of any one of embodiments 44' to 63', wherein the aqueous mixture prepared in (iii) is an aqueous suspension.

65'. The process of any one of embodiments 44' to 64', wherein (iii) further comprises (iii.1) preparing a first mixture comprising water and a second zeolitic material comprising one or more of copper and iron, preferably copper;

(iii.2) preferably milling the first mixture, more preferably until the particles of the first mixture have a Dv50 in the range of from 1 to 15 micrometers, more preferably in the range of from 2 to 10 micrometers, more preferably in the range of from 3 to 8 micrometers, the Dv50 being determined according to Reference Example 1 herein;

(iii.3) preparing a second mixture comprising water, a second non-zeolitic oxidic material as defined in any one of embodiments 29' to 31', and preferably comprising an acid, more preferably an organic acid, more preferably tartaric acid;

(iii.4) admixing the first mixture obtained in (iii.1), preferably in (iii.2), with the second mixture obtained in (iii.3);

(iii.5) preparing a suspension comprising water and the particles of the carbon-containing additive;

(iii.6) admixing the mixture obtained in (ii.4) and the suspension obtained in (iii.5), and preferably adding an acid, more preferably an organic acid, more preferably acetic acid;

wherein (ii) preferably consists of (iii.1), (iii.2), (iii.3), (iii.4), (iii.5) and (iii.6).

66'. The process of embodiment 65', wherein the first mixture obtained in (iii.1), preferably (iii.2), has a solid content in the range of from 15 to 55 weight-%, preferably in the range of from 20 to 50 weight-%, more preferably in the range of from 30 to 45 weight-%, based on the weight of the first mixture;

wherein the second mixture obtained in (iii.3) preferably has a solid content in the range of from 10 to 50 weight-%, more preferably in the range of from 15 to 45 weight-%, more preferably in the range of from 25 to 40 weight-%, based on the weight of the second mixture.

67'. The process of embodiments 65' or 66', wherein the suspension obtained in (iii.5) has a solid content in the range of from 15 to 50 weight-%, preferably in the range of from 20 to 45 weight-%, more preferably in the range of from 30 to 40 weight-%, based on the weight of the suspension.

68'. The process of any one of embodiments 65' to 67', wherein (iii.6) further comprises milling the mixture, preferably until the particles of the mixture have a Dv90 in the range of from 1 to 18 micrometers, more preferably in the range of from 4 to 15 micrometers, more preferably in the range of from 6 to 12 micrometers, the Dv90 being determined according to Reference Example 1 herein.

69'. The process of any one of embodiments 65' to 68', wherein the aqueous mixture prepared in (iii) comprising the particles of the carbon-containing additive in an amount in the range of from 2 to 60 weight-%, preferably in the range of from 5 to 55 weight-%, more preferably in the range of from 7 to 54 weight-%, more preferably in the range of from 9 to 51 weight-%, based on the weight of the second zeolitic material and the second non-zeolitic oxidic material in the aqueous mixture prepared in (iii).

70'. The process of any one of embodiments 44' to 69', wherein the carbon-containing additive has a removal temperature in the range of from 400 to 850° C., preferably in the range of from 500 to 800° C.

71'. The process of any one of embodiments 44' to 70', wherein from 98 to 100 weight-%, preferably from 99 to 100 weight-%, more preferably from 99.5 to 100 weight-%, of the particles of the carbon-containing additive consist of carbon atoms, or consist of carbon atoms and one or more of nitrogen atoms, hydrogen atoms and oxygen atoms, preferably from 98 to 100 weight-%, more preferably from 99 to 100 weight-%, more preferably from 99.5 to 100 weight-%, of the particles of the carbon-containing additive consist of carbon atoms.

72'. The process of any one of embodiments 44' to 71', wherein disposing the mixture obtained in (iii) according to (iv) is performed by spraying the mixture onto the substrate or by immersing the substrate into the mixture, preferably by immersing the substrate into the mixture.

73'. The process of any one of embodiments 44' to 72', wherein the mixture obtained in (iii) is disposed over y % of the substrate axial length, wherein y is in the range of from 80 to 100, preferably in the range of from 85 to 100, more preferably in the range of from 90 to 100, more preferably in the range of from 95 to 100, more preferably in the range of from 98 to 100;

wherein the mixture obtained in (iii) preferably is disposed over the substrate axial length from the outlet end toward the inlet end of the substrate.

74'. The process of any one of embodiments 44' to 73', wherein drying the substrate, comprising the mixture disposed thereon, according to (iv) is performed in a gas atmosphere having a temperature in the range of from 60 to 300° C., preferably in the range of from 90 to 150° C., the gas atmosphere preferably comprising oxygen;

wherein drying the substrate comprising the mixture disposed thereon according to (iv) preferably is performed in a gas atmosphere for a duration in the range of from 10 minutes to 4 hours, more preferably in the range of from 20 minutes to 1.5 hours, the gas atmosphere preferably comprising oxygen.

75'. The process of any one of embodiments 44' to 74', wherein (iv), after drying, further comprises calcining the dried substrate, comprising the mixture disposed thereon, in a gas atmosphere having a temperature in the range of from 300 to 900° C., preferably in the range of from 400 to 650° C., more preferably in the range of from 400 to 500° C., the gas atmosphere preferably comprising oxygen;

wherein calcining preferably is performed in gas atmosphere for a duration in the range of from 0.1 to 4 hours, preferably in the range of from 0.5 to 2.5 hours, the gas atmosphere preferably comprising oxygen.

76'. The process of any one of embodiments 44' to 75', wherein calcining according to (v) is performed in a gas atmosphere having a temperature in the range of from 520 to 950° C., preferably in the range of from 650 to 800° C.

77'. The process of any one of embodiments 44' to 76', consisting of (i), (ii), (iii), (iv) and (v).

78'. A selective catalytic reduction catalyst, preferably the selective catalytic reduction catalyst according to any one of embodiments 1' to 43', obtainable or obtained by a process according to any one of embodiments 44' to 77'.

79'. Use of a selective catalytic reduction catalyst according to any one of embodiments 1' to 43' and 78' for the selective catalytic reduction of nitrogen oxides.

80'. A method for selectively catalytically reducing nitrogen oxides, wherein the nitrogen oxides are comprised in an exhaust gas stream, said method comprising (1) providing the exhaust gas stream, preferably from a diesel engine;

(2) passing the exhaust gas stream provided in (1) through the catalyst according to any one of embodiments 1' to 43' and 78'.

The present invention is further illustrated by the following third set of embodiments and combinations of embodiments resulting from the dependencies and back-references as indicated. In particular, it is noted that in each instance where a range of embodiments is mentioned, for example in the context of a term such as "The process of any one of embodiments 1° to 3°, every embodiment in this range is meant to be explicitly disclosed for the skilled person, i.e. the wording of this term is to be understood by the skilled person as being synonymous to "The process of any one of embodiments 1°, 2° and 3°". Further, it is explicitly noted that the following set of embodiments is not the set of claims determining the extent of protection, but represents a suitably structured part of the description directed to general and preferred aspects of the present invention.

1°. A process for preparing a four-way conversion catalyst, the process comprising
(i) providing a porous wall-flow filter substrate comprising an inlet end, an outlet end, a substrate axial length extending between the inlet end and the outlet end, and a plurality of passages defined by porous internal walls of the porous wall-flow filter substrate, wherein the plurality of passages comprise inlet passages having an open inlet end and a closed outlet end, and outlet passages having a closed inlet end and an open outlet end, wherein the interface between the passages and the porous internal walls is defined by the surface of the porous internal walls;
(ii) preparing an aqueous mixture comprising water, particles of a carbon-containing additive, and a source of a three-way conversion coating comprising an oxygen storage component and a platinum group metal supported on a refractory metal oxide, wherein the carbon-containing additive has a removal temperature in the range of from 120 to 900° C.;
(iii) disposing the mixture obtained in (ii) on the surface of the internal walls of the porous substrate provided in (i), and optionally drying the substrate comprising the mixture disposed thereon;
(iv) calcining the substrate obtained in (iii) in a gas atmosphere having a temperature in the range of from 500 to 1000° C., obtaining a porous wall-flow filter substrate comprising a three-way conversion coating;
wherein the particles of the carbon-containing additive contained in the aqueous mixture prepared in (ii) have a Dv50 in the range of from 0.5 to 40 micrometers, the Dv50 being determined according to Reference Example 1 herein.

2°. The process of embodiment 1°, wherein the porous internal walls of the porous wall-flow filter substrate provided in (i) have an average porosity in the range of from 30 to 75%, preferably in the range of from 40 to 73%, more preferably in the range of from 50 to 70%, more preferably in the range of from 55 to 65%, wherein the average porosity is determined according to Reference Example 4 herein.

3°. The process of embodiment 1° or 2°, wherein the internal walls of the porous wall-flow filter substrate provided in (i) have a mean pore size in the range of from 8 to 30 micrometers, preferably in the range of from 12 to 28 micrometers, more preferably in the range of from 15 to 25 micrometers, more preferably in the range of from 17 to 23 micrometers, wherein the mean pore size is determined according to Reference Example 4 herein.

4°. The process of any one of embodiments 1° to 3°, wherein the porous wall-flow filter substrate provided in (i) comprises, preferably consists of, a cordierite, a silicon carbide or an aluminum titanate.

5°. The process of any one of embodiments 1° to 4°, wherein the carbon-containing additive contained in the aqueous mixture prepared in (ii) is one or more of graphite, synthetic graphite, carbon black, graphene, diamond, fullerene, carbon nanotubes and amorphous carbon.

6°. The process of embodiment 5°, wherein the carbon-containing additive is one or more of graphite, synthetic graphite, graphene, fullerene, carbon nanotubes and amorphous carbon, preferably one or more of graphite, synthetic graphite and graphene, more preferably one or more of graphite and synthetic graphite.

7°. The process of embodiment 5°, wherein the carbon-containing additive is carbon black; wherein carbon black preferably has a BET specific surface area in the range of from 5 to 30 m²/g, more preferably in the range of from 6 to 20 m²/g, more preferably in the range of from 7 to 12 m²/g, the BET specific surface area being determined as defined in Reference Example 2 herein.

8°. The process of any one of embodiments 5° to 7°, wherein the carbon-containing additive has a removal temperature in the range of from 400 to 850° C., preferably in the range of from 500 to 800° C.

9°. The process of any one of embodiments 1° to 4°, wherein the carbon-containing additive is one or more of polyacrylate, microcrystalline cellulose, corn starch, styrene, poly(methyl methacrylate-co-ethylene glycol), polymethylurea, and polymethyl methacrylate, more preferably one or more of polymethylurea and polymethyl methacrylate, more preferably polymethylurea, or more preferably polymethyl methacrylate.

10°. The process of embodiment 9°, wherein the carbon-containing additive has a removal temperature in the range of from 150 to 550° C., preferably in the range of from 180 to 500° C.

11°. The process of any one of embodiments 1° to 10°, wherein the particles of the carbon-containing additive comprised in the aqueous mixture prepared in (ii) have a Dv50 in the range of from 0.5 to 30 micrometers, preferably in the range of from 0.75 to 26 micrometers, more preferably in the range of from 1 to 18 micrometers, more preferably in the range of from 1 to 2.5 micrometers, or more preferably in the range of from 6 to 13 micrometers, or more preferably in the range of from 15 to 18 micrometers, the Dv50 being determined according to Reference Example 1 herein.

12°. The process of any one of embodiments 1° to 11°, wherein the particles of the carbon-containing additive comprised in the aqueous mixture prepared in (ii) have a Dv10 in the range of from 0.1 to 15 micrometers, preferably in the range of from 0.2 to 10 micrometers, more preferably in the range of from 0.3 to 6.0 micrometers, the Dv10 being determined according to Reference Example 1 herein.

13°. The process of any one of embodiments 10 to 12°, wherein the particles of the carbon-containing additive comprised in the aqueous mixture prepared in (ii) have a Dv90 in the range of from 4 to 80 micrometers, preferably in the range of from 4.5 to 60 micrometers, more preferably in the range of from 5 to 45 micrometers, the Dv90 being determined according to Reference Example 1 herein.

14°. The process of any one of embodiments 1° to 13°, wherein the particles of the carbon-containing additive comprised in the aqueous mixture prepared in (ii) are not dissolved in water, preferably at a temperature in the range of from 10 to 40° C., more preferably in the range of from 15 to 35° C., more preferably in the range of from 17 to 25° C.

15°. The process of any one of embodiments 1° to 14°, wherein the aqueous mixture prepared in (ii) has a temperature in the range of from 10 to 40° C., preferably in the range of from 15 to 35° C., more preferably in the range of from 17 to 25° C.

16°. The process of any one of embodiments 1° to 15°, wherein the aqueous mixture prepared in (ii) is an aqueous suspension.

17°. The process of any one of embodiments 1° to 16°, wherein (ii) further comprises
(ii.1) impregnating a source of the platinum group metal onto the refractory metal oxide with water, obtaining a mixture, and optionally milling the obtained mixture;

(ii.2) impregnating a source of a platinum group metal onto the oxygen storage compound, admixing the platinum group metal onto the oxygen storage component with water, obtaining a mixture, and optionally milling the obtained mixture;

(ii.3) admixing the mixture obtained in (ii.1) with the mixture obtained in (ii.2);

(ii.4) preparing a suspension comprising water and the particles of the carbon-containing additive;

(ii.5) admixing the mixture obtained in (ii.4) with the mixture obtained in (ii.3), and preferably adding an acid, more preferably an organic acid, more preferably acetic acid;

wherein (ii) preferably consists of (ii.1), (ii.2), (ii.3), (ii.4) and (ii.5).

18°. The process of embodiment 17°, wherein the platinum group metal supported on the oxygen storage support is one or more of platinum, palladium and rhodium.

19°. The process of any one of embodiments 1° to 18°, wherein the platinum group metal supported on the refractory metal oxide is one or more of platinum, palladium and rhodium.

20°. The process of any one of embodiments 1° to 19°, wherein the refractory metal oxide comprises aluminum, preferably comprises one or more of an aluminum oxide, a mixture of oxides comprising an aluminum oxide, and a mixed oxide comprising aluminum, wherein the mixed oxide comprising aluminum more preferably additionally comprises one or more of zirconium, cerium, lanthanum, barium, and neodymium.

21°. The process of any one of embodiments 10 to 20°, wherein the oxygen storage component comprises cerium, preferably comprises one or more of a cerium oxide, a mixture of oxides comprising a cerium oxide, and a mixed oxide comprising cerium, wherein the mixed oxide comprising cerium preferably additionally comprises one or more of zirconium, yttrium, neodymium, lanthanum, and praseodymium.

22°. The process of any one of embodiments 1° to 21°, wherein the mixture prepared in (ii) further comprises a source of a promotor, wherein the source of a promotor preferably is a source of one or more of a promotor comprising zirconium, a promotor comprising barium, a promotor comprising strontium, a promotor comprising lanthanum, a promotor comprising neodymium, a promotor comprising yttrium, and a promotor comprising praseodymium.

23°. The process of any one of embodiments 1° to 22°, wherein the aqueous mixture prepared in (ii) comprises the particles of the carbon-containing additive in an amount in the range of from 1 to 40 weight-%, preferably in the range of from 2 to 25 weight-%, based on the weight of the refractory metal oxide and of the oxygen storage support in the aqueous mixture prepared in (ii).

24°. The process of any one of embodiments 1° to 23°, wherein from 98 to 100 weight-%, preferably from 99 to 100 weight-%, more preferably from 99.5 to 100 weight-%, of the particles of the carbon-containing additive consist of carbon atoms, or consist of carbon atoms and one or more of nitrogen atoms, hydrogen atoms and oxygen atoms.

25°. The process of any one of embodiments 10 to 24°, wherein disposing the mixture obtained in (ii) according to (iii) is performed by spraying the mixture onto the substrate or by immersing the substrate into the mixture, preferably by immersing the substrate into the mixture.

26°. The process of any one of embodiments 1° to 25°, wherein the mixture obtained in (ii) is disposed over x % of the substrate axial length, wherein x is in the range of from 80 to 100, preferably in the range of from 85 to 100, more preferably in the range of from 90 to 100, more preferably in the range of from 95 to 100, more preferably in the range of from 98 to 100.

27°. The process of any one of embodiments 10 to 26°, wherein drying the substrate, comprising the mixture disposed thereon, according to (iii) is performed in a gas atmosphere having a temperature in the range of from 60 to 300° C., preferably in the range of from 90 to 150° C., the gas atmosphere preferably comprising oxygen.

28°. The process of any one of embodiments 1° to 27°, wherein (iii) further comprises after disposing the mixture obtained in (ii), calcining the substrate comprising the mixture disposed thereon or calcining the dried substrate comprising the mixture disposed thereon.

29°. The process of embodiment 28°, wherein calcining according to (iii) is performed in a gas atmosphere having a temperature in the range of from 300 to 900° C., preferably in the range of from 400 to 650° C., more preferably in the range of from 400 to 500° C., the gas atmosphere preferably comprising oxygen.

30°. The process of any one of embodiments 1° to 29°, wherein calcining according to (iv) is performed in a gas atmosphere having a temperature in the range of from 520 to 950° C.;
wherein, when the carbon-containing additive is as defined in embodiment 6°, calcining according to (iv) preferably is performed in a gas atmosphere having a temperature in the range of from 650° C. to 800° C.;
wherein, when the carbon-containing additive is as defined in embodiment 7° or 9°, calcining according to (iv) preferably is performed in a gas atmosphere having a temperature in the range of from 550 to 620° C.

31°. The process of any one of embodiments 1° to 30°, wherein the gas atmosphere in (iv) comprises oxygen.

32°. The process of any one of embodiments 1° to 31° consisting of (i), (ii), (iii) and (iv).

33°. An aqueous mixture, preferably the aqueous mixture prepared in (ii), comprising particles of a carbon-containing additive, and a source of a three way conversion coating comprising an oxygen storage component and a platinum group metal supported on a refractory metal oxide, wherein the particles of the carbon-containing additive contained in the aqueous mixture have a Dv50 in the range of from 0.5 to 40 micrometers, the Dv50 being determined according to Reference Example 1 herein and wherein the carbon-containing additive has a removal temperature in the range of from 120 to 900° C., wherein preferably the particles of the carbon-containing additive are as defined in any one of embodiments 5° to 14°.

34°. A four-way conversion catalyst, obtained or obtainable by a process according to any one of embodiments 1° to 32°, for the treatment of an exhaust gas stream exiting from an internal combustion engine, preferably from a gasoline engine.

35°. Use of a four-way conversion catalyst according to embodiment 34° for the treatment of an exhaust gas stream exiting from an internal combustion engine, preferably from a gasoline engine.

36°. A method for the treatment of an exhaust gas stream exiting from an internal combustion engine, preferably from a gasoline engine, said method comprising
(1) providing the exhaust gas stream, preferably from a gasoline engine;

(2) passing the exhaust gas stream provided in (1) through the catalyst according to embodiment 34°.

In the context of the present invention, a term "X is one or more of A, B and C", wherein X is a given feature and each of A, B and C stands for specific realization of said feature, is to be understood as disclosing that X is either A, or B, or C, or A and B, or A and C, or B and C, or A and B and C. In this regard, it is noted that the skilled person is capable of transfer to above abstract term to a concrete example, e.g. where X is a chemical element and A, B and C are concrete elements such as Li, Na, and K, or X is a temperature and A, B and C are concrete temperatures such as 10° C., 20° C., and 30° C. In this regard, it is further noted that the skilled person is capable of extending the above term to less specific realizations of said feature, e.g. 10 "X is one or more of A and B" disclosing that X is either A, or B, or A and B, or to more specific realizations of said feature, e.g. "X is one or more of A, B, C and D", disclosing that X is either A, or B, or C, or D, or A and B, or A and C, or A and D, or B and C, or B and D, or C and D, or A and B and C, or A and B and D, or B and C and D, or A and B and C and D.

Further, in the context of the present invention, the term "the surface of the internal walls" is to be understood as the "naked" or "bare" or "blank" surface of the walls, i.e. the surface of the walls in an untreated state which consists—apart from any unavoidable impurities with which the surface may be contaminated—of the material of the walls.

Furthermore, in the context of the present invention, the term "removal temperature" is to be understood as the temperature at which at least 95 weight-% of the carbon-containing additive is removed/burnt off, preferably the temperature at which from 97 to 100 weight-% of the carbon-containing additive, more preferably from 98 to 100 weight-% of the carbon-containing additive is removed/burnt off. Thus, according to the present invention, this means that at most 5 weight-%, preferably from 0 to 3 weight-%, more preferably from 0 to 2 weight-%, of the carbon-containing additive, used in the process of the present invention, is present in the final catalyst according to the present invention.

Further, in the context of the present invention, when discussing "a removal temperature in the range of from 120 to 900° C.", the removal of the carbon-containing additive is performed by heating (drying or calcining) at temperatures in the range of from 120 to 900° C., preferably at temperature in the range of from 150 to 850° C., more preferably at a temperature in the range of from 150 to 550° C., more preferably at a temperature in the range of from 180 to 500° C., or more preferably at a temperature in the range of from 400 to 850° C., more preferably in the range of from 500 to 800° C. In the present case, this heating is the calcining step (iv) of the process according to the present invention. Preferably, the duration of calcining is defined as in the embodiments of the present invention. For example, calcination can be performed for a duration in the range of from 6 minutes to 4 hours, preferably in the range of 20 minutes to 2.5 hours. In the context of the present invention, the (air) temperatures are expressed under 1 atm in air.

Further, in the context of the present invention, the terms "in-wall coating" and "selective catalytic reduction catalyst in-wall coating" are used interchangeably and the terms "on-wall coating" and "selective catalytic reduction catalyst on-wall coating" are used interchangeably.

Further, in the context of the present invention, it is noted that the determination of the ratio of the loading of the on-wall coating to the loading of the in-wall coating, for example disclosed in embodiments and the claims (such as claim 1 of the present invention), is performed as defined in Reference Example 5 herein. Indeed, the amount/loading of each of the in-wall and on-wall coatings is determined via quantitative evaluation based on SEM images (size and resolution as in FIG. 4b for example). Such techniques are well-known in the art.

Further, in the context of the present invention, the expression "asymmetry factor is X" means for the skilled person that the dimensions (or cross sections) of the inlet passages of the porous wall-flow filter substrate are equal to X times the dimensions (or cross sections) of the outlet passages of the porous wall-flow filter. Thus, if the asymmetry factor is of 1.2, this means that the dimensions (or cross sections) of the inlet passages are equal to 1.2 times the dimensions (or cross sections) of the outlet passages. In particular, it might be advantageous to use such substrates with an asymmetric factor when a catalytic coating is coated only from the inlet passages or only from the outlet passages of a porous wall-flow filter.

The present invention is further illustrated by the following reference examples, examples, and comparative examples.

EXAMPLES

Reference Example 1 Determination of the Volume-Based Particle Size Distributions (Dv10, Dv50, Dv90 and Dv99)

The particle size distributions were determined by a static light scattering method using Sympatec HELOS (3200) & QUIXEL equipment, wherein the optical concentration of the sample was below 10%.

Reference Example 2 Measurement of the BET Specific Surface Area

The BET specific surface area of the alumina was determined according to DIN 66131 or DIN-ISO 9277 using liquid nitrogen.

Reference Example 3 Collection of SEM Images

The SEM images were collected with a Carl Zeiss Table Top Electron Microscope: EHT: 18.00 kV, Signal A: HDBSD, WD: 9.00 mm Reference Example 4 Measurement of the Average Porosity, the Average/Mean Pore Size of the Internal Walls of the Porous Wall-Flow Substrate The average porosity of the internal walls of the porous wall-flow substrate was determined by mercury intrusion using mercury porosimetry according to DIN 66133. The reported data has been collected with the instrument AutoPore V in the range 0.1-61000 psia with a HG temperature of 23-25° C.

Reference Example 5 Determination of the Fraction of In-Wall Coating and of On-Wall Coating in a Given Catalyst To determine the fraction of coating that is disposed within the internal walls of a given substrate (in-wall coating) and the fraction of coating that is disposed on the surface of the internal walls of the given substrate (on-wall coating), SEM images such as the ones in FIGS. 4 *a-b* and FIGS. 5*a-b*, respectively, are quantitatively evaluated. As the amount of in-wall coating and on-wall coating can be clearly distinguished in such images, the respective areas of on-wall coating, as well as in-wall coating, are analysed from several SEM images (at least two images) with an appropriate software program.

Comparative Example 1 Preparation of a Selective Catalytic Reduction Catalyst not According to the Present Invention Slurry 1:

A Cu-Chabazite with a Cu content of 3.33 weight-%, calculated as CuO, based on the weight of the Cu-zeolite (Dv50 of 20 micrometers and a $SiO_2$:$Al_2O_3$ molar ratio of 25, primary crystallite size of less than 0.5 micrometer and a BET specific surface area of about 600 $m^2$/g) was dispersed in water forming a slurry. The solid content of the obtained slurry was adjusted to 37 weight-%. The resulting slurry was milled using a continuous milling apparatus so that the Dv50 value of the particles was of about 5 micrometers.

Slurry 2:

An aqueous slurry having a solid content of 30 weight-% and comprising alumina ($Al_2O_3$ 94 weight-% with $SiO_2$ 6 weight-% having a BET specific surface area of 173 $m^2$/g, a Dv90 of about 5 micrometers) was prepared. The amount of alumina+silica was calculated such that it was 10 weight-% based on the weight of the Cu-zeolite. Tartaric acid was added to the aqueous slurry. The amount of tartaric acid was calculated such that it was 0.7 weight-% based on the weight of the alumina-silica.

Subsequently, slurries 1 and 2 were combined obtaining a final slurry. The solid content of the final slurry was adjusted to 34 weight-%. The final slurry was milled using a continuous milling apparatus so that the Dv90 value of the particles was of about 4 micrometers. The final slurry was further diluted. A porous uncoated wall-flow filter substrate, silicon carbide, (an average porosity of 63%, a mean pore size of 20 micrometers and 350 CPSI and 0.28 mm wall thickness, diameter: 58 mm*length: 140.5 mm, dimension (or cross section) inlet passages larger than those of outlet passages: asymmetry factor of about 1.35) was coated from the inlet end to the outlet end with the final slurry over 100% of the substrate axial length and a second time from the outlet end with the final slurry over 100% of the substrate axial length. To do so, the substrate was dipped in the final slurry from the inlet end until the slurry arrived at the top of the substrate and a second time from the outlet end with the final slurry over 100% of the substrate axial length. Further a pressure pulse was applied on the inlet end to shoot out the slurry and distribute it evenly in the substrate. Further, the coated substrate was dried at 130° C. for 30 minutes and calcined at 450° C. for 2 hours (first coat). This was repeated once (second coat). The obtained coated substrate was then subjected to a final calcination at 600° C. for 30 minutes. The first coat loading represented 60% of the total catalyst loading after the final calcination and the second coat loading represented 40% of the total catalyst loading after the final calcination. The final coating loading after calcinations in the catalyst was of 1.95 g/$in^3$, including 1.71 g/$in^3$ of Chabazite, 0.059 g/$in^3$ of copper calculated as CuO, and 0.18 g/$in^3$ of silica+alumina.

Comparative Example 2 Preparation of a Selective Catalytic Reduction Catalyst not According to the Present Invention Using Sucrose Slurry 1:

It was prepared as slurry 1 of Comparative Example 1.

Slurry 2:

It was prepared as slurry 2 of Comparative Example 1.

Subsequently, slurries 1 and 2 were combined. A powder of sucrose was added and dissolved in the obtained slurry, obtaining a final slurry. The solid content of the final slurry was adjusted to 34 weight-%. The final slurry was milled using a continuous milling apparatus so that the Dv90 value of the particles was of about 4 micrometers. The final slurry was further diluted. A porous uncoated wall-flow filter substrate, silicon carbide, (an average porosity of 63%, a mean pore size of 20 micrometers and 350 CPSI and 0.28 mm wall thickness, diameter: 58 mm*length: 140.5 mm, dimension (or cross section) inlet passages larger than those of outlet passages: asymmetry factor of about 1.35) was coated from the inlet end to the outlet end and a second time from the outlet end with the final slurry over 100% of the substrate axial length. To do so, the substrate was dipped in the final slurry from the inlet end until the slurry arrived at the top of the substrate and the second time the substrate was dipped in the final slurry from the outlet end until the slurry arrived at the inlet side of the substrate. Further a pressure pulse was applied on the inlet end to shoot out the slurry and distribute it evenly in the substrate. Further, the coated substrate was dried at 130° C. for 30 minutes and calcined at 450° C. for 2 hours (first coat). This was repeated once (second coat). The obtained coated substrate was then subjected to a final calcination at 600° C. for 30 minutes. The first coat loading represented 60% of the total catalyst loading after the final calcination and the second coat loading represented 40% of the total catalyst loading after the final calcination. The final coating loading after calcinations in the catalyst was of 1.95 g/$in^3$, including 1.71 g/$in^3$ of Chabazite, 0.059 g/$in^3$ of copper calculated as CuO, and 0.18 g/$in^3$ of alumina+silica.

Example 1 Preparation of a Selective Catalytic Reduction Catalyst with In-Wall Coating and On-Wall Coating Using Particles of Carbon Black Slurry 1:

It was prepared as slurry 1 in Comparative Example 1.

Slurry 2:

It was prepared as slurry 2 in Comparative Example 1.

Slurry 3:

A powder of carbon black (with a Dv10 of about 0.4 micrometers, a Dv50 of about 1.45 micrometers, a Dv90 of about 5.1 micrometers and a Dv99 of about 15.7 micrometers, a BET specific surface area of about 7-12 $m^2$/g) was dispersed in deionized water for 30 minutes forming an aqueous slurry having a solid content of 35 weight-%. The amount of carbon black was calculated such that it was 10 weight-% based on the weight of the Cu-Chabazite+alumina-silica.

Subsequently, slurries 1 and 2 were combined. Finally, slurry 3 was added. The solid content of the obtained slurry was adjusted to 37 weight-% and was milled using a continuous milling apparatus so that the Dv90 value of the particles was of about 4 micrometers. Subsequently, acetic acid was added to the obtained slurry. The amount of acetic acid was calculated such that it was 1 weight-% based on the weight of the Cu-Chabazite. The solid content of the final slurry was adjusted to 34 weight-%. The final slurry was further diluted. A porous uncoated wall-flow filter substrate, silicon carbide, (an average porosity of 63%, a mean pore size of 20 micrometers and 350 CPSI and 0.28 mm wall thickness, diameter: 58 mm*length: 140.5 mm, dimension (or cross section) inlet passages larger than those of outlet passages: asymmetry factor of about 1.35) was coated from the inlet end to the outlet end and a second time from the outlet end with the final slurry over 100% of the substrate axial length. To do so, the substrate was dipped in the final slurry from the inlet end until the slurry arrived at the top of the substrate and the second time the substrate was dipped in the final slurry from the outlet end until the slurry arrived at the inlet side of the substrate. Further a pressure pulse was applied on the inlet end to shoot out the slurry and distribute it evenly in the substrate. Further, the coated substrate was dried at 130° C. for 30 minutes and calcined at 450° C. for 2 hours (first coat). This was repeated once (second coat). The obtained coated substrate was then subjected to a final calcination at 600° C. for 30 minutes (in order to burn off the carbon black completely). The first coat loading represented 60% of the total catalyst loading after the final calcination and the second coat loading represented 40% of the total catalyst loading after the final calcination. The final coating loading after calcinations in the catalyst was of 1.95 g/in$^3$, including 1.71 g/in$^3$ of Chabazite, 0.059 g/in$^3$ of copper calculated as CuO and 0.18 g/in$^3$ of silica+alumina.

Example 2 Backpressure Evaluation

The backpressure of the catalysts obtained in Comparative Examples 1 and 2 and Example 1 was measured on a Superflow device that was adapted for the measurements of cores with 58 mm in diameter. The backpressure data was recorded at a volume flow of 100 m$^3$/h and reported in FIG. 1. As may be taken from FIG. 1, the backpressure obtained with the catalyst of Example 1 was of about 98 mbar while the backpressures obtained with the catalysts of Comparative Examples 1 and 2 were of about 101 mbar and of about 103 mbar, respectively. The lower back pressure of the catalyst prepared according to Example 1 compared to the catalyst prepared according to Comparative Example 1 showed that the presence of carbon black lowers the backpressure of a coated diesel particle filter. Taking the enhanced backpressure of the catalyst prepared according to Comparative Example 2 into account allows to conclude that this effect cannot be reached with an organic substance that dissolves in the slurry. Thus, Example 2 demonstrates that the presence of particles of carbon black during the preparation of the catalytic coating permits to decrease the backpressure of the obtained catalyst.

Example 3 Preparation of Selective Catalytic Reduction Catalysts with In-Wall and On-Wall Coatings Using Particles of Synthetic Graphite Slurry 1:

A CuO powder having a Dv50 of 33 micrometers was added to water. The amount of CuO was calculated such that the total amount of copper in the coating after calcination was of 3.5 weight-%, calculated as CuO, based on the weight of the Chabazite. The resulting mixture was milled using a continuous milling apparatus so that the Dv50 value of the particles was about 2.5 micrometers and the Dv90 value of the particles was about 9 micrometers. The resulting slurry had a solid content of 5 weight-%. An aqueous zirconium acetate solution was added to the CuO-containing mixture forming a slurry. The amount of zirconium acetate was calculated such that the amount of zirconia in the coating, calculated as ZrO$_2$, was 5 weight-% based on the weight of the Chabazite. Separately, a Cu-Chabazite with a Cu content of 1.25 weight-%, calculated as CuO, based on the weight of the Chabazite (Dv50 of 20 micrometers, a SiO$_2$:Al$_2$O$_3$ of 25, a primary crystallite size of less than 0.5 micrometer and a BET specific surface area of about 600 m$^2$/g) was added to water to form a mixture having a solid content of 34 weight-%. The Cu-Chabazite mixture was mixed to the copper containing slurry. The amount of the Cu-Chabazite was calculated such that the loading of Chabazite after calcination was 84.5% of the loading of the coating after calcination. The resulting slurry was milled using a continuous milling apparatus so that the Dv90 value of the particles was of about 3.5 micrometers.

Slurry 2:

Separately, an aqueous slurry having a solid content of 30 weight-% and comprising alumina (Al$_2$O$_3$ 94 weight-% with SiO$_2$ 6 weight-% having a BET specific surface area of 173 m$^2$/g, a Dv90 of about 18 micrometers) was prepared. The amount of alumina+silica was calculated such that the amount of alumina+silica after calcination was 10 weight-% based on the weight of Cu-Chabazite. Tartaric acid was added to the aqueous slurry. The amount of tartaric acid was calculated such that it was 0.7 weight-% based on the weight of the alumina-silica.

Slurry 3:

For each catalyst (3a-3e), a powder of synthetic graphite was dispersed in deionized water for 30 minutes forming an aqueous slurry having a solid content of 35 weight-%. The amount of synthetic graphite was calculated such that it was from 10 to 20 weight-% based on the weight of the starting Cu-Chabazite (with a Cu content of 1.25 weight-%, calculated as CuO, based on the weight of the Chabazite)+ alumina-silica (see Table 1 below).

TABLE 1

| Catalysts | Particles of | Particles (wt.-%*) | Dv10 (micrometers) | Dv50 (micrometers) | Dv90 (micrometers) |
|---|---|---|---|---|---|
| 3 a | Synthetic graphite | 10 | 3.3 | 7.7 | 14.9 |
| 3 b | Synthetic graphite | 20 | 3.3 | 7.7 | 14.9 |
| 3 c | Synthetic graphite | 10 | 5.1 | 16.6 | 42.6 |
| 3 d | Synthetic graphite | 20 | 5.1 | 16.6 | 42.6 |
| 3 e | Synthetic graphite | 15 | 3.5 | 11 | 27.2 |

*based on wt. of the starting Cu-Chabazite + silica-alumina.

Subsequently, slurry 1 and slurry 2 were combined. Finally, slurry 3 was added. The obtained slurry was milled using a continuous milling apparatus so that the Dv90 value of the particles was of about Dv90 of 8 micrometers. Subsequently, acetic acid was added to the obtained slurry. The amount of acetic acid was calculated such that it was 2.9 weight-% based on the weight of the starting Cu-Chabazite (with a Cu content of 1.25 weight-%, calculated as CuO, based on the weight of the Chabazite). The solid content of the final slurry was adjusted to 34 weight-%. The final slurry was further diluted. A porous uncoated wall-flow filter substrate, silicon carbide, (an average porosity of 60.5%, a mean pore size of 20 micrometers and 350 CPSI and 0.28 mm wall thickness, diameter: 36.6 mm*length: 150.5 mm, dimension (or cross section) inlet passages larger than those of outlet passages: asymmetry factor about 1.25) was coated twice from the inlet end to the outlet end with the final slurry over 100% of the substrate axial length. To do so, the substrate was dipped in the final slurry from the inlet end until the slurry arrived at the top of the substrate. Further a pressure pulse was applied on the inlet end to shoot out the slurry and distribute it evenly in the substrate. Further, the coated substrate was dried at 130° C. for 30 minutes and calcined at 450° C. for 2 hours (first coat). This was repeated once (second coat). The obtained coated substrate was then subjected to a final calcination at 750° C. for 30 minutes (in order to burn off the synthetic graphite completely). The final coating loading in the catalyst after calcination was 2.2 g/in$^3$. The first coat loading represented 60% of the total catalyst loading after the final calcination and the second loading 40% of the total catalyst loading after the final calcination.

The SEM images were collected as described in Reference Example 3 herein and are displayed in FIGS. 4a-b and 5a-b. As may be taken from the SEM images, the catalytic coating of the catalyst of Examples 3b and 3d was disposed as in-wall coating and as on-wall-coating. The SEM images were analyzed, it was calculated that for sample 3a, there were about 40% of the coating onto the surface of the porous internal walls. Thus, the I(on-wall coating):I(in-wall coating) ratio is of about 40:60. For sample 3b, it was calculated that there were about 32% of the coating onto the surface of the porous internal walls. Thus, the ratio I(on-wall coating):I(in-wall coating) ratio is of about 32:68. Finally, for sample 3d, it was calculated that there were about 37% of the coating onto the surface of the porous internal walls. Thus, the ratio I(on-wall coating):I(in-wall coating) ratio is of about 37:63. In view of the SEM images and FIG. 10 (Hg intrusion), without wanting to be bound to any theory, it is believed that the particles of synthetic graphite used according to the present invention block the pores of the porous internal walls of the wall-flow filter substrate to a large extent so that the catalytic coating may not enter completely within the porous internal walls and the remainder of said catalytic coating is deposited on the surface of the porous internal walls. The fractions of on-wall coating and in-wall coating were determined as defined in Reference Example 5 in order to calculate the I(on-wall coating):I(in-wall coating) ratios.

According to Hg intrusion as determined in Reference Example 4 herein above, it was calculated that for the catalyst of Example 3b, 25.6% of the pores of the in-wall coating of said catalyst had a mean pore size in the range of from 1 to 16 micrometers and that 6.0% of the pores of the in-wall coating of said catalyst had a mean pore size in the range of from 0.01 to 1 micrometer. It was also calculated that for the catalyst of Example 3b, 20.6% of the pores of the in-wall coating of said catalyst had a mean pore size in the range of from 1 to 16 micrometers.

Comparative Example 3 Preparation of a Selective Catalytic Reduction Catalyst not According to the Present Invention without Using Particles of a Carbon-Containing Additive Slurry 1:
It was prepared as slurry 1 in Example 3.
Slurry 2:
It was prepared as slurry 2 in Example 3.
Subsequently, slurries 1 and 2 were combined obtaining a final slurry. The solid content of the final slurry was adjusted to 34 weight-%. Subsequently, acetic acid was added to the obtained slurry. The amount of acetic acid was calculated such that it was 2.9 weight-% based on the weight of the starting Cu-Chabazite (with a Cu content of 1.25 weight-%, calculated as CuO, based on the weight of the Chabazite). The final slurry was milled using a continuous milling apparatus so that the Dv90 value of the particles was of about 8 micrometers. The final slurry was further diluted. A porous uncoated wall-flow filter substrate, silicon carbide, (an average porosity of 60.5%, a mean pore size of 20 micrometers and 350 CPSI and 0.28 mm wall thickness, diameter: 36.6 mm*length: 150.5 mm, dimension (or cross section) inlet passages larger than those of outlet passages: asymmetry factor of about 1.25) was coated twice from the inlet end to the outlet end with the final slurry over 100% of the substrate axial length. To do so, the substrate was dipped in the final slurry from the inlet end until the slurry arrived at the top of the substrate. Further a pressure pulse was applied on the inlet end to shoot out the slurry and distribute it evenly in the substrate. Further, the coated substrate was dried at 130° C. for 30 min and calcined at 450° C. for 2 hours (first coat). This was repeated once (second coat). The obtained coated substrate was then subjected to a final calcination at 800° C. for 30 minutes. The final coating loading in the catalyst after calcinations was 2.2 g/in$^3$. The first coat loading represented 60% of the total catalyst loading after the final calcination and the second loading 40% of the total catalyst loading after the final calcination.

Example 4 Backpressure Evaluation—Porosity Evaluation

The backpressure of the fresh catalysts 3a-3e obtained according to Example 3 was measured on an in-house constructed device. The catalytic filters are mounted in a holder that is adapted individually for each filter diameter and sealed air tight. Air-is pumped with a compressor (K04-MS MOR IE2) through the sample, the air flow is adjusted with a vacuum valve. The pressure drop is measured with a pressure sensor (SD8000). The backpressure data recorded at a volume flow of 27 m$^3$/h was reported in FIG. 2.

As may be taken from FIG. 2, the catalysts 3a-3e of Example 3 according to the present invention prepared by using particles of synthetic graphite permit to reduce the backpressure compared to the catalyst of Comparative Example 3 which was prepared without particles of synthetic graphite. In particular, reduction of the backpressure was observed for the catalysts with a Dv50 of 7.7 micrometers and 16.6 micrometers but was stronger for the catalysts containing particles with a Dv50 of 16.6 micrometers. Furthermore the backpressure was reduced when using catalysts according to the present invention, wherein the particles of a carbon-containing additive were present in an amount of 10 weight-% and 20 weight-% based on the weight of Cu-zeolite+alumina-silica in said catalysts. Thus, this demonstrates that the catalysts according to the present invention permits to reduce the backpressure. The porosity of the fresh catalysts 3a-3e obtained according to Example 3 was measured with Hg intrusion with an AutoPore V instrument in the range 0.1-61000 psia with a Hg temperature of 23-25° C. The results are displayed on FIG. 3. The data plotted on the y axis of FIG. 3 showed the cumulated Hg intrusion in the range of 3 micrometers to 30 micrometers. As may be taken from FIG. 3, the porosimetry data shows that the Hg intrusion increases with poreformer content.

Comparative Example 4 Preparation of a Selective Catalytic Reduction Catalyst not According to the Present Invention without Using Particles of a Carbon-Containing Additive The catalyst of Comparative Example 4 was prepared as the catalyst of Comparative Example 3, except that the final coating loading in the catalyst after calcinations was of 1.8 g/in$^3$. The SEM images were collected as described in Reference Example 3 herein and are displayed in FIGS. 6a-6b. According to said images, the catalytic coating of the selective catalytic reduction catalyst of Comparative Example 3 is almost completely within the porous internal walls of the substrate.

Example 5 Preparation of a Selective Catalytic Reduction Catalyst with In-Wall Coating and On-Wall Coating Using Particles of Synthetic Graphite The catalyst of Example 5 was prepared as the catalyst of Example 3a, except that the final coating loading in the catalyst after calcinations was of 1.8 g/in$^3$. The SEM images were collected as described in Reference Example 3 herein and are displayed in FIGS. 7a-7b. According to said figures, the catalytic coating of the selective catalytic reduction catalyst of Example 5 is present as in-wall coating and as on-wall coating. The SEM images were analyzed, it was calculated that about 21% of the coating was onto the surface of the porous internal walls. Thus, the I(on-wall coating):I(in-wall coating) ratio is of about 21:79.

Comparative Example 5 Preparation of a Selective Catalytic Reduction Catalyst not According to the Present Invention without Using Particles of a Carbon-Containing Additive Slurry 1:

A CuO powder having a Dv50 of 33 micrometers was added to water. The amount of CuO was calculated such that the total amount of copper after calcination was of 3.5 weight-% based on the weight of the Chabazite. The resulting mixture was milled using a continuous milling apparatus so that the Dv50 value of the particles was about 2.5 micrometers and the Dv90 value of the particles was about 9 micrometers. The resulting slurry had a solid content of 5 weight-%. An aqueous zirconium acetate solution was added to the CuO-containing mixture forming a slurry. The amount of zirconium acetate was calculated such that the amount of zirconia in the coating, calculated as $ZrO_2$, was 5 weight-% based on the weight of the Chabazite. Separately, a Cu-Chabazite with a Cu content of 1.25 weight-%, calculated as CuO, based on the weight of the Chabazite (Dv50 of 20 micrometers, a $SiO_2:Al_2O_3$ of 25, a primary crystallite size of less than 0.5 micrometer and a BET specific surface area of about 600 m$^2$/g) was added to water to form a mixture having a solid content of 34 weight-%. The Cu-Chabazite mixture was mixed to the copper containing slurry. The amount of the Cu-Chabazite was calculated such that the loading of Chabazite after calcination was 84.5% of the loading of the coating after calcination. The resulting slurry was milled using a continuous milling apparatus so that the Dv90 value of the particles was of about 3.5 micrometers.

Slurry 2:

Separately, an aqueous slurry having a solid content of 30 weight-% and comprising alumina ($Al_2O_3$ 94 weight-% with $SiO_2$ 6 weight-% having a BET specific surface area of 173 m$^2$/g, a Dv90 of about 18 micrometers) was prepared. The amount of alumina+silica was calculated such that the amount of alumina+silica after calcination was 10 weight-% based on the weight of Cu-Chabazite. Tartaric acid was added to the aqueous slurry. The amount of tartaric acid was calculated such that it was 0.7 weight-% based on the weight of the alumina-silica.

Subsequently, slurries 1 and 2 were combined obtaining a final slurry. The solid content of the final slurry was adjusted to 34 weight-%. The final slurry was milled using a continuous milling apparatus so that the Dv90 value of the particles was of about 8 micrometers. The final slurry was further diluted. A porous uncoated wall-flow filter substrate, silicon carbide, (an average porosity of 60.5%, a mean pore size of 20 micrometers and 350 CPSI and 0.28 mm wall thickness, diameter 58 mm*length: 150.5 mm, dimension (or cross section) inlet passages larger than those of outlet passages: asymmetry factor of about 1.25) was coated twice from the inlet end to the outlet end with the final slurry over 100% of the substrate axial length. To do so, the substrate was dipped in the final slurry from the inlet end until the slurry arrived at the top of the substrate. Further a pressure pulse was applied on the outlet end to shoot out the slurry and a further pressure pulse was applied on the inlet end to distribute it evenly in the substrate. Further, the coated substrate was dried at 130° C. for 30 minutes and calcined at 450° C. for 2 hours (first coat). This was repeated once (second coat). The obtained coated substrate was then subjected to a final calcination at 800° C. for 30 minutes. The final coating loading after calcinations in the catalyst was 2.2 g/in$^3$. The first coat loading represented 60% of the total catalyst loading after the final calcination and the second loading 40% of the total catalyst loading after the final calcination.

Example 6 Preparation of a Selective Catalytic Reduction Catalyst with In-Wall and On-Wall Coatings Using Particles of Polymethylurea Slurry 1:

It was prepared as slurry 1 of Comparative Example 5.

Slurry 2:

It was prepared as slurry 2 of Comparative Example 5.

Slurry 3:

Separately, a powder of polymethylurea (having a Dv50 of 11 micrometers, a Dv90 of 19 micrometers, density 1.18 g/cm$^3$, flame point 160° C. (melting) and ignition temperature 200° C. (boiling)) was dispersed in deionized water for 30 minutes forming an aqueous slurry having a solid content of 35 weight-%. The amount of polymethylurea was calculated such that it was 6.2 weight-% based on the weight of the starting Cu-Chabazite (with a Cu content of 1.25 weight-%, calculated as CuO, based on the weight of the Chabazite)+alumina-silica.

Subsequently, slurry 1 and slurry 2 were combined. Finally, slurry 3 was added. The obtained slurry was milled using a continuous milling apparatus so that the Dv90 value of the particles was of about 8 micrometers. Subsequently, acetic acid was added to the obtained slurry. The amount of acetic acid was calculated such that it was 3 weight-% based on the weight of the starting Cu-Chabazite (with a Cu content of 1.25 weight-%, calculated as CuO, based on the weight of the Chabazite). The solid content of the final slurry was adjusted to 31 weight-%. The final slurry was further diluted. A porous uncoated wall-flow filter substrate, silicon carbide, (an average porosity of 60.5%, a mean pore size of 20 micrometers and 350 CPSI and 0.28 mm wall thickness, diameter: 58 mm*length: 150.5 mm, dimension (or cross section) inlet passages larger than those of outlet passages: asymmetry factor of about 1.25) was coated twice from the inlet end to the outlet end with the final slurry over 100% of the substrate axial length. To do so, the substrate was dipped in the final slurry from the inlet end until the slurry arrived at the top of the substrate. Further a pressure pulse was applied on the outlet end to shoot out the slurry and a further pressure pulse was applied on the inlet end to distribute it evenly in the substrate. Further, the coated substrate was dried at 130° C. for 30 minutes (first coat). The coating was repeated once, the obtained coated substrate was dried at 110° C. for 30 minutes, then heated to 170° C. with a heating rate of 300° C./h and subsequently heated to 590° C. with a heating rate of 60° C./h. Lastly, the catalyst was calcined at 590° C. for 1 hour (second coat) such that the polymethylurea was removed. The final coating loading after calcinations in the catalyst was 2.2 g/in$^3$. The first coat loading represented 60% of the total catalyst loading after the final calcination and the second loading 40% of the total catalyst loading after the final calcination.

The SEM images were collected as described in Reference Example 3 herein and are displayed in FIGS. 8a-8b. These images were analyzed and it was calculated that there were about 21% of the coating onto the surface of the porous internal walls. Thus, the I(on-wall coating):I(in-wall coating) ratio was of about 21:79.

Example 7 Preparation of a Selective Catalytic Reduction Catalyst with In-Wall and On-Wall Coatings Using Particles of Polymethyl Methacrylate Slurry 1:
It was prepared as slurry 1 of Comparative Example 5.
Slurry 2:
It was prepared as slurry 2 of Comparative Example 5.
Slurry 3:
Separately, a powder of polymethyl methacrylate (PMMA) (Dv10 of 10.04 micrometers, Dv50 of 10.3 micrometers, Dv90 of 10.56 micrometers, density 1.2 g/cm$^3$, flame point 280° C. and ignition temperature 450° C.) was dispersed in deionized water for 30 minutes forming an aqueous slurry having a solid content of 35 weight-%. The amount of PMMA was calculated such that it was 10 weight-% based on the weight of the starting Cu-Chabazite (with a Cu content of 1.25 weight-%, calculated as CuO, based on the weight of the Chabazite)+alumina-silica. Subsequently, slurry 1 and slurry 2 were combined. Finally, slurry 3 was added. The obtained slurry was milled using a continuous milling apparatus so that the Dv90 value of the particles was of about 8 micrometers. Subsequently, acetic acid was added to the obtained slurry. The amount of acetic acid was calculated such that it was 3 weight-% based on the weight of the starting Cu-Chabazite (with a Cu content of 1.25 weight-%, calculated as CuO, based on the weight of the Chabazite). The solid content of the final slurry was adjusted to 31 weight-%. The final slurry was further diluted. A porous uncoated wall-flow filter substrate, silicon carbide, (an average porosity of 60.5%, a mean pore size of 20 micrometers and 350 CPSI and 0.28 mm wall thickness, diameter: 58 mm*length: 150.5 mm, dimension (or cross section) of inlet passages larger than those of outlet passages: asymmetry factor about 1.25) was coated twice from the inlet end to the outlet end with the final slurry over 100% of the substrate axial length. To do so, the substrate was dipped in the final slurry from the inlet end until the slurry arrived at the top of the substrate. Further a pressure pulse was applied on the outlet end to shoot out the slurry and a further pressure pulse was applied on the inlet end to distribute it evenly in the substrate. Further, the coated substrate was dried at 130° C. for 30 minutes (first coat). The coating was repeated once, the obtained coated substrate was dried at 110° C. for 30 minutes, then heated to 170° C. with a heating rate of 300° C./h and subsequently heated to 590° C. with a heating rate of 60° C./h. Lastly, the catalyst was calcined at 590° C. for 1 hour (second coat) such that the PMMA was removed. The final coating loading after calcinations in the catalyst was 2.2 g/in$^3$. The first coat loading represented 60% of the total catalyst loading after the final calcination and the second loading 40% of the total catalyst loading after the final calcination.

According to Hg intrusion as determined in Reference Example 4 herein above, it was calculated that 25% of the pores of the in-wall coating had a mean pore size in the range of from 1 to 16 micrometers and that 6.0% of the pores of the in-wall coating of said catalyst had a mean pore size in the range of from 0.01 to 1 micrometer.

Example 8 Backpressure Evaluation

The backpressure of the fresh catalysts of Examples 6, 7 and of Comparative Example 5 was measured on an engine bench with a VW MLB 140 kW Euro 6 engine, under the following conditions: $V_f$=40 m$^3$/h at 215° C., $V_f$=45 m$^3$/h at 540° C. and 75 m$^3$/h at 650° C. The results are displayed in FIG. 9. As may be taken from FIG. 9, the catalyst of Example 6, prepared by a process using particles of polymethylurea, exhibits a backpressure of 92 mbar at 215° C., of 181 mbar at 540° C. and of 298 mbar at 600° C. and the catalyst of Example 7, prepared by a process using particles of polymethyl methacrylate (PMMA), exhibits a backpressure of 83 mbar at 215° C., of 168 mbar at 540° C. and of 283 mbar at 600° C. In contrast thereto, the catalyst of Comparative Example 5 exhibits higher backpressures, namely backpressures of 94 mbar, 90 mbar and 318 mbar at 215, 540 and 600° C., respectively. Thus, Example 8 demonstrates that the use of particles of a carbon-containing polymer in a process for preparing a selective catalytic reduction catalyst on a filter permits to reduce the backpressure of a coated filter.

Comparative Example 6 Preparation of a Selective Catalytic Reduction Catalyst not According to the Present Invention The catalyst of Comparative Example 6 was prepared as the catalyst of Comparative Example 1 except that the filter substrate was a porous uncoated wall-flow filter substrate, silicon carbide, (an average porosity of 63%, a mean pore size of 20 micrometers, 350 cpsi and 0.28 mm wall thickness, diameter: 38.1 mm x length: 140.5 mm).

Example 9 Preparation of Selective Catalytic Reduction Catalysts Comprising Two Coatings First Coating:
Slurry 1:
A Cu-Chabazite with a Cu content of 3.3 weight-%, calculated as CuO, based on the weight of the Chabazite (Dv50 of 20 micrometers and a SiO$_2$:Al$_2$O$_3$ molar ratio of 25, primary crystallite size of less than 0.5 micrometer and a BET specific surface area of about 600 m$^2$/g) was added to and water forming a slurry. The solid content of the obtained slurry was adjusted to 40 weight-%. The resulting slurry was milled using a continuous milling apparatus so that the Dv50 value of the particles was about of about 5 micrometers.

Slurry 2:

An aqueous slurry having a solid content of 30 weight-% and comprising alumina (Al$_2$O$_3$ 94 weight-% with SiO$_2$ 6 weight-% having a BET specific surface area of 173 m$^2$/g, a Dv90 of about 5 micrometers) was prepared. The amount of alumina+silica was calculated such that it was 10 weight-% based on the weight of the Cu-Chabazite. Tartaric acid was added to the aqueous slurry. The amount of tartaric acid was calculated such that it was 0.7 weight-% based on the weight of the alumina-silica.

Subsequently, slurries 1 and 2 were combined obtaining a final slurry. The solid content of the final slurry was adjusted to 34 weight-%. The final slurry was milled using a continuous milling apparatus so that the Dv90 value of the particles was of about 4 micrometers. The final slurry was further diluted. A porous uncoated wall-flow filter substrate, silicon carbide, (an average porosity of 63%, a mean pore size of 20 micrometers, 350 cpsi and 11 mil (0.28 mm) wall thickness, diameter: 38.1 mm x length: 140.5 mm, dimension (or cross section) of inlet passages larger than those of outlet passages: asymmetry factor about 1.35) was coated from the inlet end to the outlet end of the substrate over 100% of the substrate axial length. To do so, the substrate was dipped in the final slurry from the inlet end until the slurry arrived at the top of the substrate. Further a pressure pulse was applied on the inlet end to shoot out the slurry and distribute it evenly in the substrate. Further, the coated substrate was dried at 130° C. for 30 minutes and calcined at 450° C. for 2 hours (first coat loading representing 60% of the first coating loading after calcination). The obtained substrate was coated from the outlet end to the inlet end over 100% of the substrate axial length with the method described above, dried at 130° C. for 30 minutes and calcined at 450° C. for 2 hours (second coat loading representing 40% of the first coating loading after calcination). The final loading of the first coating (first+second coats) after calcinations in the catalyst was of about 1.95 g/in$^3$, including 1.77 g/in$^3$ of Cu-Chabazite, 0.177 g/in$^3$ of alumina-silica.

Second Coating:

Slurry 1: Slurry 1 of the second coating was prepared as slurry 1 of Example 3.

Slurry 2: Slurry 2 of the second coating was prepared as slurry 2 of Example 3.

Slurry 3:

For each catalyst (9a-9e), a powder of synthetic graphite was dispersed in deionized water for 30 minutes forming an aqueous slurry having a solid content of 35 weight-%. The amount of synthetic graphite was calculated such that it was from 20 to 50 weight-% based on the weight of the starting Cu-Chabazite (with a Cu content of 1.25 weight-%, calculated as CuO, based on the weight of the Chabazite)+ alumina-silica depending on the catalyst (see Table 2 below).

TABLE 2

| Catalysts | Particles Type | Wt.-%* | Dv10 (micrometers) | Dv50 (micrometers) | Dv90 (micrometers) |
|---|---|---|---|---|---|
| 9a | Synthetic graphite | 50 | 5.1 | 16.6 | 42.6 |
| 9b | Synthetic graphite | 20 | 5.1 | 16.6 | 42.6 |
| 9c | Synthetic graphite | 50 | 5.1 | 16.6 | 42.6 |
| 9d | Synthetic graphite | 35 | 3.5 | 11 | 27.2 |
| 9e | Synthetic graphite | 50 | 3.3 | 7.7 | 14.9 |
| 9f | Synthetic graphite | 20 | 3.3 | 7.7 | 14.9 |

*based on the weight of the starting Cu-Chabazite + alumina-silica.

Subsequently, slurry 1 and slurry 2 were combined. Finally, slurry 3 was added. The obtained slurry was milled with a continuous milling apparatus so that the Dv90 value of the particles was of about 8 micrometers. Subsequently, acetic acid was added to the obtained slurry. The amount of acetic acid was calculated such that it was 1 weight-% based on the weight of the starting Cu-Chabazite (with a Cu content of 1.25 weight-%, calculated as CuO, based on the weight of the Chabazite). The solid content of the final slurry was adjusted to 31 weight-%. The substrate coated with the first coating was then coated from the outlet end to the inlet end of the substrate over 100% of the substrate axial length. To do so, the substrate was dipped in the final slurry for the second coating, which was beforehand further diluted, from the outlet end until the slurry arrived at the top of the substrate. Further a pressure pulse was applied on the outlet end to shoot out the slurry and distribute it evenly in the substrate. Further, the coated substrate was dried at 130° C. for 30 minutes and calcined at 450° C. for 1 hour. Further, it was calcined at 750° C. for 30 minutes (to burn off completely the particles of synthetic graphite). The final loading of the second coating after calcination was from 0.1 to 0.3 g/in$^3$ depending on the catalyst (9a-9e), the loadings are displayed in Table 3 below.

TABLE 3

| Examples | Loading of the second coating (g/in$^3$) |
|---|---|
| 9a | 0.1 |
| 9b | 0.3 |
| 9c | 0.3 |
| 9d | 0.2 |
| 9e | 0.1 |
| 9f | 0.3 |

The final coating loading after calcinations in the catalyst was from 2.05 to 2.25 g/in$^3$.

Example 10 Performance Evaluation of the Catalysts of Example 9 and of the Catalyst of Comparative Example 6—NOx Conversion The catalysts of Example 9 (9a-9e) and the catalyst of Comparative Example 6 were aged for 16 hours at 800° C. (10% H$_2$O, 20% O$_2$, 70% N$_2$). The NOx conversion was measured in a reactor at 500 ppm NO, with a NH$_3$/NOx ratio of 1.5, 10% O$_2$, 5% CO$_2$, 5% CO$_2$, 5% H$_2$O and 80 ppm CH$_3$ at a temperature of 200° C. at two different space velocities, namely 40 k and 80 k, in 500 ppm NO with an NSR=1.5 (NH$_3$ to NOx ratio), 10% O$_2$, 5% CO$_2$, 5% H$_2$O, 80 ppm C$_3$H$_6$. The results are displayed on FIG. 12. As may be taken from FIG. 12, the NOx conversions of the catalysts 9a-9e according to the present invention are in the range of from 71.5 to 83% while the NOx conversion of the catalyst of Comparative Example 6 is 67.8%. In particular, the catalyst 9d which as a total coating loading of 2.05 g/in$^3$ exhibits a NOx conversion of 83% which is more than 15% higher than the NOx conversion of the catalyst of Comparative Example 6. Thus, Example 10 demonstrates that the use of a carbon-containing additive when preparing a selective catalytic reduction catalyst on a filter permits to obtained catalysts exhibiting improved NOx conversion compared to catalysts prepared without such an additive.

Figure 1:
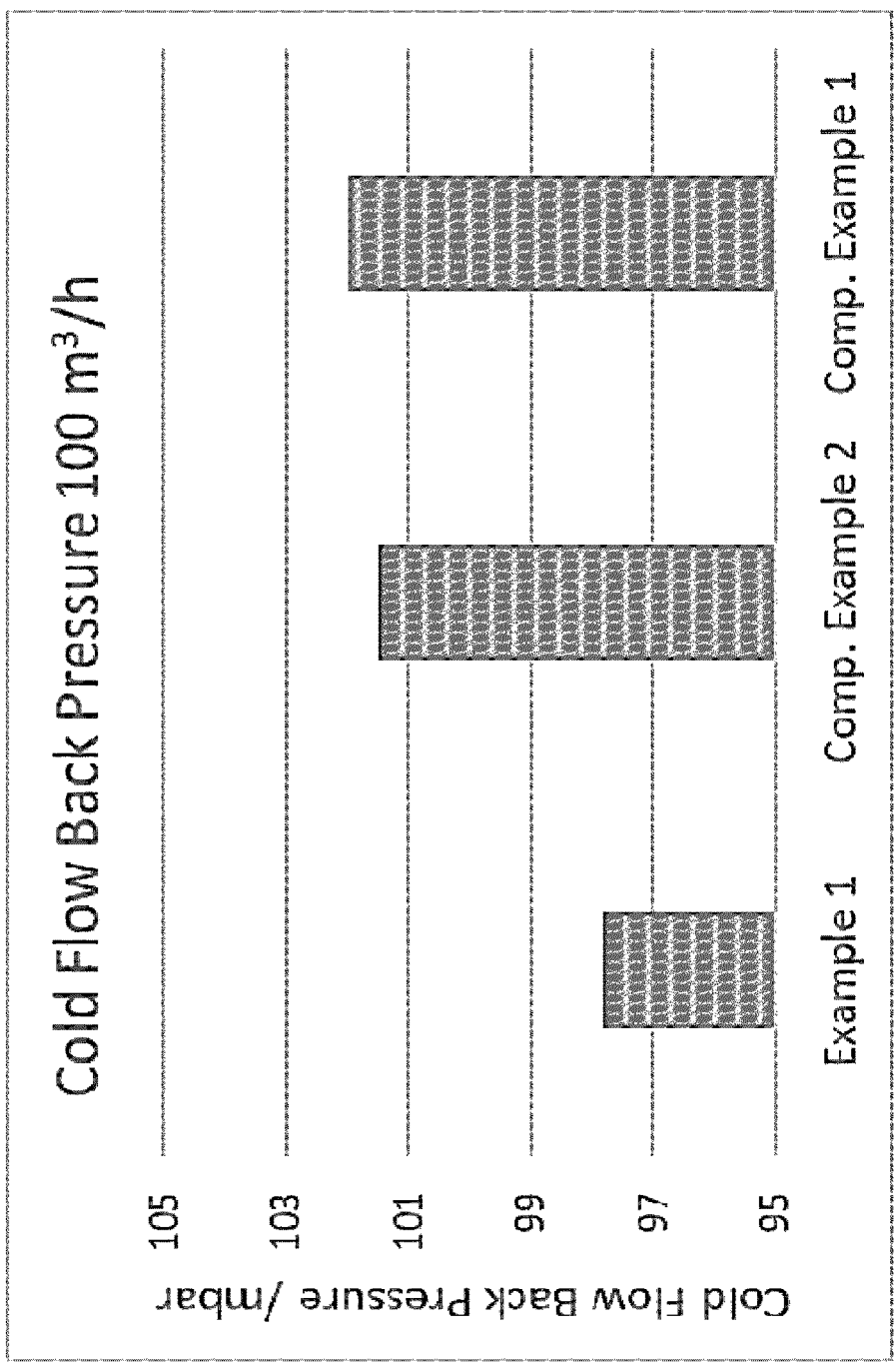
FIG. 1 shows the backpressure obtained with the catalysts of Example 1 and of Comparative Examples 1 and 2.
Figure 2:
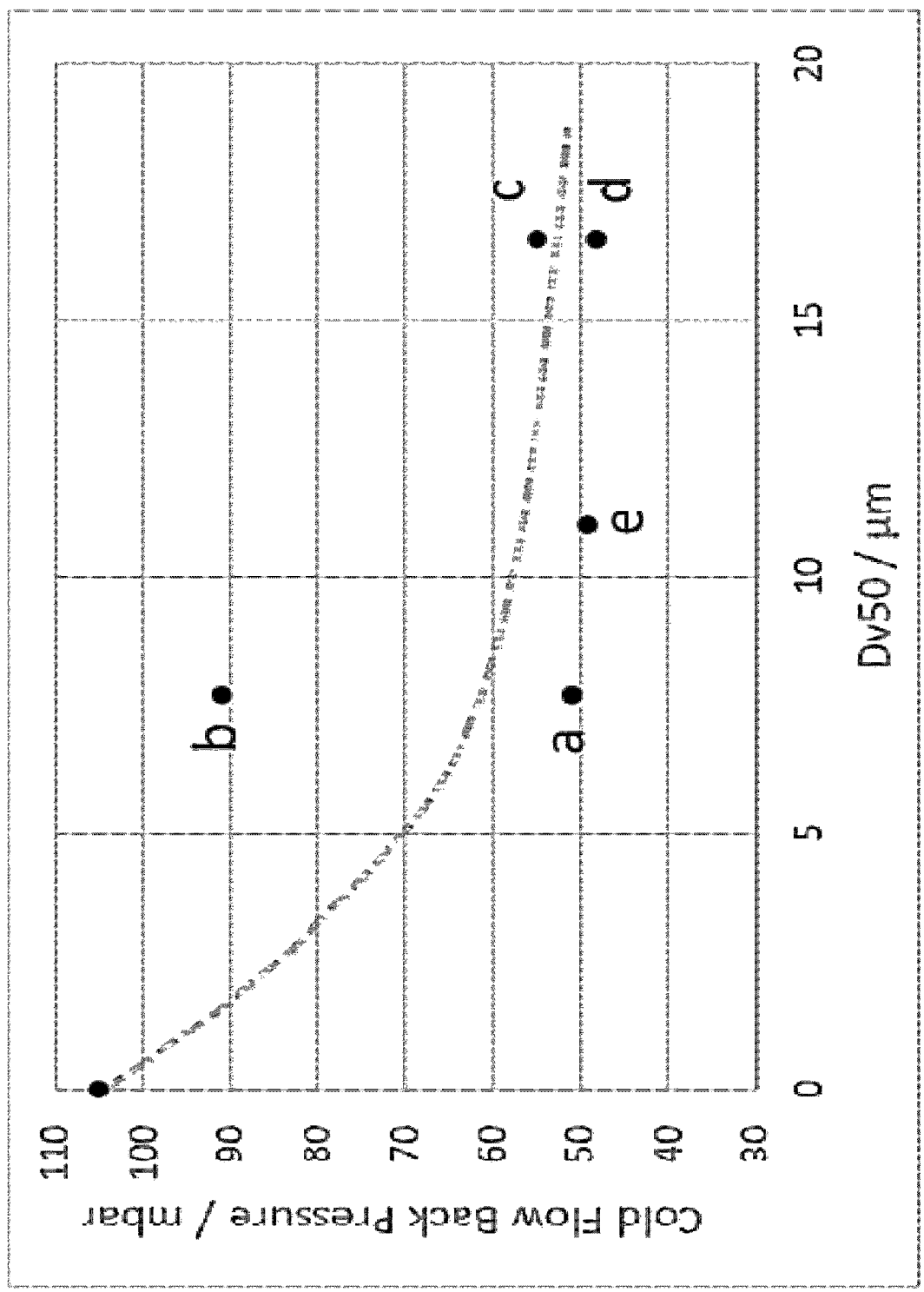
FIG. 2 shows the backpressure obtained with the catalysts 3a-3e of Example 3.
Figure 3:
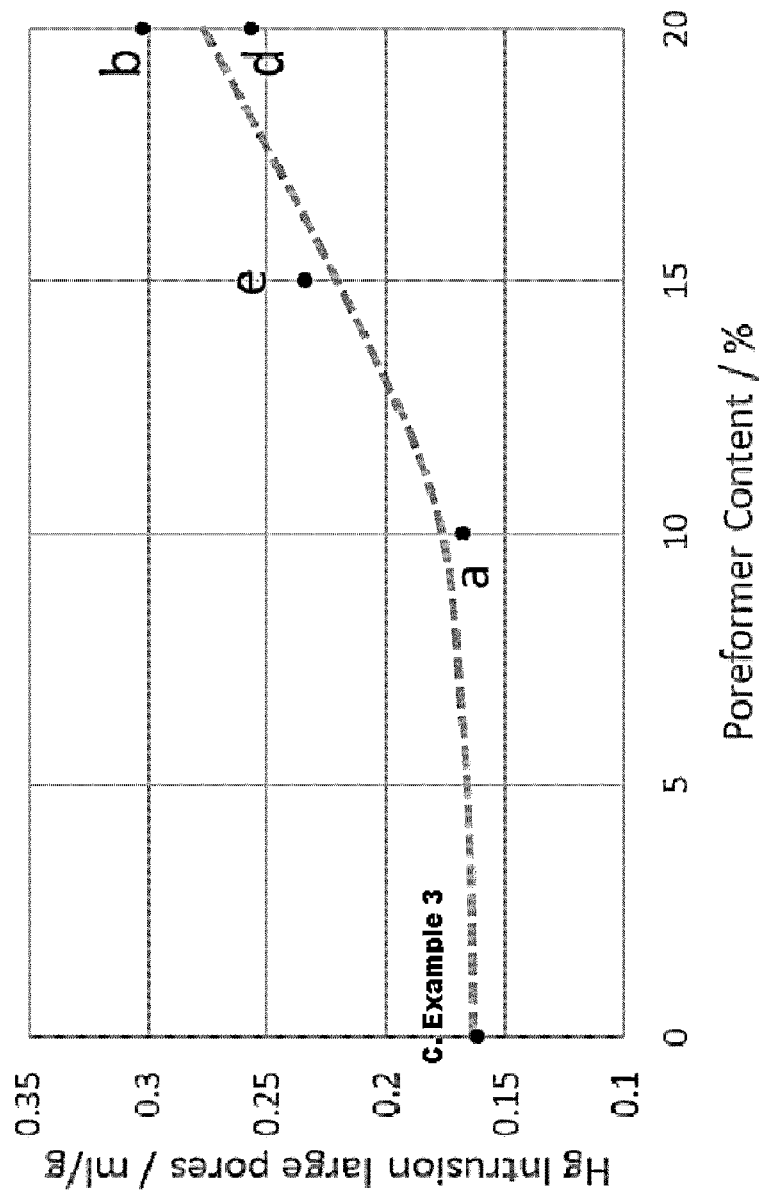
FIG. 3 shows the porosimetry via Hg intrusion in the range 3 µm-30 µm with the catalysts of Example 3.
Figure 4:
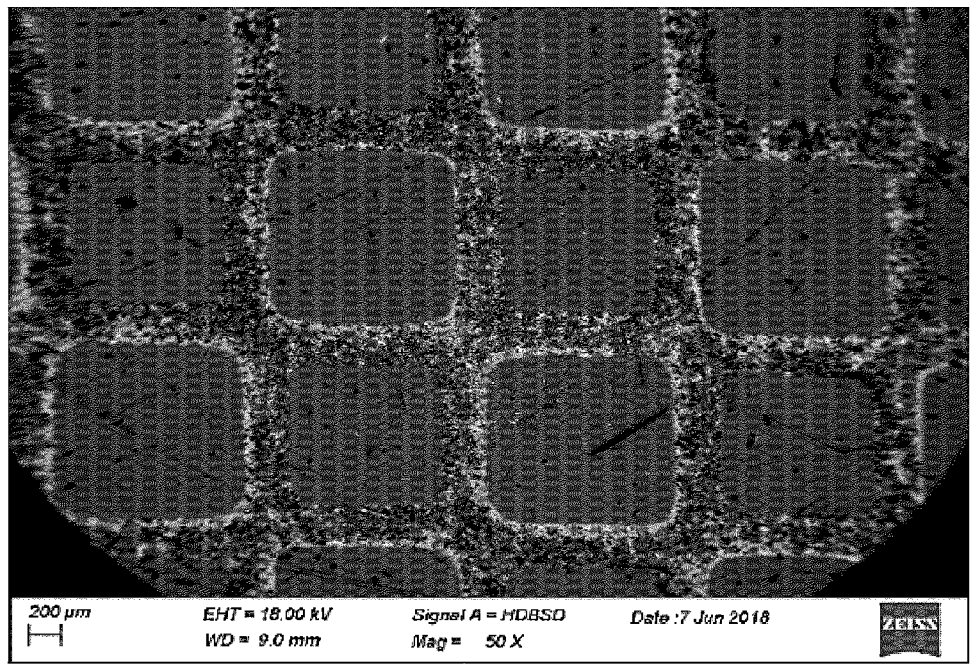
FIG. 4a shows SEM image of the selective catalytic reduction catalyst of Example 3b (Magnification: 50×) obtained as described in Reference Example 3.
FIG. 4b shows SEM image of the selective catalytic reduction catalyst of Example 3b (Magnification: 300×) obtained as described in Reference Example 3.
Figure 4:
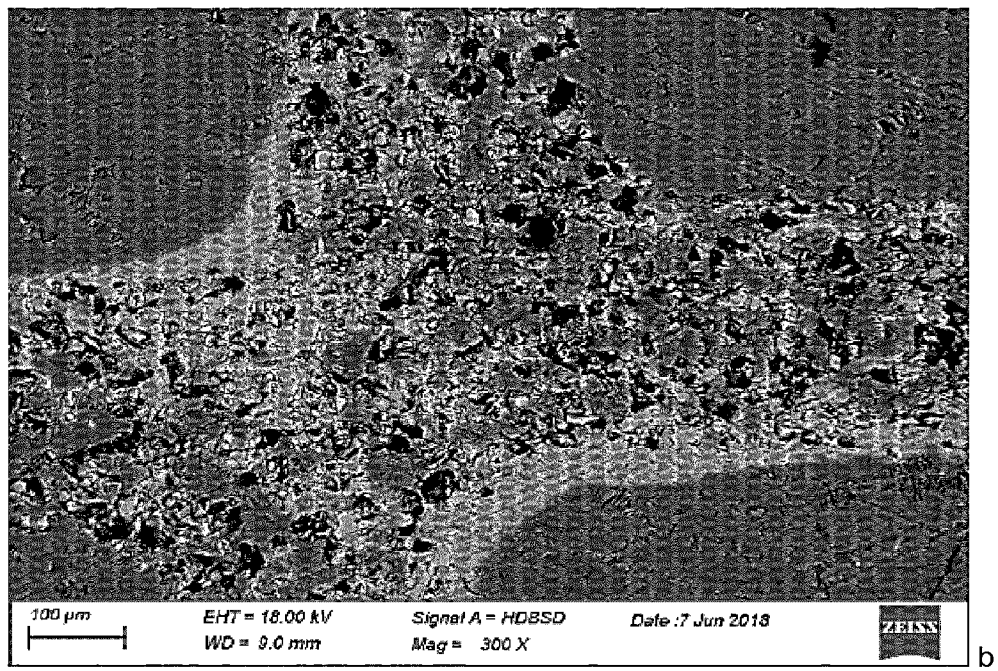
Figure 5:
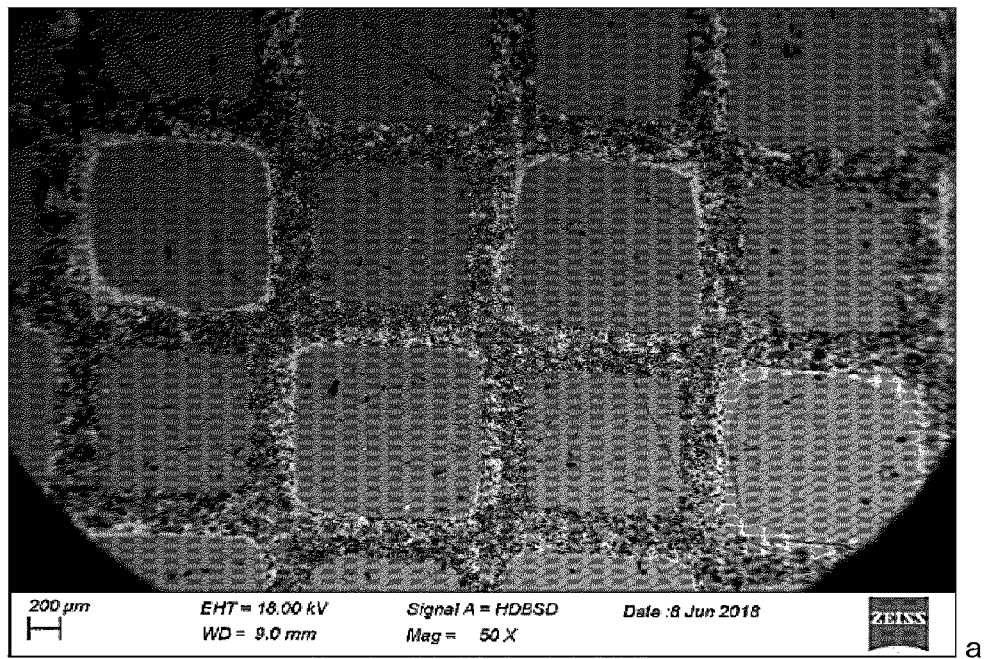
FIG. 5a shows SEM image of the selective catalytic reduction catalyst of Example 3d (Magnification: 50×) obtained as described in Reference Example 3.
FIG. 5b shows SEM image of the selective catalytic reduction catalyst of Example 3d (Magnification: 500×) obtained as described in Reference Example 3.
Figure 5:
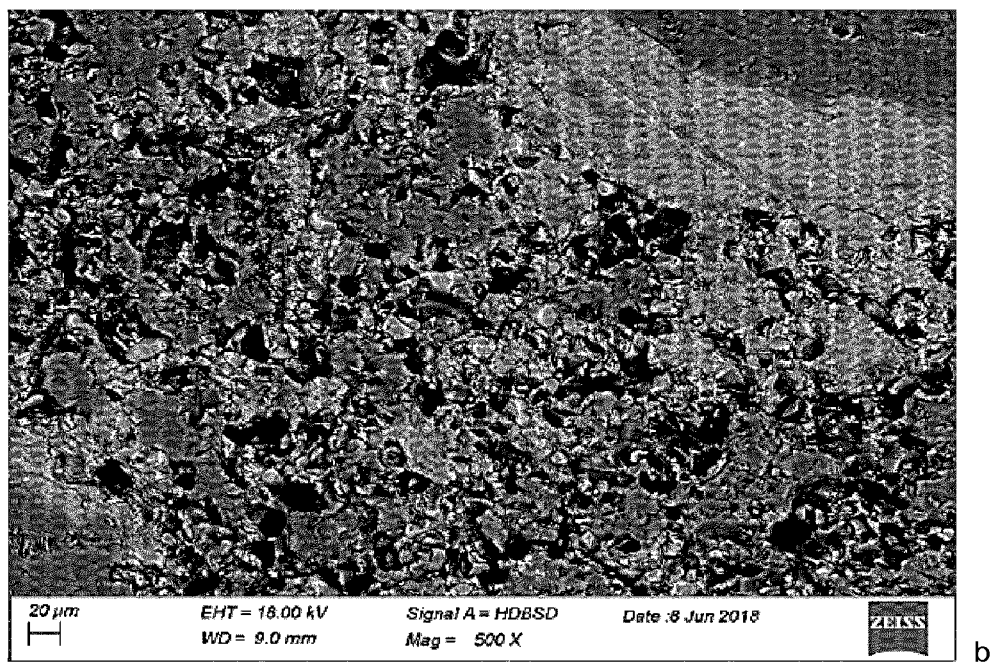
Figure 6:
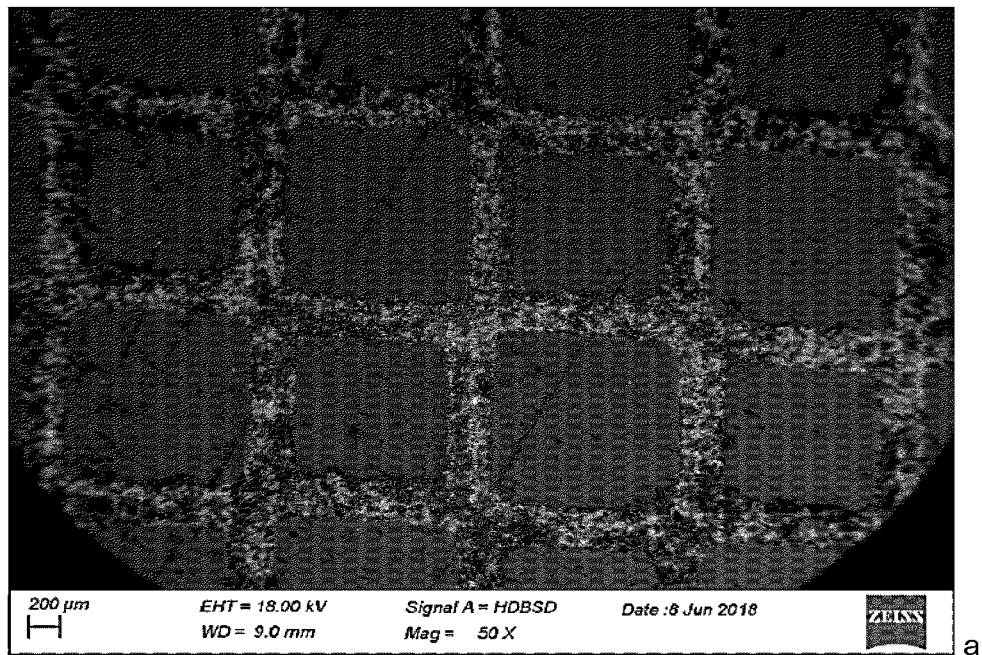
FIG. 6a shows SEM image of the selective catalytic reduction catalyst of Comparative Example 4 (Magnification: 50×) obtained as described in Reference Example 3.
FIG. 6b shows SEM image of the selective catalytic reduction catalyst of Comparative Example 4 (Magnification: 300×) obtained as described in Reference Example 3.
Figure 6:
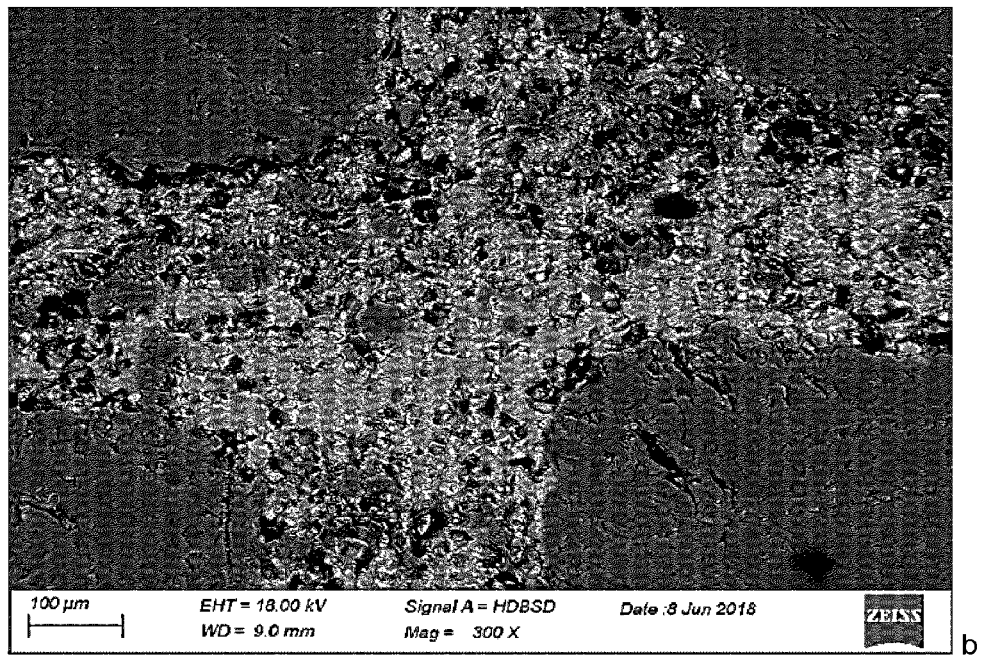
Figure 7:
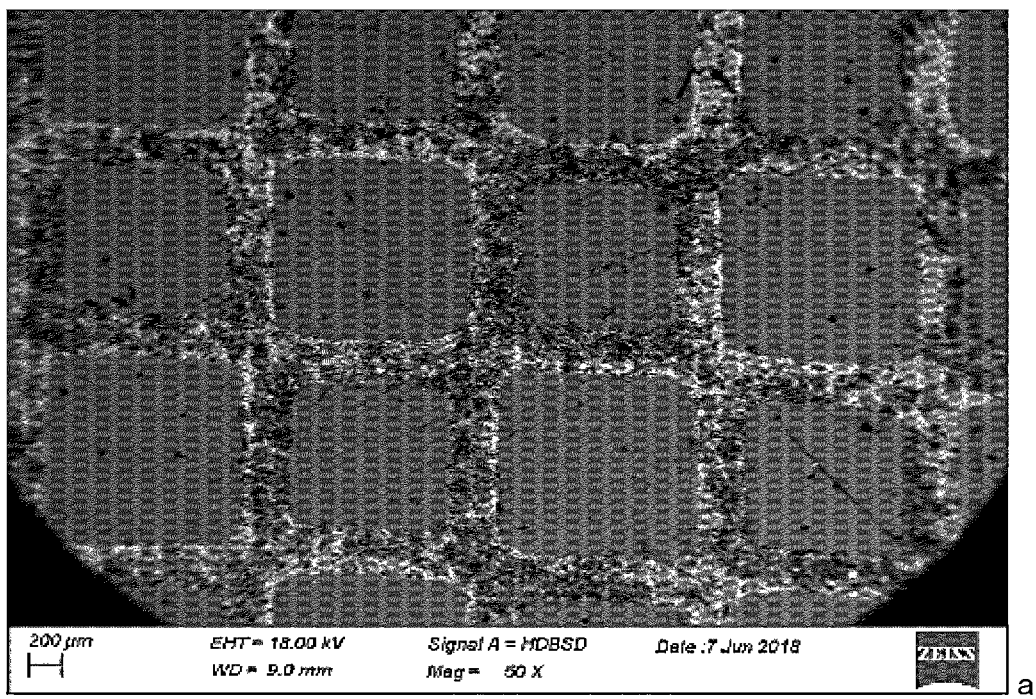
FIG. 7a shows SEM image of the selective catalytic reduction catalyst of Example 5 (Magnification: 50×) obtained as described in Reference Example 3.
FIG. 7b shows SEM image of the selective catalytic reduction catalyst of Example 5 (Magnification: 500×) obtained as described in Reference Example 3.
Figure 7:
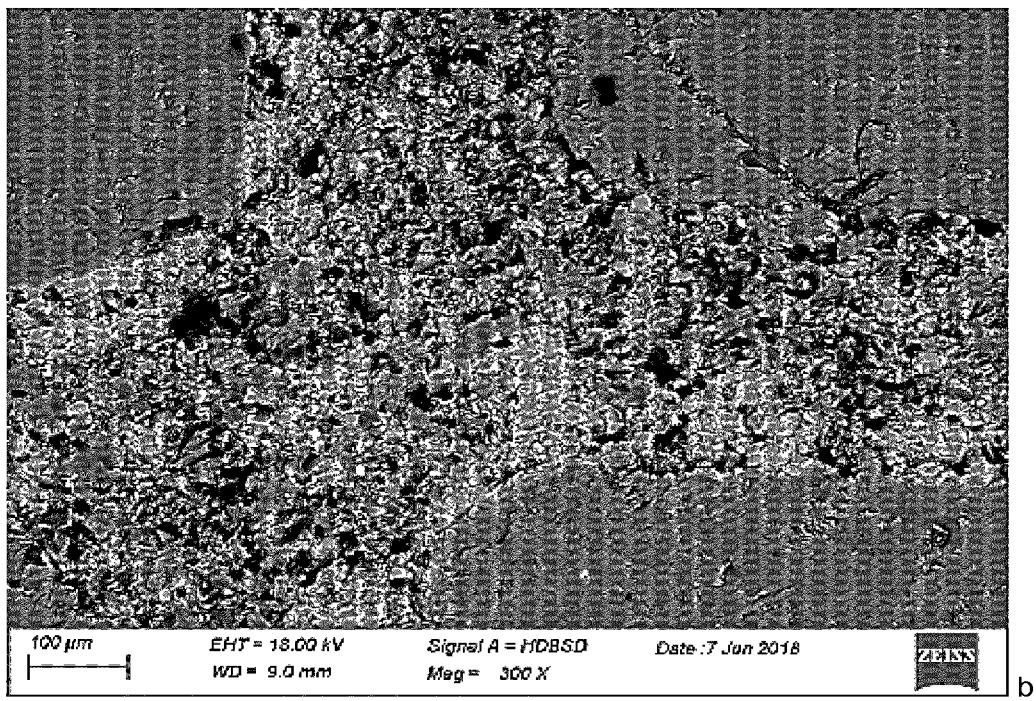
Figure 8:
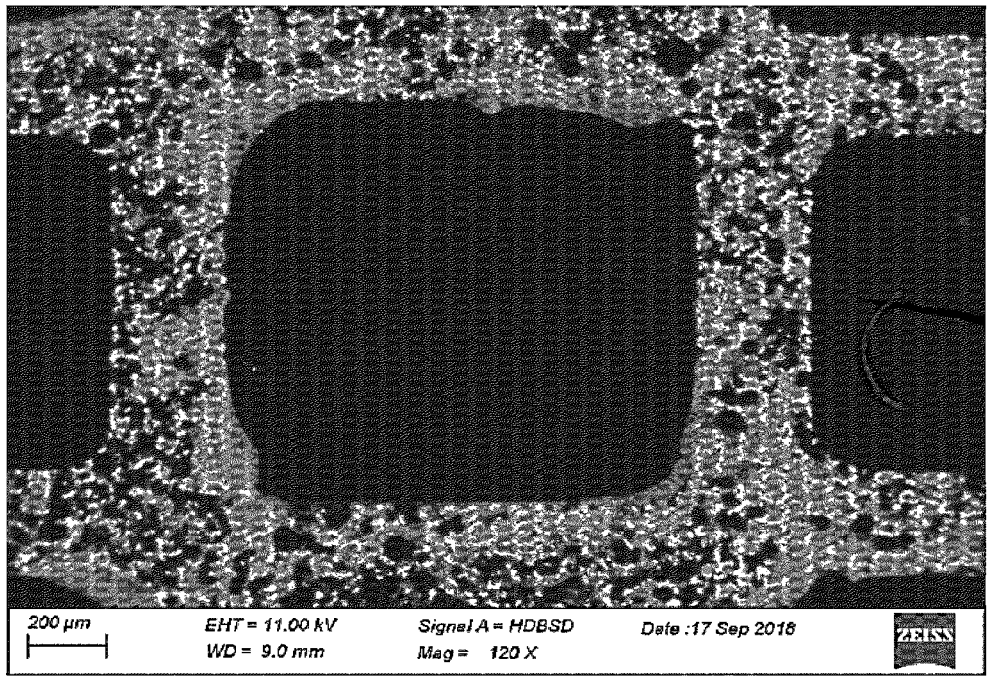
FIG. 8a shows SEM image of the selective catalytic reduction catalyst of Example 6 (Magnification: 120×) obtained as described in Reference Example 3.
FIG. 8b shows SEM image of the selective catalytic reduction catalyst of Example 6 (Magnification: 500×) obtained as described in Reference Example 3.
Figure 8:
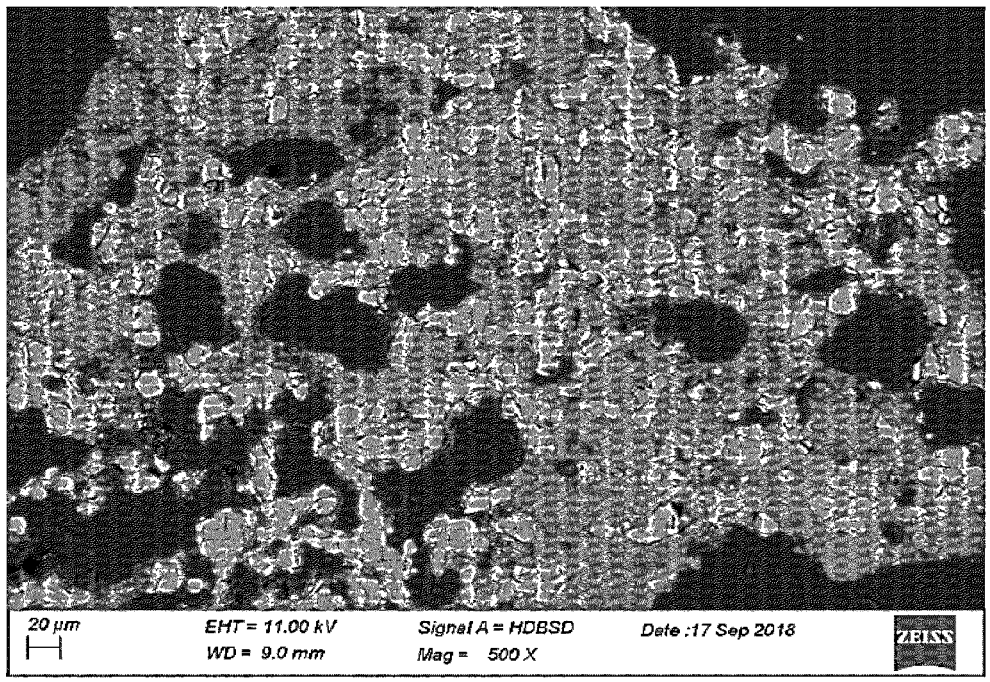
Figure 9:
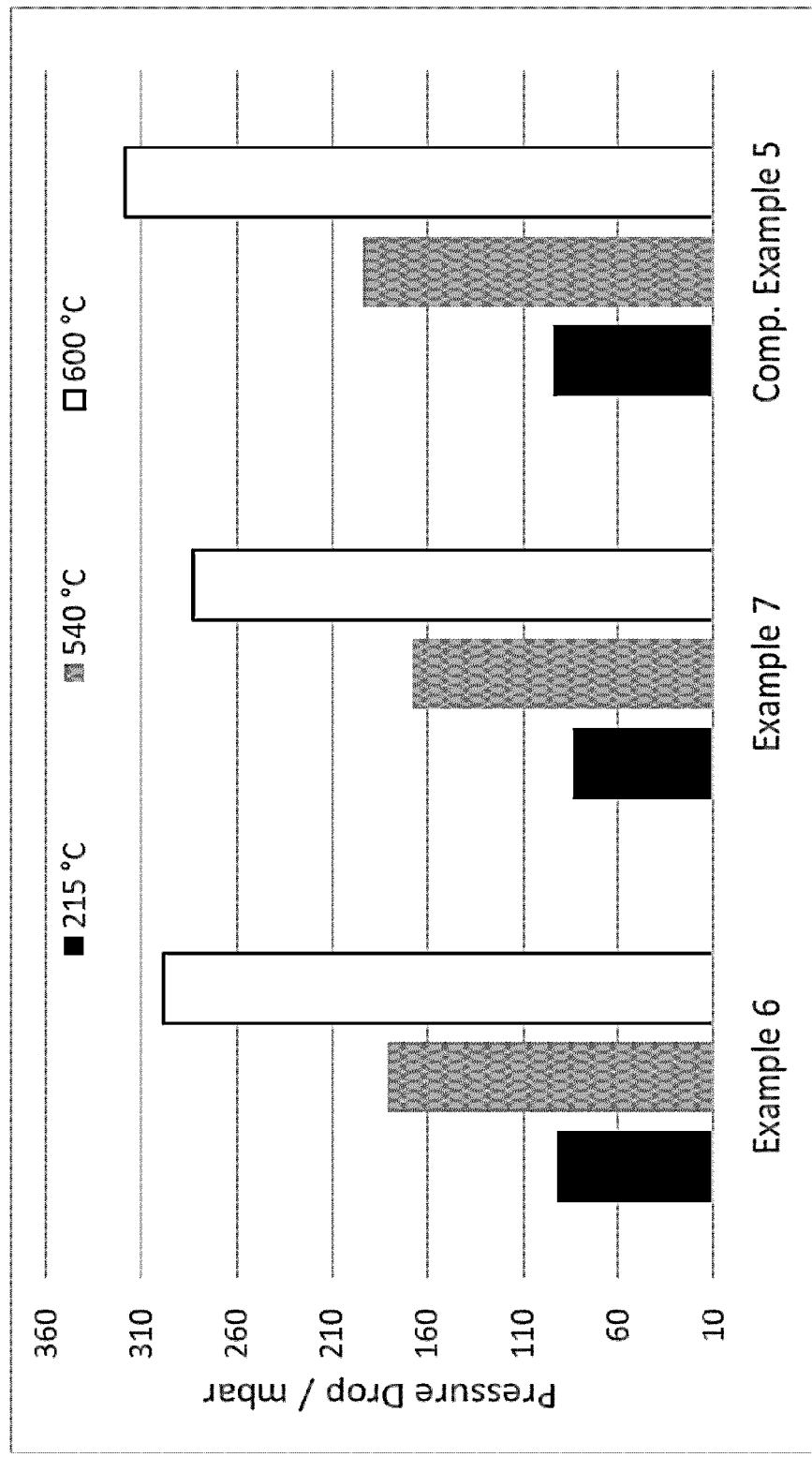
FIG. 9 shows the backpressure obtained with the catalysts of Examples 6, 7 and of Comparative Example 5.
Figure 10:
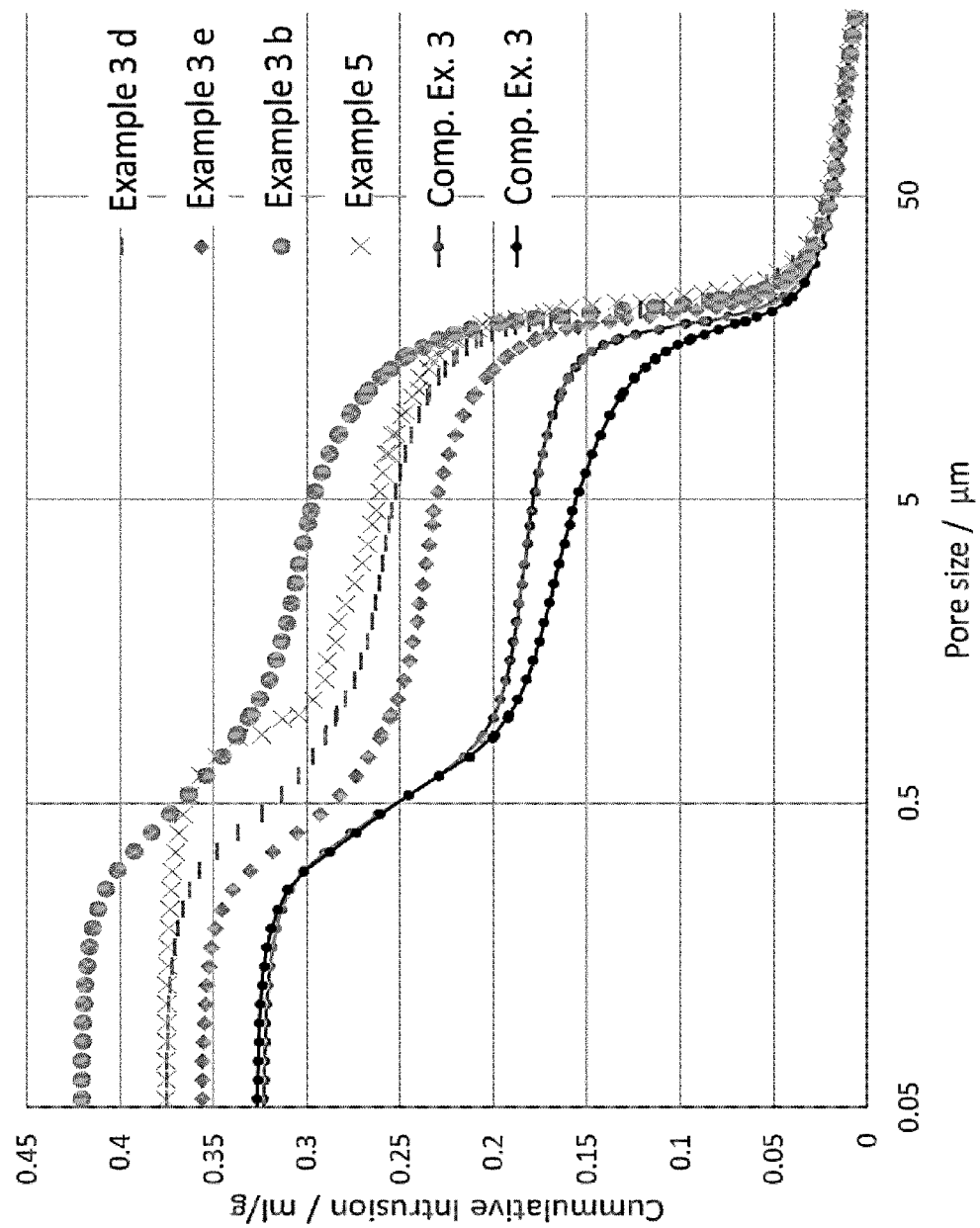
FIG. 10 shows the cumulative Hg intrusion measured for the catalysts of Examples 3b, 3d, 3e and 5 and of Comparative Example 3. The mercury intrusion in the range of 3 to 30 micrometers was strongly enhanced for the catalysts according to the present invention prepared with carbon graphite particles compared to the catalyst not according to the present invention prepared without such carbon graphite particles. The effect was observed for catalysts prepared with carbon graphite particles of three different particles size (a Dv50 of 7.7 micrometers, 11 micrometers and 16.6 micrometers) and with different washcoat loadings of 2 g/in$^3$ and 2.2 g/in$^3$.
Figure 11:
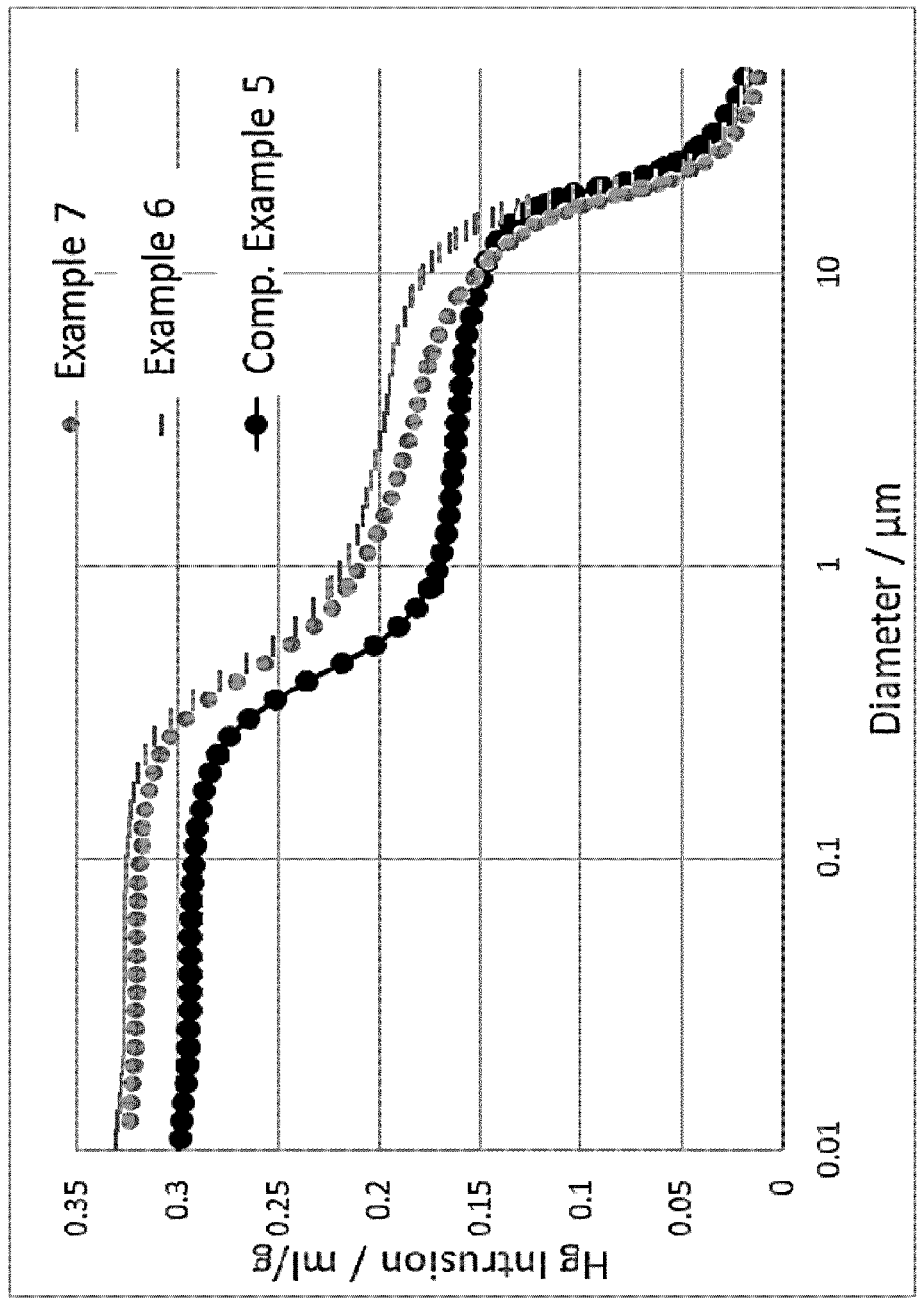
FIG. 11 shows the cumulative Hg intrusion measured at the inlet end and at the middle of the substrate for the catalysts of Examples 6 and 7 and of Comparative Example 5. Similarly as for the catalysts according to the present invention prepared with carbon graphite particles, the mercury intrusion in the range of 3 to 30 micrometers was enhanced the catalysts according to the present invention prepared with particles of carbon containing organic polymers (PMMA and polymethylurea) compared to the catalyst not according to the present invention prepared without such particles. Further, for the catalyst prepared with PMMA, the mercury Intrusion in the range 0.2 micrometer to 10 micrometers was enhanced as well.
Figure 12:
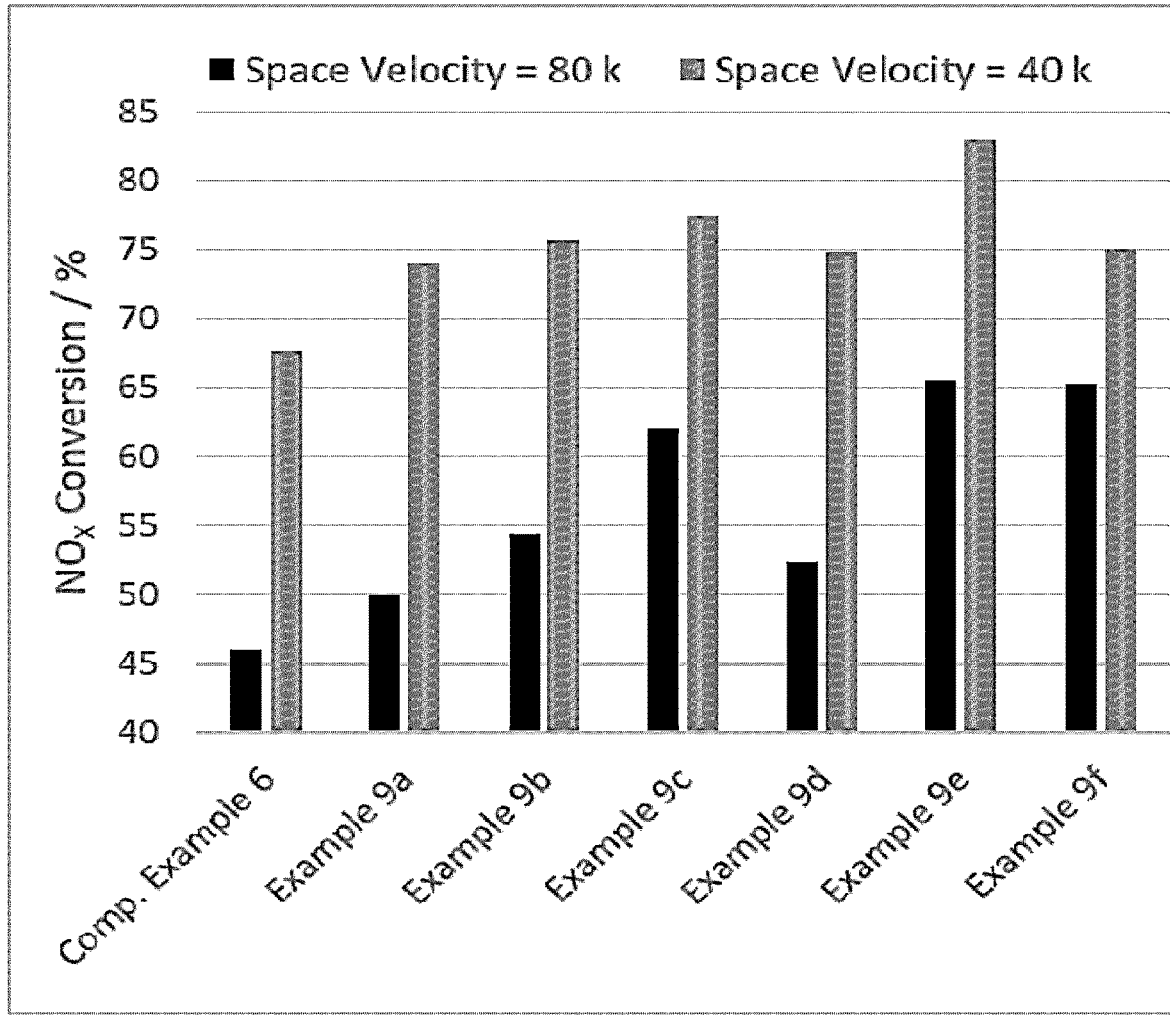
FIG. 12 shows the NOx conversions of the catalysts 9a-9e of Example 9 and of the catalyst of Comparative Example 6 at 200° C.

The invention claimed is:

1. A selective catalytic reduction catalyst comprising
a porous wall-flow filter substrate comprising an inlet end, an outlet end, a substrate axial length extending between the inlet end and the outlet end, and a plurality of passages defined by porous internal walls of the porous wall-flow filter substrate,
wherein the plurality of passages comprise inlet passages having an open inlet end and a closed outlet end, and outlet passages having a closed inlet end and an open outlet end,
wherein an interface between the passages and the porous internal walls is defined by a surface of the porous internal walls; and wherein in the pores of the porous internal walls and on the surface of the porous internal walls, the catalyst comprises a selective catalytic reduction coating comprising a selective catalytic reduction component comprising a zeolitic material comprising one or more of copper and iron;
wherein in the pores of the porous internal walls, the selective catalytic reduction catalytic coating is present as in-wall-coating, and on the surface of the porous internal walls, the selective catalytic reduction catalytic coating is present as on-wall-coating; and wherein in addition to the-selective catalytic reduction catalytic coating, the catalyst comprises no further coating in the pores of the porous internal walls and no further coating on the surface of the porous internal walls; and
wherein the selective catalytic reduction coating is present at a total loading, I(total), which is the sum of the loading of the in-wall coating, I(in-wall coating), and the loading of the on-wall coating, I(on-wall coating), wherein in the catalyst, a loading ratio, defined as the loading of the on-wall coating, I(on-wall coating), relative to the loading of the in-wall coating, I(in-wall coating), the loading ratio, being defined as I(on-wall coating):I(in-wall coating), ranges from 17:83 to 80:20.

2. The catalyst of claim 1, wherein the loading ratio, I(on-wall coating): I(in-wall coating), ranges from 20:80 to 60:40;
wherein the total loading, I(total), of the selective catalytic reduction coating in the catalyst ranges from 1.3 g/in$^3$ to 6 g/in$^3$.

3. The catalyst of claim 1, wherein the zeolitic material comprised in the selective catalytic reduction component comprised in the selective catalytic reduction coating is a 8-membered ring pore zeolitic material;

wherein the zeolitic material comprised in the selective catalytic reduction component of the selective catalytic reduction coating comprises copper in an amount, calculated as CuO, ranging from 1 wt-% to 15 wt-%, based on the weight of the zeolitic material comprised in the selective catalytic reduction coating.

4. The catalyst of claim 1, wherein the porous internal walls of the porous wall-flow filter substrate comprising the in-wall coating have a relative average porosity ranging from 15% to 60%, wherein the relative average porosity is defined as the average porosity of the internal walls comprising the in-wall coating relative to the average porosity of the internal walls not comprising the in-wall coating; and
wherein the total loading of the selective catalytic coating, I(total), ranges from 1.8 g/in$^3$ to 4.5 g/in$^3$; and
wherein the average porosity of the internal walls not comprising the in-wall coating ranges from 30% to 75%.

5. The catalyst of claim 1, wherein the porous internal walls of the porous wall-flow filter substrate comprising the in-wall coating have an average pore size ranging from 5 micrometers to 30 micrometers.

6. The catalyst of claim 1, wherein the in-wall coating comprises pores, wherein at least 15%, of the pores of the in-wall coating have a mean pore size ranging from 0.5 micrometer to 18 micrometers.

7. The catalyst of claim 1, wherein the in-wall coating comprises pores, wherein from 3% to 12%, of the pores of the in-wall coating have a mean pore size in the range of 0.005 micrometer to 2 micrometers.

8. A selective catalytic reduction catalyst comprising
a porous wall-flow filter substrate comprising an inlet end, an outlet end, a substrate axial length extending between the inlet end and the outlet end, and a plurality of passages defined by porous internal walls of the porous wall-flow filter substrate,
wherein the plurality of passages comprise inlet passages having an open inlet end and a closed outlet end, and outlet passages having a closed inlet end and an open outlet end, and
wherein an interface between the passages and the porous internal walls is defined by the surface of the porous internal walls;
the catalyst further comprising
(i) a first coating, in the pores of the porous internal walls, wherein the first coating comprising a first selective catalytic reduction component comprising a first zeolitic material comprising one or more of copper and iron; and
(ii) a second coating, in the pores of the porous internal walls and coated onto the first coating, wherein the second coating comprising a second selective catalytic reduction component comprising a second zeolitic material comprising one or more of copper and iron;
wherein the pores of the porous internal walls comprise the first coating at a loading I(1) and the second coating at a loading I(2), wherein a loading ratio I(1):1(2) ranges from 3:1 to 25:1.

* * * * *